US008948251B2

(12) United States Patent
Tahara et al.

(10) Patent No.: US 8,948,251 B2
(45) Date of Patent: *Feb. 3, 2015

(54) TRANSCODING SYSTEM USING ENCODING HISTORY INFORMATION

(75) Inventors: Katsumi Tahara, Kanagawa (JP);
Yoshihiro Murakami, Kanagawa (JP);
Takuya Kitamura, Kanagawa (JP);
Kanji Mihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 1842 days.

This patent is subject to a terminal disclaimer.

(21) Appl. No.: 11/879,403

(22) Filed: Jul. 17, 2007

(65) Prior Publication Data
US 2008/0008237 A1    Jan. 10, 2008

Related U.S. Application Data

(63) Continuation of application No. 10/342,055, filed on Jan. 14, 2003, now Pat. No. 7,469,007, which is a continuation of application No. 09/265,732, filed on Mar. 9, 1999, now Pat. No. 6,560,282.

(30) Foreign Application Priority Data

Mar. 10, 1998    (JP) .................................. 10-058118
Jun. 5, 1998    (JP) .................................. 10-157243

(51) Int. Cl.
*H04N 7/50*         (2006.01)
*H04N 19/115*      (2014.01)
(Continued)

(52) U.S. Cl.
CPC ..... *H04N 19/0006* (2013.01); *H04N 19/00503* (2013.01); *H04N 19/00781* (2013.01); *H04N 19/00193* (2013.01); *H04N 19/0003* (2013.01); *H04N 19/00472* (2013.01)
USPC .................................................. 375/240.02

(58) Field of Classification Search
CPC .......... H04N 19/006; H04N 19/00503; H04N 19/00781; H04N 19/00472; H04N 7/0021
USPC ............. 375/240.03, 240.14, 240.02, 240.16, 375/240.19, 240.23
IPC ........................................................ H04B 1/66
See application file for complete search history.

(56) References Cited

U.S. PATENT DOCUMENTS 5,289,190 A    2/1994    Shimoda et al.
5,473,380 A    12/1995    Tahara
(Continued)

FOREIGN PATENT DOCUMENTS

EP        0 618 734        10/1994
JP        7 107461        4/1995
(Continued)

OTHER PUBLICATIONS

N. Bjork, C. Christopoulous, "Transcoder architectures for video coding", IEEE Trans. on Consumer Electronics, vol. 44, No. 1, pp. 88-98, Feb. 1998.

(Continued)

*Primary Examiner* — Tung Vo

(74) *Attorney, Agent, or Firm* — Frommer Lawrence & Haug LLP; William S. Frommer; Ellen Marcie Emas

(57) ABSTRACT

The present invention provides a transcoder having a MPEG decoder and a MPEG encoder, for changing a GOP structure and the bit rate of an encoded bitstream obtained as a result of an encoding process. The MPEG encoder receives a past encoding parameters generated at a past encoding process as a history information, and performs a present encoding process by using the past encoding parameters selectively so that the present encoding process is optimized. Furthermore, the encoder describe the past encoding parameters into the encoded bitstream as the history information so as to reuse the history information in advance encoding process. The picture quality of the video data does not deteriorate even if decoding and encoding processes are carried out repeatedly by the transcoder.

16 Claims, 61 Drawing Sheets

(51) Int. Cl.
*H04N 19/426* (2014.01)
*H04N 19/61* (2014.01)
*H04N 19/152* (2014.01)
*H04N 19/107* (2014.01)
*H04N 19/40* (2014.01)

(56) References Cited

U.S. PATENT DOCUMENTS

| | | | |
|---|---|---|---|
| 5,512,953 A * | 4/1996 | Nahumi | 348/441 |
| 5,541,852 A * | 7/1996 | Eyuboglu et al. | 709/232 |
| 5,544,266 A | 8/1996 | Koppelmans et al. | |
| 5,657,086 A | 8/1997 | Tahara et al. | |
| 5,657,416 A * | 8/1997 | Boon | 386/329 |
| 5,715,009 A | 2/1998 | Tahara et al. | |
| 5,729,293 A | 3/1998 | Keesman | |
| 5,754,235 A | 5/1998 | Urano et al. | |
| 5,754,698 A | 5/1998 | Suzuki et al. | |
| 5,757,421 A | 5/1998 | Kato et al. | |
| 5,805,224 A | 9/1998 | Keesman et al. | |
| 5,831,668 A | 11/1998 | Hirvonen et al. | |
| 5,870,146 A | 2/1999 | Zhu | |
| 5,889,561 A * | 3/1999 | Kwok et al. | 375/240.03 |
| 5,907,374 A * | 5/1999 | Liu | 375/240.26 |
| 5,912,709 A * | 6/1999 | Takahashi | 375/240.15 |
| 5,940,130 A | 8/1999 | Nilsson et al. | |
| 5,991,452 A * | 11/1999 | Shimizu et al. | 382/248 |
| 6,012,091 A * | 1/2000 | Boyce | 709/219 |
| 6,081,295 A | 6/2000 | Adolph et al. | |
| 6,088,393 A | 7/2000 | Knee et al. | |
| 6,125,140 A * | 9/2000 | Wilkinson | 375/240 |
| 6,160,844 A | 12/2000 | Wilkinson | |
| 6,163,573 A | 12/2000 | Mihara | |
| 6,167,084 A | 12/2000 | Wang et al. | |
| 6,201,844 B1 | 3/2001 | Bailleul | |
| 6,285,716 B1 * | 9/2001 | Knee et al. | 375/240.28 |
| 6,418,167 B1 | 7/2002 | Kato et al. | |
| 6,493,384 B1 | 12/2002 | Mihara | |
| 6,560,282 B2 | 5/2003 | Tahara et al. | |
| 6,574,274 B2 | 6/2003 | Obata et al. | |
| 6,661,843 B2 | 12/2003 | Kato et al. | |
| 6,704,363 B1 | 3/2004 | Kim | |
| 6,839,384 B2 | 1/2005 | Yamada | |
| 6,856,650 B1 | 2/2005 | Takishima et al. | |

FOREIGN PATENT DOCUMENTS

| | | |
|---|---|---|
| WO | WO 95 35628 | 12/1995 |
| WO | WO 96 01023 | 1/1996 |
| WO | WO 96 24222 | 8/1996 |

OTHER PUBLICATIONS

D. G. Morrison et al., "Reduction of the bit-rate of compressed video while in its coded form," $6^{th}$ International Workshop on Packet Video, 1994, D17.1-D17.4.

Gertjan Keesman et al., "Transcoding of MPED bitstreams," Signal Processing: Image Communication, Elsevier Science B.V., Sep. 1996, vol. 8, No. 6, pp. 481-500.

P. N. Tudor et al., "Real-Time Transcoding of MPEG-2 Video Bit Streams," BBC R&D—IBC '97, Amsterdam <http://www.bbc.co.uk/rd/pubs/papers/pdffiles/ibc97ptw.pdf>.

Keiichi Hibi, "A Study on Coding Control Scheme for Video Transcoding," PCSJ93, Oct. 4, 1993, pp. 27-28.

* cited by examiner

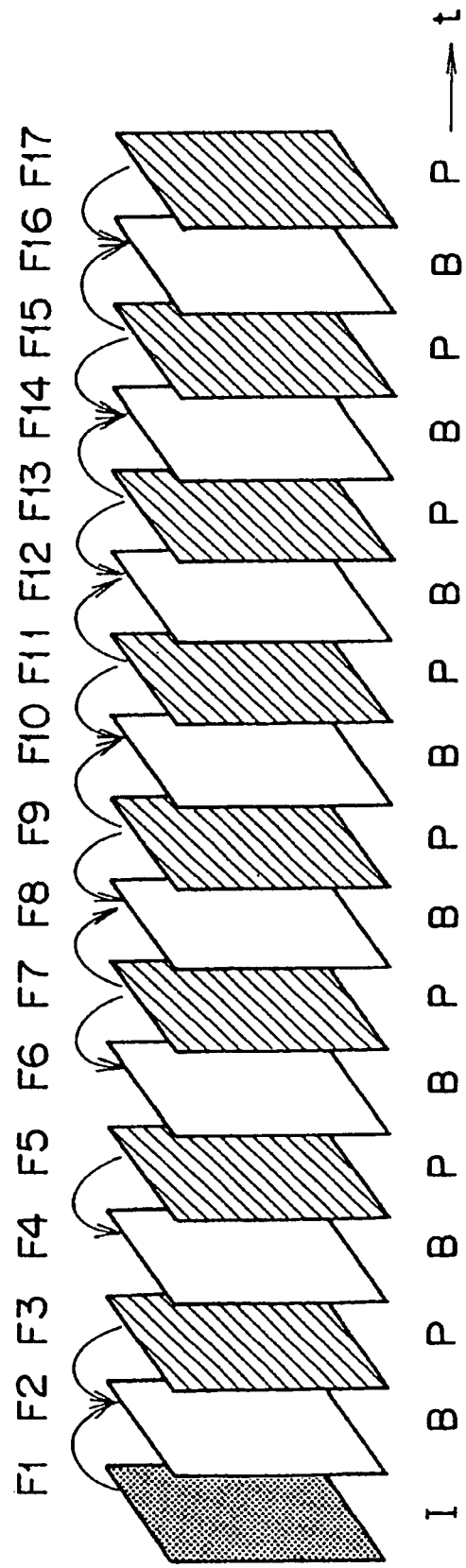

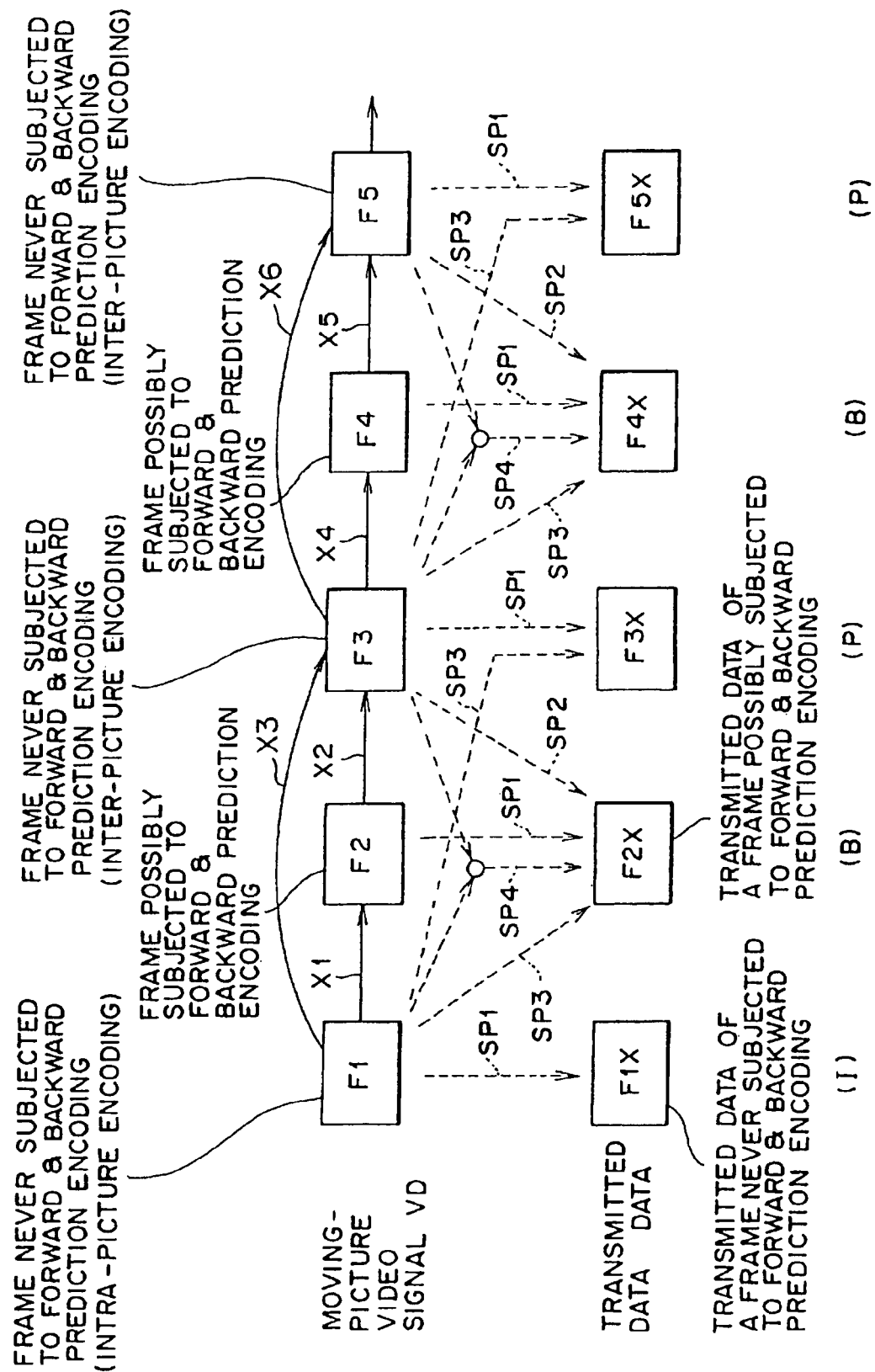

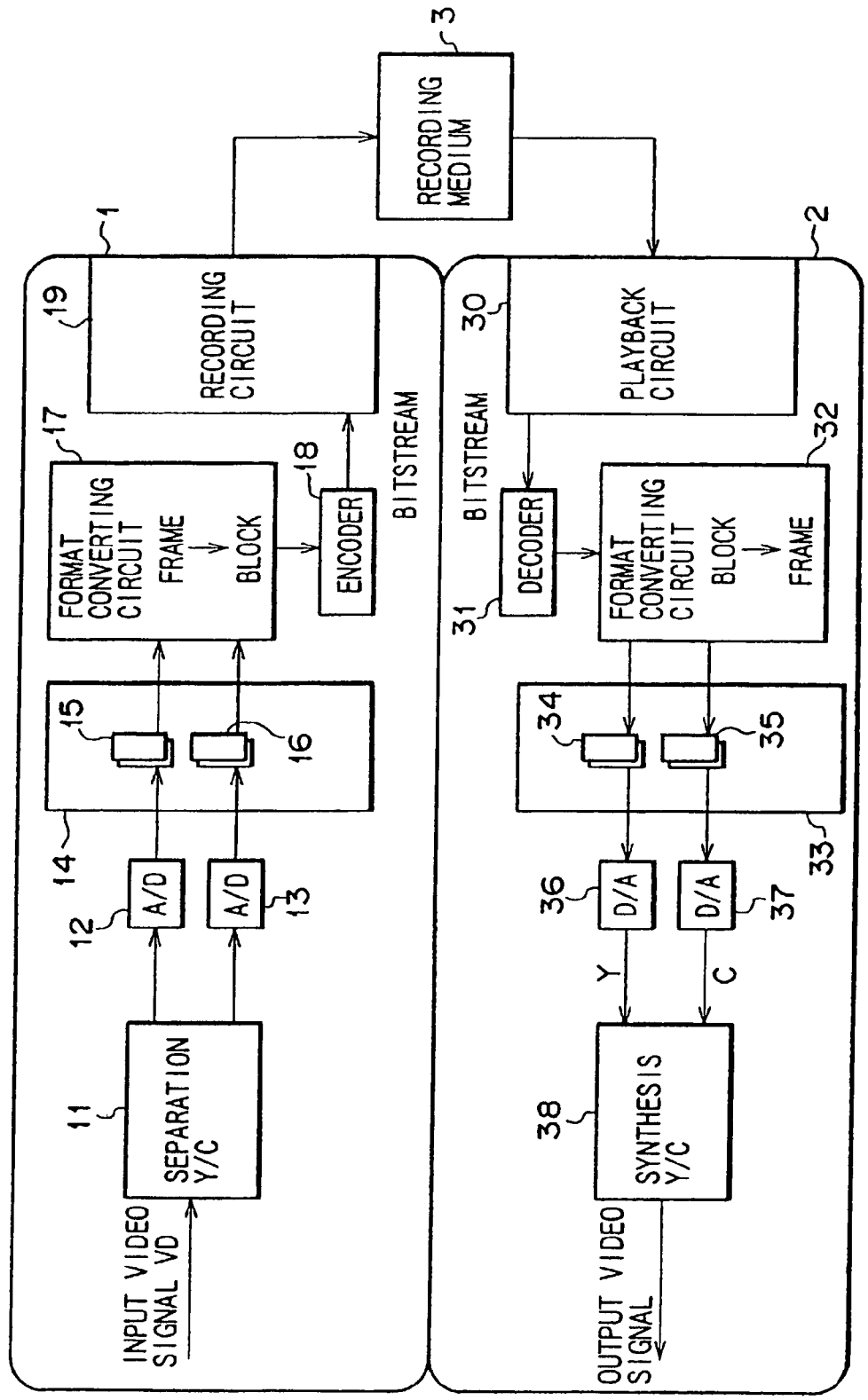

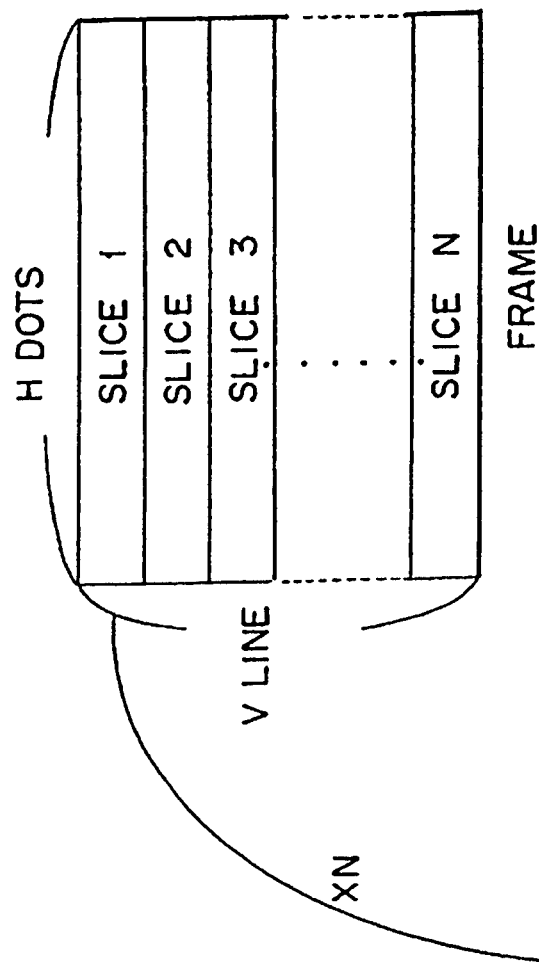
FIG.6A
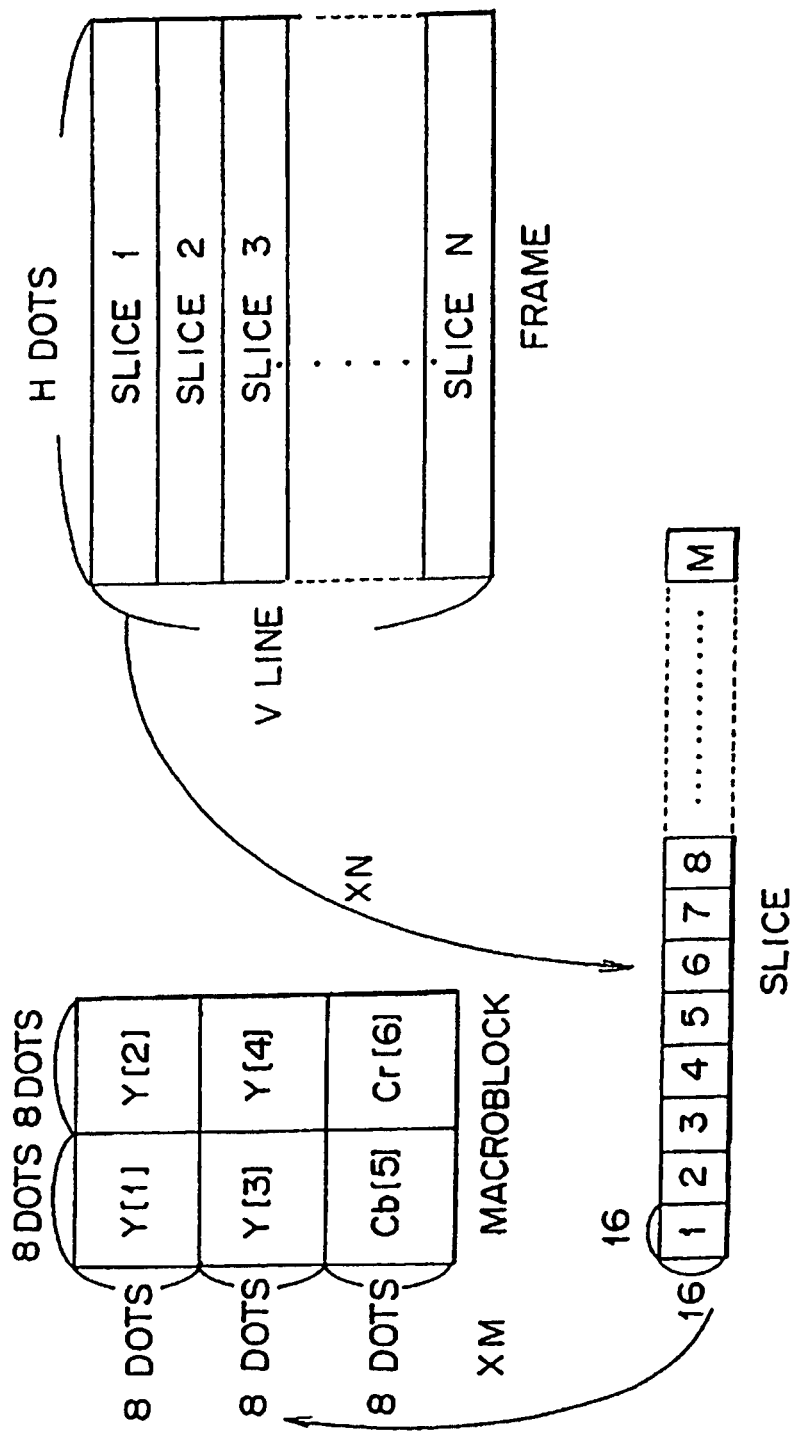
FIG.6B
FIG.6C

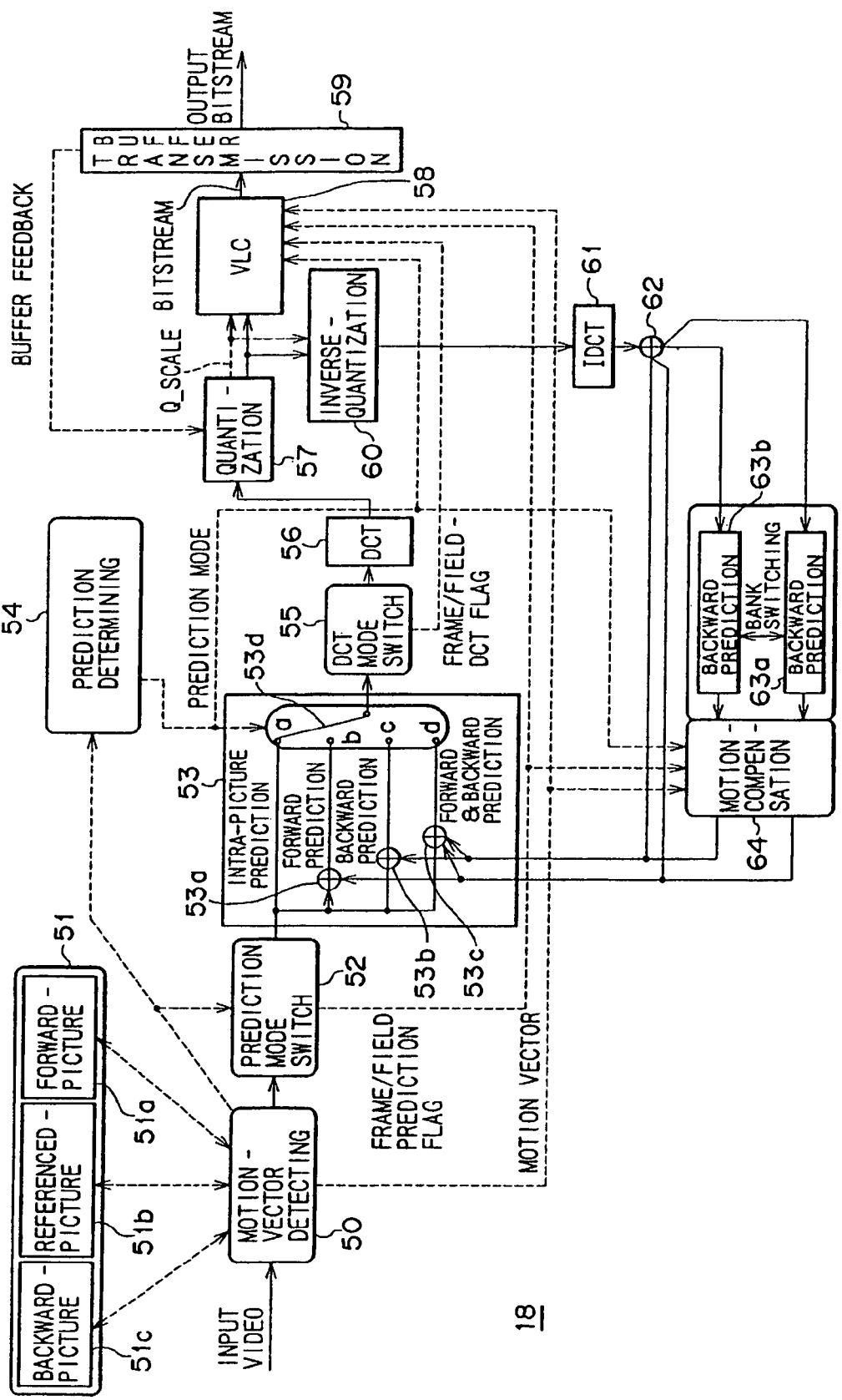

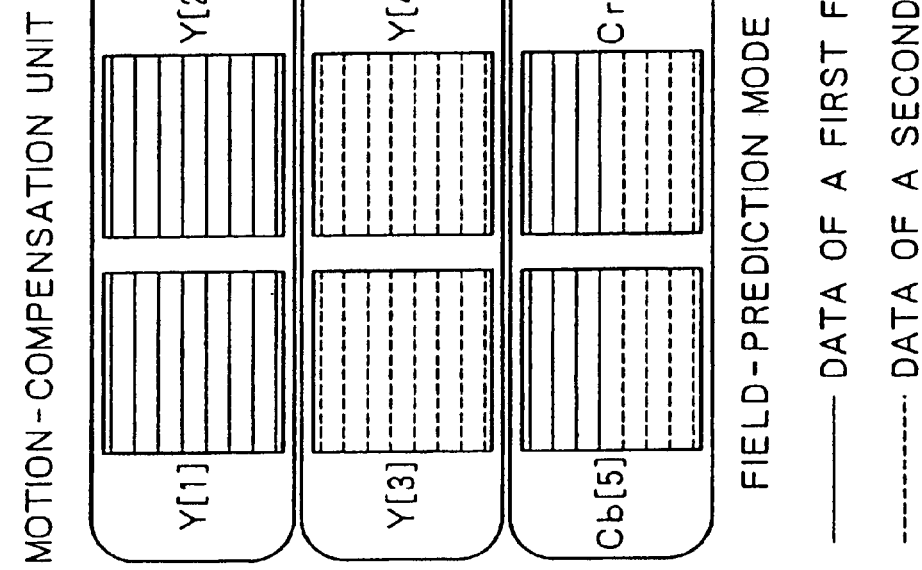
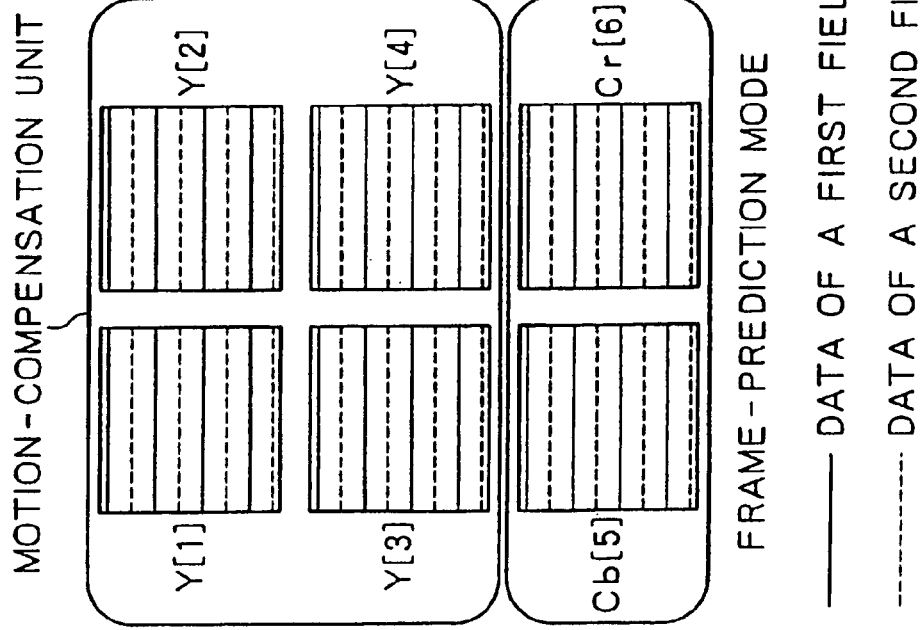

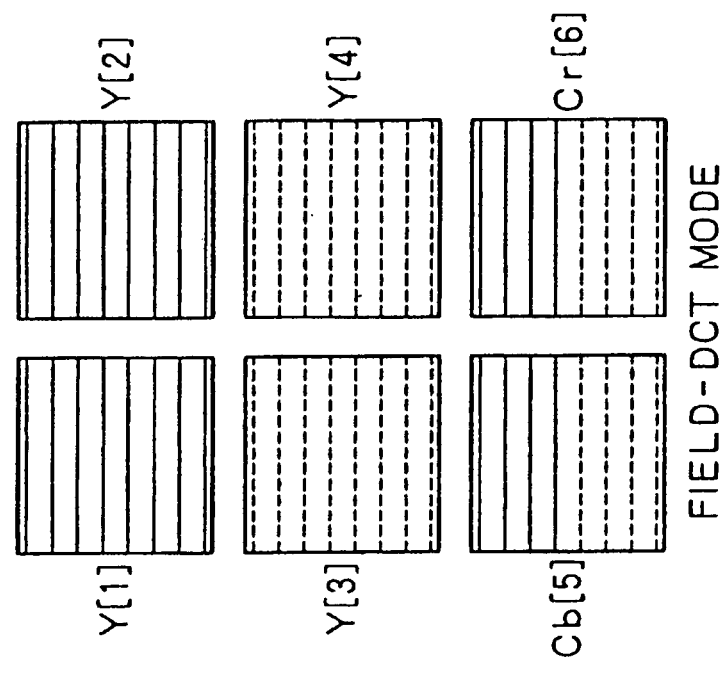
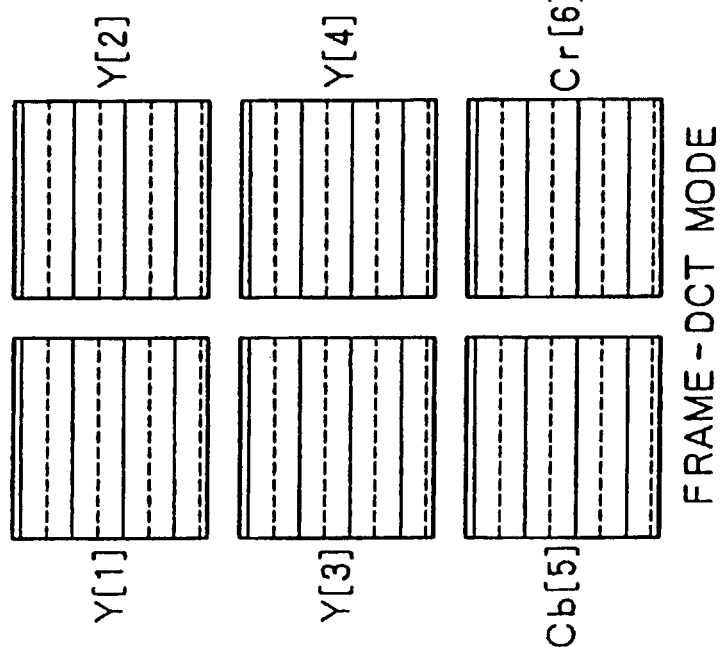

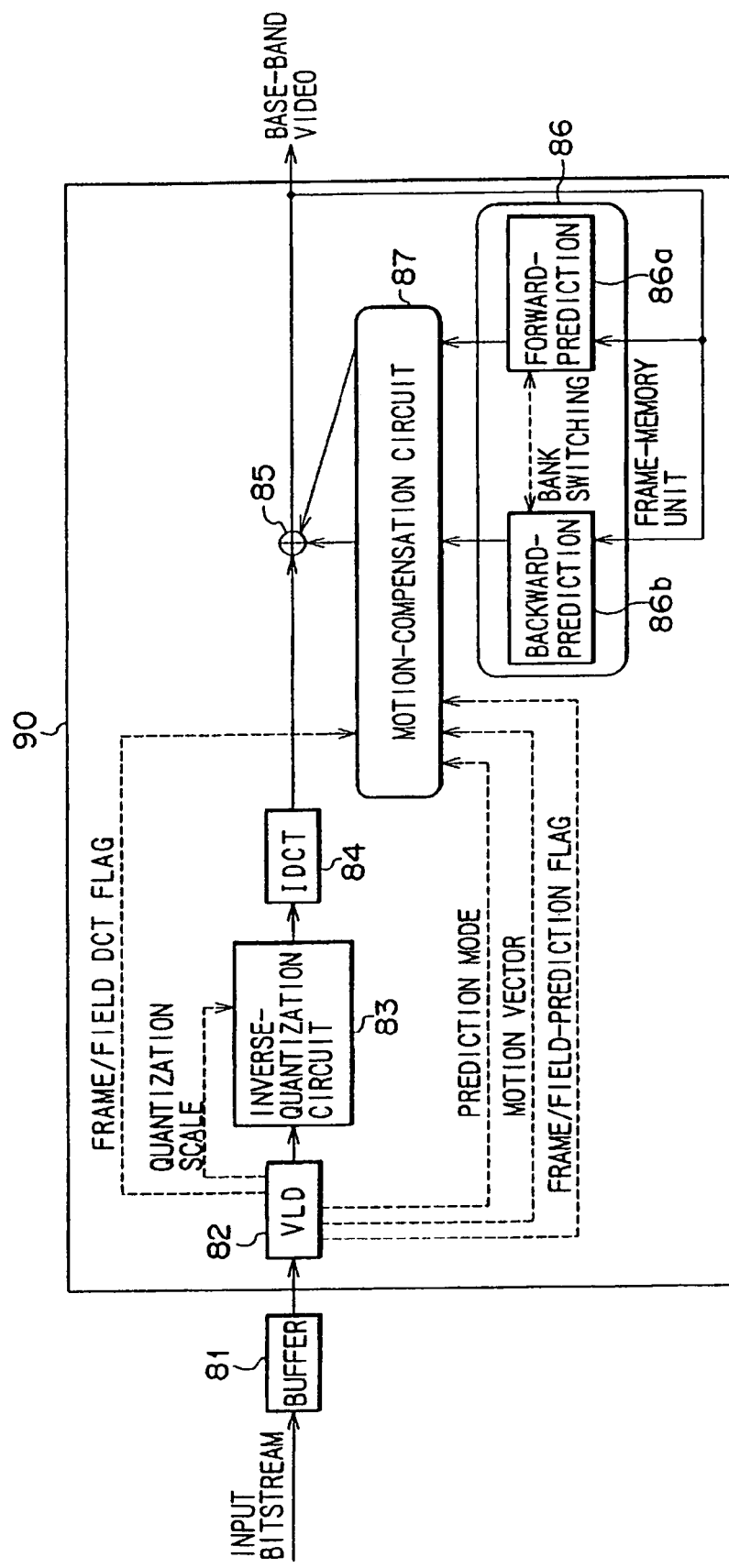

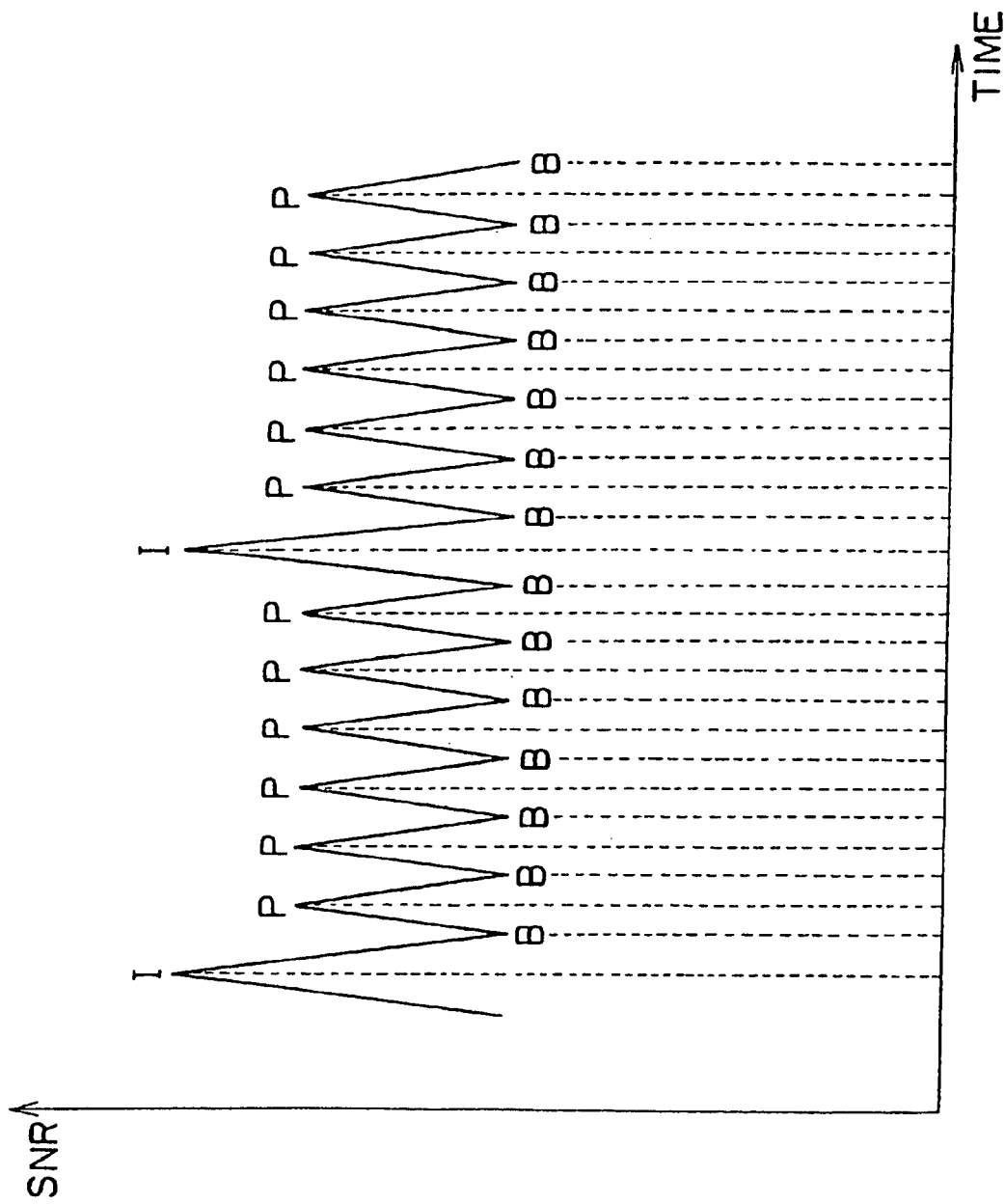

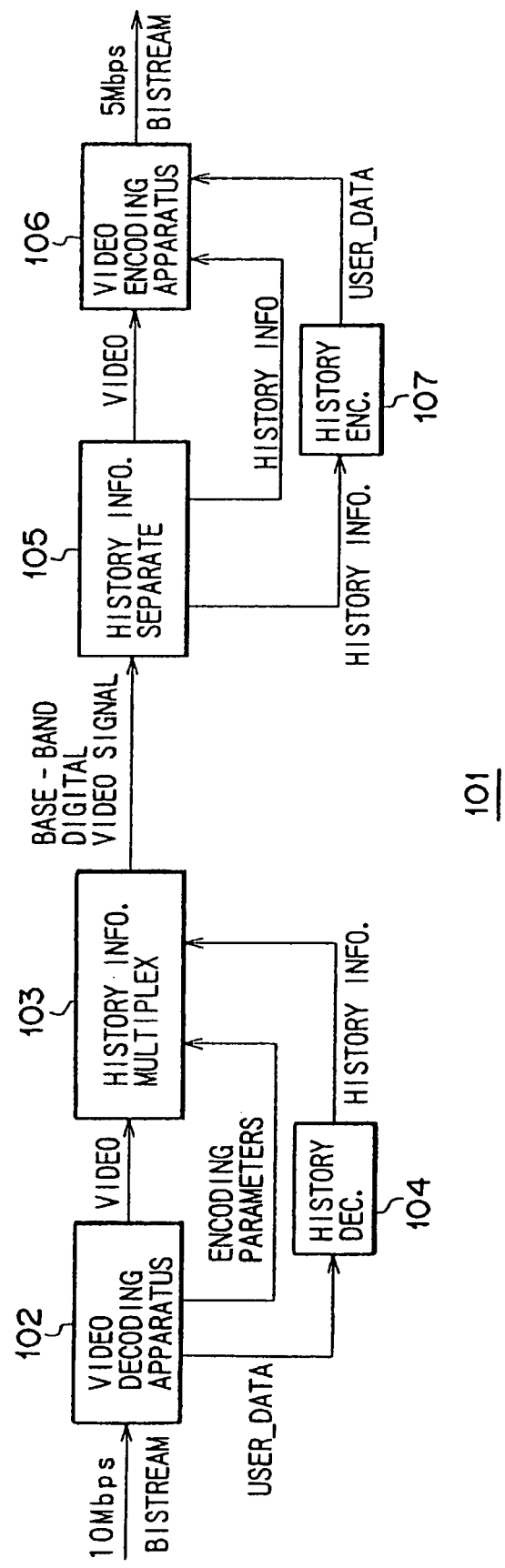

FIG. 17

| 0 | 1 | 2 | . . . . . . . . . . . | 13 | 14 | 15 |
|---|---|---|---|---|---|---|
| 16 | 17 | 18 | . . . . . . . . . . . | 29 | 30 | 31 |
| 32 | 33 | 34 | . . . . . . . . . . . | 45 | 46 | 47 |
| ⋮ | ⋮ | ⋮ | | ⋮ | ⋮ | ⋮ |
| 208 | 209 | 210 | . . . . . . . . . . . | 221 | 222 | 223 |
| 224 | 225 | 226 | . . . . . . . . . . . | 237 | 238 | 239 |
| 240 | 241 | 242 | . . . . . . . . . . . | 251 | 254 | 255 |

MACROBLOCK

FIG. 18

| | | | | | | | | |
|---|---|---|---|---|---|---|---|---|
| D9 | Cb[0][9] | Cr[0][9] | Y[1][9] | Cb[1][9] | Y[2][9] | Cr[1][9] | Y[3][9] | VIDEO DATA AREA |
| D8 | Cb[0][8] | Cr[0][8] | Y[1][8] | Cb[1][8] | Y[2][8] | Cr[1][8] | Y[3][8] | |
| D7 | Cb[0][7] | Cr[0][7] | Y[1][7] | Cb[1][7] | Y[2][7] | Cr[1][7] | Y[3][7] | |
| D6 | Cb[0][6] | Cr[0][6] | Y[1][6] | Cb[1][6] | Y[2][6] | Cr[1][6] | Y[3][6] | |
| D5 | Cb[0][5] | Cr[0][5] | Y[1][5] | Cb[1][5] | Y[2][5] | Cr[1][5] | Y[3][5] | |
| D4 | Cb[0][4] | Cr[0][4] | Y[1][4] | Cb[1][4] | Y[2][4] | Cr[1][4] | Y[3][4] | |
| D3 | Cb[0][3] | Cr[0][3] | Y[1][3] | Cb[1][3] | Y[2][3] | Cr[1][3] | Y[3][3] | |
| D2 | Cb[0][2] | Cr[0][2] | Y[1][2] | Cb[1][2] | Y[2][2] | Cr[1][2] | Y[3][2] | |
| D1 | FIRST GENERATION | SECOND GENERATION | | THIRD GENERATION | | | | HISTORY INFO. AREA |
| D0 | Cb[0][x] | Cr[0][x] | Y[1][x] | Cb[1][x] | Y[2][x] | Cr[1][x] | Y[3][x] | |

FIG. 38 stream with history data

| video_sequence( ) { | No. of bits | Mnemonic |
|---|---|---|
| next_start_code( ) | | |
| sequence_header( ) | | |
| sequence_extension( ) | | |
| do{ | | |
|   extension_and_user_data(0) | | |
|   do{ | | |
|     if(nextbits( )= =group_start_code){ | | |
|       group_of_pictures_header(1) | | |
|       extension_and_user_data(1) | | |
|     } | | |
|     picture_header( ) | | |
|     picture_coding_extension( ) | | |
|     while((nextbits( )= =extension_start_code)\|\| | | |
|       (nextbits( )= =user_data_start_code)){ | | |
|       if(nextbits( )= =extension_start_code)) | | |
|         extension_data(2) | | |
|       if(nextbits( )= =user_data_start_code){ | | |
|         user_data_start_code | 32 | bslbf |
|         if(nextbits( )= =History_Data_ID){ | | |
|           History_Data_ID | 8 | bslbf |
|           converted_history_stream( ) | | |
|         } | | |
|         else{ | | |
|           user_data( ) | | |
|         } | | |
|       } | | |
|     } | | |
|     picture_data( ) | | |
|   }while((nextbits( )= =picture_start_code)\|\| | | |
|     (nextbits( )= =groupe_start_code)) | | |
|   if(nextbits( )!=sequence_end_code){ | | |
|     sequence_header( ) | | |
|     sequence_extension( ) | | |
|   } | | |
| }while(nextbits( )!=sequence_end_code) | | |
| sequence_end_code | 32 | bslbf |
| } | | |

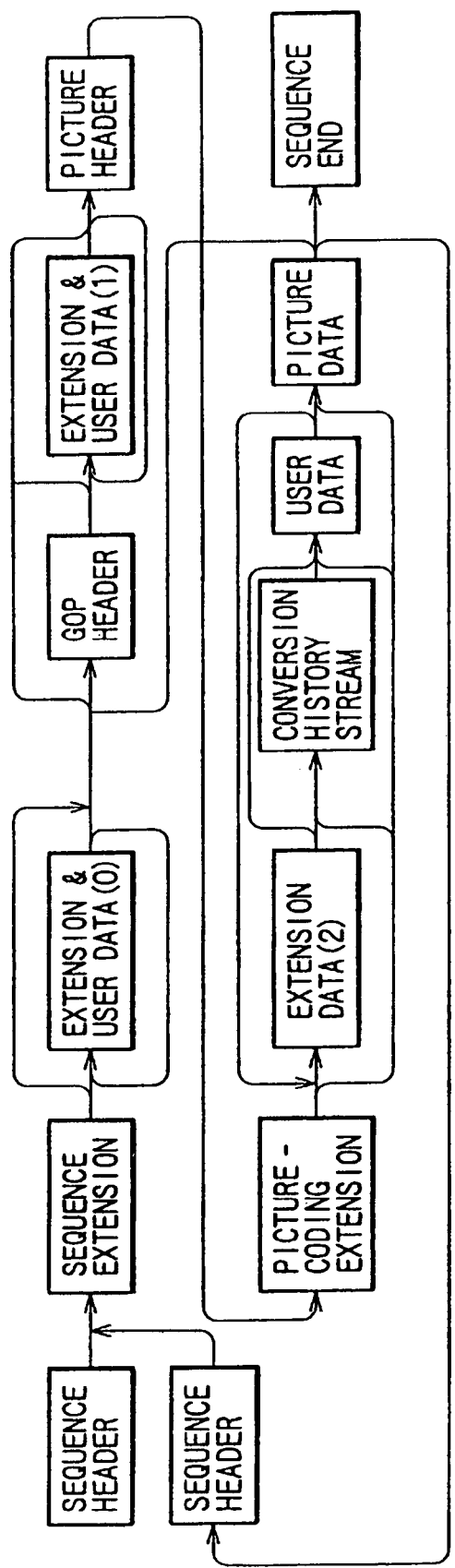
F I G. 39

FIG. 40 history stream(40-1)

| history_stream( ) { | bits | value |
|---|---|---|
| sequence_header | | |
|     sequence_header_code | 32 | 000001B3 |
|     sequence_header_present_flag | 1 | |
|     horizontal_size_value | 12 | |
|     marker_bit | 1 | 1 |
|     vertical_size_value | 12 | |
|     aspect_ratio_information | 4 | |
|     frame_rate_code | 4 | |
|     maker_bit | 1 | 1 |
|     bit_rate_value | 18 | |
|     marker_bit | 1 | 1 |
|     vbv_buffer_size_value | 10 | |
|     constrained_parameter_flag | 1 | 0 |
|     load_intra_quantiser_matrix | 1 | |
|     load_non_intra_quantiser_matrix | 1 | |
|     maker_bits | 5 | 1F |
|     intra_quantiser_matrix[64] | 8*64 | |
|     non_intra_quantiser_matrix[64] | 8*64 | |
| | | |
| sequence_extension | | |
|     extension_start_code | 32 | 000001B5 |
|     extension_start_code_identifier | 4 | 1 |
|     sequence_extension_present_flag | 1 | |
|     profile_and_level_indication | 8 | |
|     progressive_sequence | 1 | |
|     chroma_format | 2 | |
|     horizontal_size_extension | 2 | |
|     vertical_size_extension | 2 | |
|     marker_bit | 1 | 1 |
|     bit_rate_extension | 12 | |
|     vbv_buffer_size_extension | 8 | |
|     low_delay | 1 | |
|     marker_bit | 1 | 1 |

FIG. 41 history stream(40-2)

| | bits | value |
|---|---|---|
| frame_rate_extension_n | 2 | |
| frame_rate_extension_d | 5 | |
| marker_bits | 6 | 3F |
| | | |
| sequence_display_extension | | |
|   extension_start_code | 32 | 000001B5 |
|   extension_start_code_identifier | 4 | 2 |
|   sequence_display_extension_present_flag | 1 | |
|   video_format | 3 | |
|   colour_description | 1 | |
|   colour_primaries | 8 | |
|   transfer_characteristics | 8 | |
|   marker_bit | 1 | 1 |
|   matrix_coefficients | 8 | |
|   display_horizontal_size | 14 | |
|   marker_bit | 1 | 1 |
|   display_vertical_size | 14 | |
|   marker_bit | 1 | 1 |
| | | |
| macroblock_assignment_in_user_data | | |
|   macroblock_assignment_present_flag | 1 | |
|   marker_bits | 7 | 7F |
|   v_phase | 8 | |
|   h_phase | 8 | |
| | | |
| group_of_picture_header | | |
|   group_start_code | 32 | 000001B8 |
|   group_of_picture_header_present_flag | 1 | |
|   time_code | 25 | |
|   closed_gop | 1 | |
|   broken_link | 1 | |
|   marker_bits | 4 | F |
| | | |
| picture_header | | |
|   picture_start_code | 32 | 00000100 |

FIG.42 history stream(40-3)

| | bits | value |
|---|---|---|
| temporal_reference | 10 | |
| picture_coding_type | 3 | |
| marker_bit | 1 | 1 |
| vbv_delay | 16 | |
| full_pel_forward_vector | 1 | |
| forward_f_code | 3 | |
| full_pel_backward_vector | 1 | |
| marker_bit | 1 | 1 |
| backward_f_code | 3 | |
| marker_bit | 1 | 1 |
| | | |
| picture_coding_extension | | |
| extension_start_code | 32 | 000001B5 |
| extension_start_code_identifier | 4 | 8 |
| f_code[0][0] | 4 | |
| f_code[0][1] | 4 | |
| f_code[1][0] | 4 | |
| f_code[1][1] | 4 | |
| intra_dc_precision | 2 | |
| picture_structure | 2 | |
| top_filed_first | 1 | |
| frame_pred_frame_dct | 1 | |
| concealment_motion_vectors | 1 | |
| q_scale_type | 1 | |
| marker_bit | 1 | 1 |
| intra_vlc_format | 1 | |
| alternate_scan | 1 | |
| repeat_first_field | 1 | |
| chroma_420_type | 1 | |
| progressive_frame | 1 | |
| composite_display_flag | 1 | |
| v_axis | 1 | |
| field_sequence | 3 | |
| sub_carrier | 1 | |
| burst_amplitude | 7 | |

FIG.43 history stream(40-4)

| | bits | value |
|---|---|---|
| marker_bit | 1 | 1 |
| sub_carrier_phase | 8 | |
| | | |
| quant_matrix_extension | | |
| extension_start_code | 32 | 000001B5 |
| extension_start_code_identifier | 4 | 3 |
| quant_matrix_extension_present_flag | 1 | |
| load_intra_quantiser_matrix | 1 | |
| marker_bits | 2 | 3 |
| intra_quantiser_matrix[64] | 8*64 | |
| load_non_intra_quantiser_matrix | 1 | |
| marker_bits | 7 | 7F |
| non_intra_quantiser_matrix[64] | 8*64 | |
| load_chroma_intra_quantiser_matrix | 1 | |
| marker_bits | 7 | 7F |
| chorma_intra_quantiser_matrix[64] | 8*64 | |
| load_chroma_non_intra_quantiser_matrix | 1 | |
| marker_bits | 7 | 7F |
| chroma_non_intra_quantiser_matrix[64] | 8*64 | |
| | | |
| copyright_extension | | |
| extension_start_code | 32 | 000001B5 |
| extension_start_code_identifier | 4 | 4 |
| copyright_extension_present_flag | 1 | |
| copyright_flag | 1 | |
| copyright_identifier | 8 | |
| original_or_copy | 1 | |
| marker_bit | 1 | |
| copyright_number_1 | 20 | |
| marker_bit | 1 | |
| copyright_number_2 | 22 | |
| marker_bit | 1 | |
| copyright_number_3 | 22 | 3F |
| marker_bits | 6 | |
| | | |

FIG. 44 history stream(40-5)

| | bits | value |
|---|---|---|
| picture_display_extension | | |
|     extension_start_code | 32 | 000001B5 |
|     extension_start_code_identifier | 4 | 7 |
|     picture_display_extension_present_flag | 1 | |
|     frame_centre_horizontal_offset_1 | 16 | |
|     marker_bit | 1 | 1 |
|     frame_centre_vertical_offset_1 | 16 | |
|     marker_bit | 1 | 1 |
|     frame_centre_horizontal_offset_2 | 16 | |
|     marker_bit | 1 | 1 |
|     frame_centre_vertical_offset_2 | 16 | |
|     marker_bit | 1 | 1 |
|     frame_centre_horizontal_offset_3 | 16 | |
|     marker_bit | 1 | 1 |
|     frame_centre_vertical_offset_3 | 16 | |
|     marker_bits | 6 | 3F |
| | | |
| user_data | | |
|     user_data_start_code | 32 | 000001B2 |
|     user_data | 2048 | |
| | | |
| while(macroblock i=macroblock_count){ | | |
| macroblock | | |
|     macroblock_address_h | 8 | |
|     macroblock_address_v | 8 | |
|     slice_header_present_flag | 1 | |
|     skipped_macroblock_flag | 1 | |
|     marker_bit | 1 | 1 |
| | | |
| macroblock_modes( ) | | |
|     macroblock_quant | 1 | |
|     macroblock_motion_forward | 1 | |
|     macroblock_motion_backward | 1 | |
|     macroblock_pattern | 1 | |
|     macroblock_intra | 1 | |

FIG. 45 history stream(40-6)

| | bits | value |
|---|---|---|
| spatial_temporal_weight_code_flag | 1 | |
| frame_motion_type | 2 | |
| field_motion_type | 2 | |
| dct_type | 1 | |
| marker_bits | 2 | 3 |
| | | |
| quantiser_scale_code | 5 | |
| marker_bits | 3 | 7 |
| | | |
| PMV[0][0][0] | 14 | |
| marker_bits | 2 | 3 |
| PMV[0][0][1] | 14 | |
| motion_vertical_field_select[0][0] | 1 | |
| marker_bit | 1 | 1 |
| PMV[0][1][0] | 14 | |
| marker_bits | 2 | 3 |
| PMV[0][1][1] | 14 | |
| motion_vertical_field_select[0][1] | 1 | |
| marker_bit | 1 | 1 |
| PMV[1][0][0] | 14 | |
| marker_bits | 2 | 3 |
| PMV[1][0][1] | 14 | |
| motion_vertical_field_select[1][0] | 1 | |
| marker_bit | 1 | 1 |
| PMV[1][1][0] | 14 | |
| marker_bits | 2 | 3 |
| PMV[1][1][1] | 14 | |
| motion_vertical_field_select[1][1] | 1 | |
| marker_bit | 1 | 1 |
| | | |
| coded_block_pattern | 12 | |
| marker_bits | 4 | F |
| num_mv_bits | 8 | |
| num_coef_bits | 14 | |
| marker_bits | 2 | 3 |

FIG. 46 history_stream(40-7) {

| | bits | value |
|---|---|---|
| num_other_bits | 7 | |
| marker_bit | 1 | 1 |

}

F I G. 47

| history_stream( ) { | No. of bits | Mnemonic |
|---|---|---|
| next_start_code( ) | | |
| sequence_header( ) | | |
| sequence_extension( ) | | |
| extension_and_user_data(0) | | |
| if(nextbits( )== group_start_code) { | | |
|     group_of_pictures_header( ) | | |
|     extension_and_user_data(1) | | |
| } | | |
| picture_header( ) | | |
| picture_coding_extension( ) | | |
| extensions_and_user_data(2) | | |
| picture_data( ) | | |
| sequence_end_code | 32 | bslbf |
| } | | |

F I G. 48

| sequence_header ( ) { | No. of bits | Mnemonic |
|---|---|---|
| sequence_header_code | 32 | bslbf |
| horizontal_size_value | 12 | uimsbf |
| vertical_size_value | 12 | uimsbf |
| aspect_ratio_information | 4 | uimsbf |
| frame_rate_code | 4 | uimsbf |
| bit_rate_value | 18 | uimsbf |
| marker_bit | 1 | bslbf |
| vbv_buffer_size_value | 10 | uimsbf |
| constrained_parameters_flag | 1 | bslbf |
| load_intra_quantiser_matrix | 1 | uimsbf |
| if(load_intra_quantiser_matrix) | | |
|     intra_quantiser_matrix[64] | 8*64 | uimsbf |
| load_non_intra_quantiser_matrix | 1 | uimsbf |
| if(load_non_intra_quantiser_matrix) | | |
|     non_intra_quantiser_matrix[64] | 8*64 | uimsbf |
| next_start_code( ) | | |
| } | | |

F I G. 49

| sequence_extension( ) { | No. of bits | Mnemonic |
|---|---|---|
| extension_start_code | 32 | bslbf |
| extension_start_code_identifier | 4 | uimsbf |
| profile_and_level_indication | 8 | uimsbf |
| progressive_sequence | 1 | uimsbf |
| chroma_format | 2 | uimsbf |
| horizontal_size_extension | 2 | uimsbf |
| vertical_size_extension | 2 | uimsbf |
| bit_rate_extension | 12 | uimsbf |
| marker_bit | 1 | bslbf |
| vbv_buffer_size_extension | 8 | uimsbf |
| low_delay | 1 | uimsbf |
| frame_rate_extension_n | 2 | uimsbf |
| frame_rate_extension_d | 5 | uimsbf |
| next_start_code( ) | | |
| } | | |

FIG. 50

| | No. of bits | Mnemonic |
|---|---|---|
| extension_and_user_data(i) { | | |
|   while((nextbits()==extension_start_code)|| | | |
|     (nextbits()==user_data_start_code)){ | | |
|     if((i==2)&&(nextbits()==extension_start_code)) | | |
|       extension_data() | | |
|     if(nextbits()==user_data_start_code) | | |
|       user_data() | | |
|   } | | |
| } | | |

FIG. 51

| | No. of bits | Mnemonic |
|---|---|---|
| user_data() { | | |
|   user_data_start_code | 32 | bslbf |
|   while(nextbits()!='0000 0000 0000 0000 0000 0001'){ | | |
|     user_data | 8 | uimsbf |
|   } | | |
|   next_start_code() | | |
| } | | |

FIG. 52

| group_of_pictures_header(){ | No. of bits | Mnemonic |
|---|---|---|
| group_start_code | 32 | bslbf |
| time_code | 25 | bslbf |
| closed_gop | 1 | uimsbf |
| broken_link | 1 | uimsbf |
| next_start_code() | | |
| } | | |

F I G. 53

| picture_header ( ) { | No. of bits | Mnemonic |
|---|---|---|
| picture_start_code | 32 | bslbf |
| temporal_reference | 10 | uimsbf |
| picture_coding_type | 3 | uimsbf |
| vbv_delay | 16 | uimsbf |
| if(picture_coding_type==2 \|\| picture_coding_type==3{ | | |
| full_pel_forward_vector | 1 | bslbf |
| forward_f_code | 3 | bslbf |
| } | | |
| if(picture_coding_type==3) { | | |
| full_pel_backward_vector | 1 | bslbf |
| backward_f_code | 3 | bslbf |
| } | | |
| while(nextbits( )=='1') { | | |
| extra_bit_picture/*with the value'1' */ | 1 | uimsbf |
| extra_information_picture | 8 | uimsbf |
| } | | |
| extra_bit_picture/*with the value'0' */ | 1 | uimsbf |
| next_start_code( ) | | |
| } | | |

F I G. 54

| picture_coding_extension( ) { | No. of bits | Mnemonic |
|---|---|---|
| extension_start_code | 32 | bslbf |
| extension_start_code_identifier | 4 | uimsbf |
| f_code [0] [0] /*forward horizontal*/ | 4 | uimsbf |
| f_code [0] [1] /*forward vertical*/ | 4 | uimsbf |
| f_code [1] [0] /*backward horizontal*/ | 4 | uimsbf |
| f_code [1] [1] /*backward vertical*/ | 4 | uimsbf |
| intra_dc_precision | 2 | uimsbf |
| picture_structure | 2 | uimsbf |
| top_field_first | 1 | uimsbf |
| frame_pred_frame_dct | 1 | uimsbf |
| concealment_motion_vectors | 1 | uimsbf |
| q_scale_type | 1 | uimsbf |
| intra_vlc_format | 1 | uimsbf |
| alternate_scan | 1 | uimsbf |
| repeat_first_field | 1 | uimsbf |
| chroma_420_type | 1 | uimsbf |
| progressive_frame | 1 | uimsbf |
| composite_display_flag | 1 | uimsbf |
| if(composite_display_flag) { | | |
|    v_axis | 1 | uimsbf |
|    field_sequence | 3 | uimsbf |
|    sub_carrier | 1 | uimsbf |
|    burst_amplitude | 7 | uimsbf |
|    sub_carrier_phase | 8 | uimsbf |
| } | | |
| next_start_code() | | |
| } | | |

FIG. 55

| | No. of bits | Mnemonic |
|---|---|---|
| extension_data( ) { | | |
|   while(nextbits( )==extension_start_code) { | | |
|     extension_start_code | 32 | bslbf |
|     if(nextbits( ) == "Quant Matrix Extension ID") | | |
|       quant_matrix_extension( ) | | |
|     else if (nextbits ( )== "Copyright Extension ID") | | |
|       copyright_extension( ) | | |
|     else | | |
|       picture_display_extension( ) | | |
|   } | | |
| } | | |

F I G. 56

| quant_matrix_extersion( ) { | No. of bits | Mnemonic |
|---|---|---|
|     extension_start_code_identifier | 4 | uimsbf |
|     load_intra_quantiser_matrix | 1 | uimsbf |
|     if(load_intra_quantiser_matrix) | | |
|         intra_quantiser_matrix [64] | 8*64 | uimsbf |
|     load_non_intra_quantiser_matrix | 1 | uimsbf |
|     if(load_non_intra_quantiser_matrix) | | |
|         non_intra_quantiser_matrix [64] | 8*64 | uimsbf |
|     load_chroma_intra_quantiser_matrix | 1 | uimsbf |
|     if(load_chroma_intra_quantiser_matrix) | | |
|         chroma_intra_quantiser_matrix [64] | 8*64 | uimsbf |
|     load_chroma_non_intra_quantiser_matrix | 1 | uimsbf |
|     if(load_chroma_non_intra_quantiser_matrix) | | |
|         chroma_non_intra_quantiser_matrix [64] | 8*64 | uimsbf |
|     next_start_code( ) | | |
| } | | |

FIG. 57

| copyright_extension ( ) { | No. of bits | Mnemonic |
|---|---|---|
|     extension_start_code_identifier | 4 | uimsbf |
|     copyright_flag | 1 | bslbf |
|     copyright_identifier | 8 | uimsbf |
|     original_or_copy | 1 | bslbf |
|     reserved | 7 | uimsbf |
|     marker_bit | 1 | bslbf |
|     copyright_number_1 | 20 | uimsbf |
|     marker_bit | 1 | bslbf |
|     copyright_number_2 | 22 | uimsbf |
|     marker_bit | 1 | bslbf |
|     copyright_number_3 | 22 | uimsbf |
|     next_start_code ( ) | | |
| } | | |

F I G. 58

| picture_display_extension( ) { | No. of bits | Mnemonic |
|---|---|---|
|     extension_start_code_identifier | 4 | uimsbf |
|     for(i=0;i jnumber_of_frame_centre_offsets;i++) { | | |
|         frame_centre_horizontal_offset | 16 | simsbf |
|         marker_bit | 1 | bslbf |
|         frame_centre_vertical_offset | 16 | simsbf |
|         marker_bit | 1 | bslbf |
|     } | | |
|     next_start_code( ) | | |
| } | | |

F I G. 59

| picture_data() { | No. of bits | Mnemonic |
|---|---|---|
|     while(nextbits()==slice_start_code) { | | |
|         slice() | | |
|     } | | |
|     next_start_code() | | |
| } | | |

FIG. 60

| slice() { | No. of bits | Mnemonic |
|---|---|---|
| slice_start_code | 32 | bslbf |
| slice_quantiser_scale_code | 5 | uimsbf |
| if(nextbit()=='1') { | | |
| intra_slice_flag | 1 | bslbf |
| intra_slice | 1 | uimsbf |
| reserved_bits | 7 | uimsbf |
| while(nextbits()=='1') { | | |
| extra_bit_slice/*with the value'1'*/ | 1 | uimsbf |
| extra_information_slice | 8 | uimsbf |
| } | | |
| } | | |
| extra_bit_slice/*with the value'0'*/ | 1 | uimsbf |
| do{ | | |
| macroblock() | | |
| }while(nextbit()!='000 0000 0000 0000 0000 0000') | | |
| next_start_code() | | |
| } | | |

FIG. 61

| macroblock() { | No. of bits | Mnemonic |
|---|---|---|
| while(nextbits() == '0000 0000 0001 000') | | |
|   macroblock_escape | 11 | bslbf |
|   macroblock_address_increment | 1-11 | vlclbf |
|   macroblock_modes() | | |
|   if(macroblock_quant) | | |
|     macroblock_quantiser_scale_code | 5 | uimsbf |
|   if(macroblock_motion_forward|| | | |
|     (macroblock_intra && concealment_motion_vectors)) | | |
|     motion_vectors(0) | | |
|   if(macroblock_motion_backward) | | |
|     motion_vectors(1) | | |
|   if(macroblock_intra && concealment_motion_vectors) | | |
|     marker_bit | 1 | bslbf |
|   } | | |
| } | | |

F I G. 62

| macroblock_modes () { | No. of bits | Mnemonic |
|---|---|---|
|     macroblock_type | 1-9 | vlclbf |
|     if(macroblock_motion_forward \|\| | | |
|         macroblock_motion_backward) { | | |
|         if(picture_structure=='frame'){ | | |
|             if(frame_pred_frame_dct==0) | | |
|             frame_motion_type | 2 | uimsbf |
|     }else{ | | |
|             field_motion_type | 2 | uimsbf |
|         } | | |
|     } | | |
|     if((picture_structure=="Frame picture")&& | | |
|         (frame_pred_frame_dct==0)&& | | |
|         (dct_type_flag==1)){ | | |
|         dct_type | 1 | uimsbf |
|     } | | |
| } | | |

F I G. 63

| motion_vectors(s) { | No. of bits | Mnemonic |
|---|---|---|
|     if(motion_vector_count==1) { | | |
|         if((mv_format==field)&&(dmv!=1) | | |
|             motion_vertical_field_select[0][s] | 1 | uimsbf |
|         motion_vector(0, s) | | |
|     }else{ | | |
|         motion_vertical_field_select[0][s] | 1 | uimsbf |
|         motion_vector(0, s) | | |
|         motion_vertical_field_select[1][s] | 1 | uimsbf |
|         motion_vector(1, s) | | |
|     } | | |
| } | | |

F I G. 64

| motion_vector(r, s) { | No. of bits | Mnemonic |
|---|---|---|
|     motion_code[r][s][0] | 1-11 | vlclbf |
|     if((f_code[s][0]!=1)&&(motion_code[r][s][0]!=0)) | | |
|         motion_residual[r][s][0] | 1-8 | uimsbf |
|     if(dmv==1) | | |
|         dmvector[0] | 1-2 | vlclbf |
|     motion_code[r][s][1] | 1-11 | vlclbf |
|     if(f_code[s][1]!=1)&&(motion_code[r][s][1]!=0)) | | |
|         motion_residual[r][s][1] | 1-8 | uimsbf |
|     if(dmv==1) | | |
|         dmvector[1] | 1-2 | vlclbf |
| } | | |

FIG. 65

| macroblock_type VLC code | macroblock_quant | dct_type_flag | macroblock_motion_forward | macroblock_motion_backward | Description |
|---|---|---|---|---|---|
| 1 | 0 | 1 | 0 | 0 | Intra |
| 01 | 1 | 1 | 0 | 0 | Intra, Quant |

FIG. 66

| macroblock_type VLC code | macroblock_quant | dct_type_flag | macroblock_motion_forward | macroblock_motion_backward | Description |
|---|---|---|---|---|---|
| 1 | 0 | 1 | 1 | 0 | MC, Coded |
| 01 | 0 | 1 | 0 | 0 | No MC, Coded |
| 001 | 0 | 0 | 0 | 0 | MC, Not Coded |
| 0001 1 | 0 | 1 | 0 | 0 | Intra |
| 0001 0 | 1 | 1 | 1 | 0 | MC, Coded, Quant |
| 0000 1 | 1 | 1 | 0 | 0 | No MC, Coded, Quant |
| 0000 01 | 1 | 1 | 0 | 0 | Intra, Quant |

FIG.67

| macroblock_type VLC code | macroblock_quant | dct_type_flag | macroblock_motion_forward | macroblock_motion_backward | Description |
|---|---|---|---|---|---|
| 10 | 0 | 0 | 0 | 0 | Interp, Not Coded |
| 11 | 0 | 1 | 1 | 1 | Interp, Coded |
| 010 | 0 | 0 | 0 | 0 | Bwd, Not Coded |
| 011 | 0 | 1 | 0 | 1 | Bwd, Coded |
| 0010 | 0 | 0 | 0 | 0 | Fwd, Not Coded |
| 0011 | 0 | 1 | 1 | 0 | Fwd, Coded |
| 00011 | 0 | 1 | 0 | 0 | Intra |
| 00010 | 1 | 1 | 1 | 1 | Interp, Coded, Quant |
| 000011 | 1 | 1 | 1 | 0 | Fwd, Coded, Quant |
| 000010 | 1 | 1 | 0 | 1 | Bwd, Coded, Quant |
| 000001 | 1 | 1 | 0 | 0 | Intra, Quant | ary to change the GOP structure and the bit rate of the
TRANSCODING SYSTEM USING ENCODING HISTORY INFORMATION This is a continuation of application Ser. No. 10/342,055, filed Jan. 14, 2003, now U.S. Pat. No. 7,469,007 which is a continuation of application Ser. No. 09/265,732, filed Mar. 9, 1999, now U.S. Pat. No. 6,560,282, which is entitled to the priority filing dates of Japanese applications 10-058118 filed on Mar. 10, 1998 and 10-157243 filed on Jun. 5, 1998, the entirety of which are incorporated herein by reference.

BACKGROUND OF THE INVENTION

The present invention relates to a transcoding system, a video encoding apparatus, a stream processing system and a video decoding apparatus for changing a GOP (Group of Pictures) structure and the bit rate of an encoded bitstream obtained as a result of an encoding process based on MPEG (Moving Picture Experts Group) standards.

In recent years, the broadcasting station for producing and broadcasting television programs has been generally using an MPEG technology for compressing and encoding video data. In particular, the MPEG technology is becoming a de-facto standard for recording video data onto a tape or a random-accessible recording medium and for transmitting video data through a cable or a satellite.

The following is a brief description of typical processing carried out by broadcasting stations up to transmission of a video program produced in the station to each home. First, an encoder employed in a camcorder, (an apparatus integrating a video camera and a VTR into a single body), encodes source video data and records the encoded data onto a magnetic tape of the VTR. At that time, the encoder employed in the camcorder encodes the source video data into an encoded bitstream suitable for a recording format of the magnetic tape of the VTR. Typically, the GOP structure of an MPEG bitstream recorded on the magnetic tape is a structure wherein one GOP is composed of two frames. An example of the GOP structure is a structure comprising a sequence of pictures of the types of I-, B-, I-, B-, I-, B- and so on. The bit rate of the MPEG bitstream recorded on the magnetic tape is 18 Mbps.

Then, a central broadcasting station carries out edit processing to edit the video bitstream recorded on the magnetic tape. For this purpose, the GOP structure of the video bitstream recorded on the magnetic tape is converted into a GOP structure suitable for the edit processing. A GOP structure suitable for edit processing is a structure wherein one GOP is composed of one frame. To be more specific, pictures of a GOP structure suitable for edit processing are all I-pictures. This is because in order to carry out edit processing in frame units, the I-picture having no correlation with other pictures is most suitable. In the actual operation to convert the GOP structure, the video bitstream recorded on the magnetic tape is once decoded back into a base-band video data. Then, the base-band video data is re-encoded so as to comprise all I-pictures. By carrying out the decoding and re-encoding processes in this way, it is possible to generate a bitstream having a GOP structure suitable for edit processing.

Subsequently, in order to transmit an edited video program obtained as a result of the edit processing from the central broadcasting station to a local broadcasting station, it is necessary to change the GOP structure and the bit rate of the bitstream of the edited video program to a GOP structure and a bit rate that are suitable for the transmission. The GOP structure suitable for transmission between broadcasting stations is a GOP structure wherein one GOP is composed of 15 frames. An example of such a GOP structure is a structure comprising a sequence of pictures of the types of I-, B-, B-, P-, B-, B-, P- and so on. As for the bit rate suitable for transmission between broadcasting stations, a high bit rate of at least 50 Mbps is desirable since, in general, a dedicated line having a high transmission capacity such as an optical fiber is installed between broadcasting stations. To put it concretely, the bitstream of a video program completed the edit processing is once decoded back into a base-band video data. Then, the base-band video data is re-encoded to result in a GOP structure and a bit rate suitable for transmission between broadcasting stations as described above.

At the local broadcasting station, the video program received from the central broadcasting station is typically subjected to edit processing to insert commercials peculiar to the district where the local broadcasting station is located. Much like the edit processing carried out at the central broadcasting station, the bitstream of the video program received from the central broadcasting station is once decoded back into a base-band video data. Then, the base-band video data is encoded so as to comprise all I-pictures. As a result, it is possible to generate a bitstream having a GOP structure suitable for edit processing.

Subsequently, in order to transmit the video program completing the edit processing at the local broadcasting station to each home through a cable or a satellite, the GOP structure and the bit rate of the bitstream are converted into respectively a GOP structure and a bit rate that are suitable for the transmission to each home. A GOP structure suitable for the transmission to each home is a structure wherein one GOP is composed of 15 frames. An example of such a GOP structure is a structure comprising a sequence of pictures of the types of I-, B-, B-, P-, B-, B-, P- and so on. A bit rate suitable for transmission to each home has a typical value of as low as about 5 Mbps. The bitstream of a video program often completing the edit processing is decoded back into a base-band video data. Then, the base-band video data is re-encoded into a GOP structure and a bit rate suitable for transmission to each home.

As is obvious from the above description, a video program transmitted from the central broadcasting station to each home is subjected to repetitive decoding and encoding processes for a plurality of times during the transmission. In actuality, various kinds of signal processing other than the signal processing described above are carried out at a broadcasting station and the decoding and encoding processes are usually carried out for each kind of signal processing. As a result, the decoding and encoding processes need to be carried out repeatedly.

However, encoding and decoding processes based on MPEG standard are not 100 percent reverse processed to each other as is generally known. To be more specific, base-band video data subjected to an encoding process is not entirely the same as video data obtained as a result of a decoding process carried out in transcoding of the previous generation. Therefore, decoding and encoding processes cause the picture quality to deteriorate. As a result, there is a problem of deterioration of the picture quality that occurs each time decoding and encoding processes are carried out. In other words, the effects of deterioration, of the picture quality are accumulated each time decoding and encoding processes are repeated.

OBJECTS OF THE INVENTION

It is thus an object of the present invention addressing the problem described above to provide a transcoding system, a video encoding apparatus, a stream processing system and a video decoding apparatus which cause no deterioration of the picture quality even if encoding and decoding processes are carried out repeatedly on a bitstream completing an encoding process based on MPEG standard in order to change the GOP structure and the bit rate of the bitstream. In addition, it is an object of the present invention to provide a transcoding system, a video encoding apparatus, a stream processing system and a video decoding apparatus causing no deterioration of the picture quality even if encoding and decoding processes are carried out repeatedly.

SUMMARY OF THE INVENTION

In order to attain the above objects, according to the transcoder provided by the present invention, past encoding parameters generated in a past encoding process are transmitted to the encoder as a history information. The encoder selects the suitable encoding parameters in commensurate with a present encoding process from the history information, the encoder performs the present encoding process by using the selected past encoding parameters. As a result, the picture quality does not deteriorate even if decoding and encoding processes are carried out repeatedly. That is to say, it is possible to lessen the accumulated deterioration in the quality of picture due to repetition of the encoding process.

According to the transcoder provided by the present invention, the encoder describes the past encoding parameters into the encoded bitstream as a history information so that the history information is available in advance encoding process. As a result, the picture quality does not deteriorate even if decoding and encoding processes are carried out repeatedly at the future.

According to the transcoder provided by the present invention, the encoder describes the past encoding parameters in a user-data area provided in said picture layer of the encoded bitstream obtained as a result of the present encoding process. It is thus possible to decode the encoded bitstream by means of any existing decoders conforms to MPEG standard. In addition, it is not necessary to provide a dedicated line for transmitting encoding parameters generated and used in a past encoding process. As a result, it is possible to transmit encoding parameters generated and used in a past encoding process by utilizing the existing data-stream transmission environment.

According to the transcoder provided by the present invention, the encoder selects only a suitable past encoding parameters and describes the selected past encoding parameters as a variable length stream in the stream. As a result, it is possible to transmit the past encoding parameters generated in the past encoding process without the need to substantially increase the bit rate of the output bitstream.

According to the transcoder provided by the present invention, in the present encoding process, the encoder selects only optimum encoding parameters from past encoding parameters in accordance with the assigned picture types of the present encoding process. As a result, deterioration of the quality in picture is by no means accumulated even if decoding and encoding processes are carried out repeatedly and an optimum encoding process can be carried out.

According to the transcoder provided by the present invention, a decision as to whether or not to reutilize past encoding parameters generated in a past encoding process is made on the basis of picture types included in the past encoding parameters. As a result, an optimum encoding process can be carried out.

BRIEF DESCRIPTION OF THE DRAWINGS

For a more complete understanding of the invention, reference is made to the following description and accompanying drawings, in which:

FIG. 3 is an explanatory diagram showing picture types used in compression of picture data;

FIG. 4 is an explanatory diagram used for describing the principle of a process of encoding a moving-picture video signal;

FIG. 5 is a block diagram showing the configuration of an apparatus used for encoding and decoding a moving-picture video signal;

FIGS. 6A to 6C are explanatory diagrams used for describing format conversion;

FIG. 7 is a block diagram showing the configuration of an encoder 18 employed in the apparatus shown in FIG. 5;

FIG. 8 is an explanatory diagram used for describing the operation of a prediction-mode switching circuit 52 employed in the encoder 18 shown in FIG. 7;

FIG. 9 is an explanatory diagram used for describing the operation of a prediction-mode switching circuit 52 employed in the encoder 18 shown in FIG. 7;

FIG. 10 is an explanatory diagram used for describing the operation of a prediction-mode switching circuit 52 employed in the encoder 18 shown in FIG. 7;

FIG. 11 is an explanatory diagram used for describing the operation of a prediction-mode switching circuit 52 employed in the encoder 18 shown in FIG. 7;

FIG. 12 is a block diagram showing the configuration of a decoder 31 employed in the apparatus shown in FIG. 5;

FIG. 13 is an explanatory diagram used for describing SNR control based on picture types;

FIG. 14 is a block diagram showing the configuration of a transcoder 101 provided by the present invention;

FIG. 17 is an explanatory diagram showing pixels of a macroblock;

FIG. 18 is an explanatory diagram showing areas for recording encoding parameters;

FIG. 38 is an explanatory diagram used for describing the syntax of an MPEG stream;

FIG. 39 is an explanatory diagram used for describing the configuration of the syntax shown in FIG. 38;

FIG. 40 is an explanatory diagram used for describing the syntax of history_stream( ) for recording history information with a fixed length;

FIG. 41 is an explanatory diagram used for describing the syntax of history_stream( ) for recording history information with a fixed length;

FIG. 42 is an explanatory diagram used for describing the syntax of history_stream( ) for recording history information with a fixed length;

FIG. 43 is an explanatory diagram used for describing the syntax of history_stream( ) for recording history information with a fixed length;

FIG. 44 is an explanatory diagram used for describing the syntax of history_stream( ) for recording history information with a fixed length;

FIG. 45 is an explanatory diagram used for describing the syntax of history_stream( ) for recording history information with a fixed length;

FIG. 46 is an explanatory diagram used for describing the syntax of history_stream( ) for recording history information with a fixed length;

FIG. 47 is an explanatory diagram used for describing the syntax of history_stream( ) for recording history information with a variable length;

FIG. 48 is an explanatory diagram used for describing the syntax of sequence_header( );

FIG. 49 is an explanatory diagram used for describing the syntax of sequence_extension( );

FIG. 50 is an explanatory diagram used for describing the syntax of extension_and_user_data( );

FIG. 51 is an explanatory diagram used for describing the syntax of user_data( );

FIG. 52 is an explanatory diagram used for describing the syntax of group_of_picture_header( );

FIG. 53 is an explanatory diagram used for describing the syntax of picture_header( );

FIG. 54 is an explanatory diagram used for describing the syntax of picture_coding_extension( );

FIG. 55 is an explanatory diagram used for describing the syntax of extension_data( );

FIG. 56 is an explanatory diagram used for describing the syntax of quant_matrix_extension( );

FIG. 57 is an explanatory diagram used for describing the syntax of copyright_extension( );

FIG. 58 is an explanatory diagram used for describing the syntax of picture_display_extension( );

FIG. 59 is an explanatory diagram used for describing the syntax of picture_data( );

FIG. 60 is an explanatory diagram used for describing the syntax of slice( );

FIG. 61 is an explanatory diagram used for describing the syntax of macroblock( );

FIG. 62 is an explanatory diagram used for describing the syntax of macroblock_modes( );

FIG. 63 is an explanatory diagram used for describing the syntax of motion_vectors(s);

FIG. 64 is an explanatory diagram used for describing the syntax of motion_vector(r, s);

FIG. 65 is an explanatory diagram used for describing a variable-length code of macroblock_type for an I-picture;

FIG. 66 is an explanatory diagram used for describing a variable-length code of macroblock_type for a P-picture; and FIG. 67 is an explanatory diagram used for describing a variable-length code of macroblock_type for a B-picture.

DESCRIPTION OF THE PREFERRED EMBODIMENTS

Before describing a transcoder provided by the present invention, a process to compress and encode a moving-picture video signal is explained. It should be noted that a technical term 'system' used in this specification means a whole system comprising a plurality of apparatuses and means.

As described above, in a system for transmitting a moving-picture video signal to a remote destination such as a television signal broadcasting system and a television signal transmitting system, the video-signal is subjected to compression and encoding processes using line correlation and intra-frame correlation of the video signal in order to allow the transmission line to be utilized with a high degree of efficiency. By using line correlation, a video signal can be compressed by carrying out typically DCT (Discrete Cosine Transform) processing.

Figure 1:
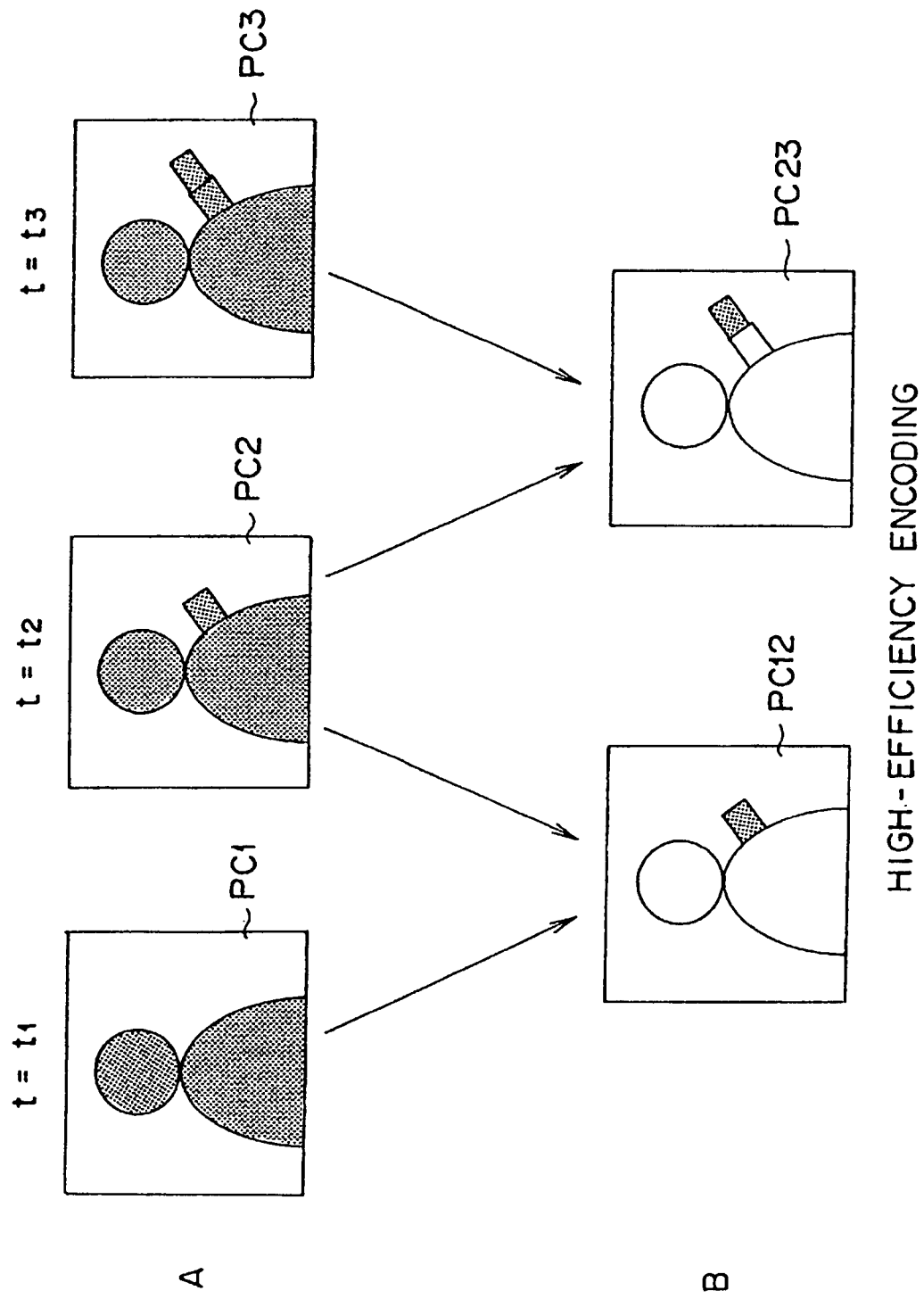
FIG. 1 is an explanatory diagram used for describing the principle of a high-efficiency encoding process.

By using intra-frame correlation, the video signal can be further compressed and encoded. Assume that frame pictures PC1, PC2 and PC3 are generated at points of time t1, t2 and t3 respectively as shown in FIG. 1. In this case, a difference in picture signal between the frame pictures PC1 and PC2 is computed to generate a frame picture PC12. By the same token, a difference in picture signal between the frame pictures PC2 and PC3 is computed to generate a frame picture PC23. Normally, a difference in picture signal between frame pictures adjacent to each other along the time axis is small. Thus, the amounts of information contained in the frame pictures PC21 and PC23 are small and the amount of code included in a difference signal obtained as a result of coding such a difference is also small.

By merely transmitting a difference signal, however, the original picture can not be restored. In order to obtain the original picture, frame pictures are classified into three types, namely, I-, P- and B-pictures each used as a smallest processing unit in the compression and encoding processes of a video signal.

Figure 2:
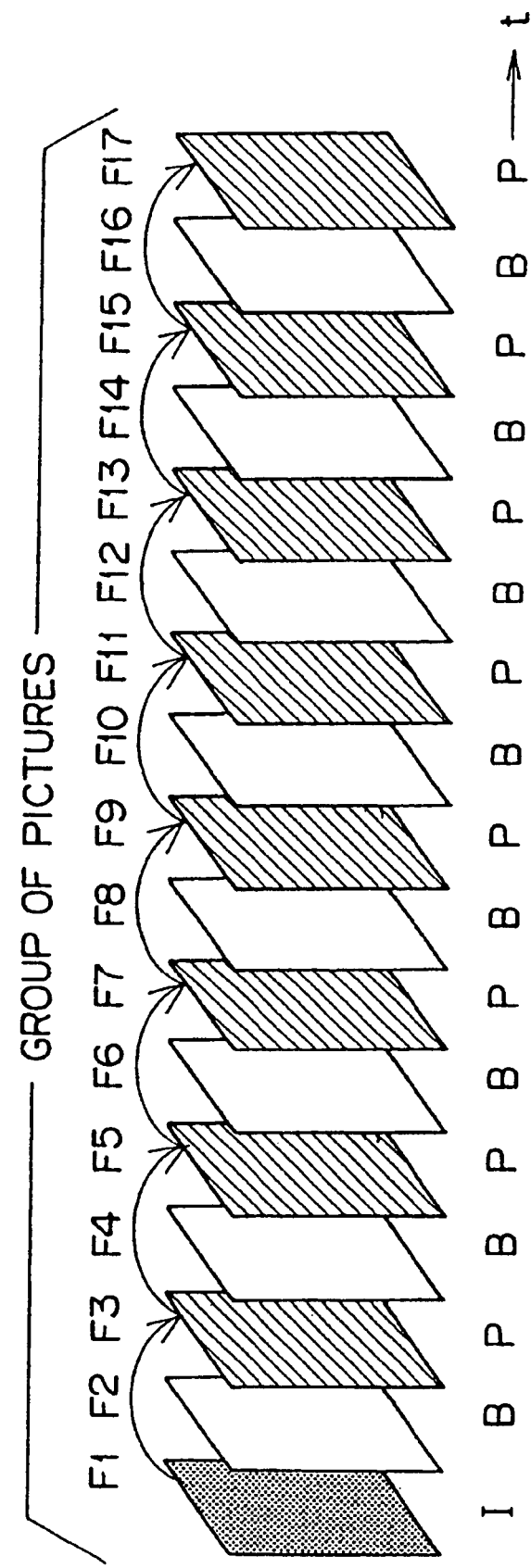
FIG. 2 is an explanatory diagram showing picture types used in compression of picture data.

Assume a GOP (Group of Pictures) of FIG. 2 comprising seventeen frames, namely, frames F1 to F17 which are each processed as a smallest unit of video signals for processing. To be more specific, the first frame F1, the second frame F2 and the third frame F3 are processed as I-, B- and P-pictures respectively. The subsequent frames, that is, the fourth to seventeenth frames F4 to F17, are processed as B- and P-pictures alternately.

In the case of an I-picture, a video signal of the entire frame is transmitted. In the case of a P-picture or a B-picture, on the other hand, only a difference in video signal can be transmitted as an alternative to the video signal of the entire frame. To be more specific, in the case of the third frame F3 of a P-picture shown in FIG. 2, only a difference in video signal between the P-picture and a chronically preceding I- or P-picture is transmitted as a video signal. In the case of the second frame F2 of a B-picture shown in FIG. 3, for example, a difference in video signal between the B-picture and a chronically preceding frame, a succeeding frame or an average value of the preceding and a chronically succeeding frames is transmitted as a video signal.

FIG. 4 is a diagram showing the principle of a technique of encoding a moving-picture video signal in accordance with what is described above. As shown in FIG. 4, the first frame F1 is processed as an I-picture. Thus, the video signal of the entire frame F1 is transmitted to the transmission line as data F1X (intra-picture encoding). On the other hand, the second frame F2 is processed as a B-picture. In this case, a difference between the second frame F2 and the chronically preceding frame F1, the succeeding frame F3 or an average value of the preceding frame F1 and the succeeding frame F3 is transmitted as data F2X.

To put it in detail, the processing of a B-picture can be classified into four types. In the processing of the first type, the data of the original frame F2 denoted by notation SP1 in FIG. 4 is transmitted as it is as data F2X as is the same case with an I-picture. Thus, the processing of the first type is thus the so-called intra-picture encoding. In the processing of the second type, a difference denoted by notation SP2 between the second frame F2 and the chronically succeeding third frame F3 is transmitted as data F2X. Since the succeeding frame is taken as a reference or a prediction picture, this processing is referred to as backward prediction encoding. In the processing of the third type, a difference denoted by notation SP3 between the second frame F2 and the preceding first frame F1 is transmitted as data F2X as is the case with a P-picture. Since the preceding frame is taken as a prediction picture, this processing is referred to as forward prediction encoding. In the processing of the fourth type, a difference denoted by notation SP4 between the second frame F2 and an average of the succeeding third frame F3 and the preceding first frame F1 is transmitted as data F2X. Since the preceding and succeeding frames are taken as a prediction picture, this processing is referred to as forward & backward prediction encoding. In actuality, one of the four processing types aforementioned is selected so as to generate a minimum amount of transmission data obtained as a result of the processing.

It should be noted that, in the case of a difference obtained as a result the processing of the second, third or fourth type described above, a motion vector between the pictures of the frames (prediction picture) used in the computation of the difference is also transmitted along the difference. To be mote specific, in the case of the forward prediction encoding, the motion vector is a motion vector x1 between the frames F1 and F2. In the case of the backward prediction encoding, the motion vector is a motion vector x2 between the frames F2 and F3. In the case of the forward & backward prediction encoding, the motion vectors x1 and x2 are both transmitted.

Much like the B-picture described above, in the case of the frame F3 of the P-picture, the forward prediction encoding or the intra-picture processing is selected to produce a minimum amount of transmitting data obtained as a result of the processing. If the forward prediction encoding is selected, a difference denoted by notation SP3 between the third frame F3 and the preceding first frame F1 is transmitted as data F3X along with a motion vector x3. If the intra-picture processing is selected, on the other hand, it is the data F3X of the original frame F3 denoted by notation SP1 that is transmitted.

FIG. 5 is a block diagram showing a typical configuration of a system based on the principle described above to code a moving-picture video signal and transmit as well as decode the coded signal. A signal encoding apparatus 1 encodes an input video signal and transmits the encoded video signal to a signal decoding apparatus 2 through a recording medium 3 which serves as a transmission line. The signal decoding apparatus 2 plays back the coded signal recorded on the recording medium 3 and decodes the playback signal in to an output signal.

In the signal encoding apparatus 1, the input video signal is supplied to a preprocessing circuit 11 for splitting it into luminance and chrominance signals. In the case of this embodiment, the chrominance signal is a color-difference signal. The analog luminance and color-difference signals are then supplied to A/D converters 12 and 13 respectively to be each converted into a digital video signal. Digital video signals resulting from the A/D conversion are then supplied to a frame-memory unit 14 to be stored therein. The frame-memory unit 14 comprises a luminance-signal frame memory 15 for storing the luminance signal and a color-difference signal frame memory 16 for storing the color-difference signal.

A format converting circuit 17 converts the frame-format signals stored in the frame-memory unit 14 into a block-format signal as shown in FIGS. 6A to 6C. To put it in detail, a video signal is stored in the frame-memory unit 14 as data of the frame format shown in FIG. 6A. As shown in FIG. 6A, the frame format is a collection of V lines each comprising H dots. The format converting circuit 17 divides the signal of one frame into N slices each comprising 16 lines as shown in FIG. 6B. Each slice is then divided into M pieces of macroblocks as shown in FIG. 6B. As shown in FIG. 6C, a macroblock includes a luminance signal Y corresponding to 16×16 pixels (dots). The luminance signal Y is further divided into blocks Y[1] to Y[4] each comprising 8×8 dots. The 16×16-dot luminance signal is associated with a 8×8-dot Cb signal and, a 8×8-dot Cr signal.

The data with the block format obtained as a result of the format conversion carried out by the format converting circuit 17 as described above is supplied to an encoder 18 for encoding the data. The configuration of the encoder 18 will be described later in detail by referring to FIG. 7.

A signal obtained as a result of the encoding carried out by the encoder 18 is output to a transmission line as a bitstream. Typically, the encoded signal is supplied to a recording circuit 19 for recording the encoded signal onto a recording medium 3 used as a transmission line as a digital signal.

A playback circuit 30 employed in the signal decoding apparatus 2 reproduces data from the recording medium 3, supplying the data to a decoder 31 of the decoding apparatus for decoding the data. The configuration of the decoder 31 will be described later in detail by referring to FIG. 12.

Data obtained as a result of the decoding carried out by the decoder 31 is supplied to a format converting circuit 32 for converting the block format of the data back into a frame format. Then, a luminance signal having a frame format is supplied to a luminance-signal frame memory 34 of a frame-memory unit 33 to be stored therein. On the other hand, a color-difference signal having a frame format is supplied to a color-difference-signal frame memory 35 of the frame-memory unit 33 to be stored therein. The luminance signal is read back from the luminance-signal frame memory 34 and supplied to a D/A converter 36. On the other hand, the color-difference signal is read back from the color-difference-signal frame memory 35 and supplied to a D/A converter 37. The D/A converters 36 and 37 convert the signals into analog signals which are then supplied to a post-processing circuit 38 for synthesizing the luminance and color-difference signals and generating a synthesized output.

Next, the configuration of the encoder 18 is described by referring to FIG. 7. Picture data to be encoded is supplied to a motion-vector detecting circuit 50 in macroblock units. The motion-vector detecting circuit 50 processes picture data of each frame as an I-, P- or B-picture in accordance with a predetermined sequence set in advance. To be more specific, picture data of a GOP typically comprising frames the F1 to F17 as shown in FIGS. 2 and 3 is processed as a sequence of I-, B-, P-, B-, P-, - - -, B- and P-pictures.

Picture data of a frame to be processed by the motion-vector detecting circuit 50 as an I-picture such as the frame F1 shown in FIG. 3 is supplied to a forward-source-picture area 51a of a frame-memory unit 51 to be stored therein. Picture data of a frame to be processed by the motion-vector detecting circuit 50 as a P-picture such as the frame F2 is supplied to a referenced-source-picture area 51b of the frame-memory unit 51 to be stored therein. Picture data of a frame processed by the motion-vector detecting circuit 50 as a P-picture such as the frame F3 is supplied to a backward-source-picture area 51c of the frame-memory unit 51 to be stored therein.

When picture data of the next two frames such as the frame F4 or F5 are supplied sequentially to the motion-vector detecting circuit 50 to be processed as B and P-pictures respectively, the areas 51a, 51b and 51c are updated as follows. When picture data of the frame F4 is processed by the motion-vector detecting circuit 50, the picture data of the frame F3 stored in the backward-source-picture area 51c is transferred to the forward-source-picture area 51a, overwriting the picture data of the frame F1 stored earlier in the source-picture area 51b. The processed picture data of the frame F4 is stored in the referenced-source-picture area 51b, overwriting the picture data on the frame F2 stored earlier in the referenced-source-picture area 51b. Then, the processed picture data of the frame F5 is stored in the backward-source-picture area 51c, overwriting the picture data of the frame F3 which has been transferred to the forward-source-picture area 51a any way. The operations described above are repeated to process the subsequent frames of the GOP.

Signals of each picture stored in the frame-memory unit 51 are read out by a prediction-mode switching circuit 52 to undergo a preparatory operation for a frame-prediction mode or a field-prediction mode, that is, the type of processing to be carried out by a processing unit 53.

Then, in either the frame-prediction mode or the field-prediction mode, the signals are subjected to computing to obtain intra-picture prediction encoding, such as, forward, backward and forward & backward prediction under control executed by an intra-picture-processing/forward/backward/forward & backward prediction determining circuit 54. The type of processing carried out in the processing unit 53 is determined in accordance with a prediction-error signal representing a difference between a referenced picture and a prediction picture for the referenced picture. A referenced picture is a picture subjected to the processing and a prediction picture is a picture preceding or succeeding the referenced picture. For this reason, the motion-vector detecting circuit 50 (strictly speaking, the prediction-mode switching circuit 52 employed in the vector detecting circuit 50 as will be described later) generates a sum of the absolute values of prediction-error signals for use in determination of the type of processing carried out by the processing unit 53. In place of a sum of the absolute values of prediction-error signals, a sum of the squares of prediction-error signals can also be used for such determination.

The prediction-mode switching circuit 52 carries out the following preparatory operation for processing to be carried out by the processing unit 53 in the frame prediction mode and the field prediction mode.

The prediction-mode switching circuit 52 receives four luminance blocks [Y1] to [Y4] supplied thereto, by the motion-vector detecting circuit 50. In each block, data of lines of odd fields is mixed with data of lines of even fields as shown in FIG. 8. The data may be passed on to the processing unit 53 as it is. Processing of data with a configuration shown in FIG. 8 to be performed by the processing unit 53 is referred to as processing in the frame-prediction mode wherein prediction processing is carried out for each macroblock comprising the four luminance blocks and a motion vector corresponds to four luminance blocks.

The prediction-mode switching circuit 52 then reconfigures the signal supplied by the motion-vector detecting circuit 50. In place of the signal with the configuration shown in FIG. 8, the signal with the configuration shown in FIG. 9 may be passed on to the processing unit 53. As shown in FIG. 9, the two luminance blocks [Y1] and [Y2] are each composed of typically only dots of lines of odd fields whereas the other two luminance blocks [Y3] and [Y4] are each composed of typically only dots of lines of even fields. Processing of data with the configuration shown in FIG. 9 to be carried out by the processing unit 53 is referred to as processing in the field-prediction mode wherein a motion vector corresponds to the two luminance blocks [Y1] and [Y2] whereas another motion vector corresponds to the other two luminance blocks [Y3] and [Y4].

The prediction-mode switching circuit 52 selects the data with the configuration shown in FIG. 8 or FIG. 9 to be supplied to the processing unit 53 as follows. The prediction-mode switching circuit 52 computes a sum of the absolute values of prediction errors computed for the frame-prediction mode, that is, for the data supplied by the motion-vector detecting circuit 50 with the configuration shown in FIG. 8, and a sum of the absolute values of prediction errors computed for the field-prediction mode, that is, for the data with the configuration shown in FIG. 9 obtained as a result of conversion of the data with the configuration shown in FIG. 8. It should be noted that the prediction errors will be described in detail later. The prediction-mode switching circuit 52 then compares the sum of the absolute values of prediction errors computed for data in order to determine which mode produces the smaller sum. Then, the prediction-mode switching circuit 52 selects either one of the configuration shown in FIG. 8 or FIG. 9 for the frame-prediction mode or the field-prediction mode respectively that produces the smaller sum. The prediction-mode switching circuit 52 finally outputs data with the selected configuration to the processing unit 53 for processing the data in the mode corresponding to the selected configuration.

It should be noted that, in actuality, the prediction-mode switching circuit 52 is included in the motion-vector detecting circuit 50. That is to say, the preparation of data with the configuration shown in FIG. 9, the computation of the absolute values, the comparison of the absolute values, the selection of the data configuration and the operation to output data with the selected configuration to the processing unit 53 are all carried out by the motion-vector detecting circuit 50 and the prediction-mode switching circuit 52 merely outputs the signal supplied by the motion-vector detecting circuit 50 to the later stage of processing unit 53.

It should be noted that, in the frame-prediction mode, a color-difference signal is supplied to the processing unit 53 with data of lines of odd fields mixed with data of lines of even fields as shown in FIG. 8. In the field-prediction mode shown in FIG. 9, on the other hand, four lines of the upper half of the color-difference block Cb are used as a color-difference signal of odd fields corresponding to the luminance blocks [Y1] and [Y2] while four lines of the lower half of the color-difference block Cb are used as a color-difference signal of even fields corresponding to the luminance blocks [Y3] and [Y4]. By the same token, four lines of the upper half of the color-difference block Cr are used as a color-difference signal of odd fields corresponding to the luminance blocks [Y1] and [Y2] while four lines of the lower half of the color-difference block Cr are used as a color-difference signal of even fields corresponding to the luminance blocks [Y3] and [Y4].

As described above, the motion-vector detecting circuit 50 outputs a sum of the absolute values of prediction errors to the prediction determining circuit 54 for use in determination of whether the processing unit 53 should carry out intra-picture-prediction, forward prediction, backward prediction or forward & backward prediction.

To put it in detail, a sum of the absolute values of prediction errors in intra-picture prediction is found as follows. For the intra-picture prediction, the motion-vector detecting circuit 50 computes a difference between the absolute value $|Aij|$ of a sum $Aij$ of signals $Aij$ of macroblocks of a referenced picture and a sum $|Aij|$ of the absolute values $|Aij|$ of the signals $Aij$ of the macroblocks of the same referenced picture. For the forward prediction, the sum of the absolute values of prediction errors is a sum $|A\ ij-Bij|$ of the absolute values $|Aij-Bij|$ of differences $(Aij-Bij)$ between signals $Aij$ of macroblocks of a referenced picture and signals $Bij$ of macroblocks of a forward-prediction picture or a preceding picture. The sum of the absolute values of prediction errors for the backward prediction is found in the same way as that for the forward prediction, except that the prediction picture used in the backward prediction is a backward-prediction picture or a succeeding picture. As for the forward & backward prediction, averages of signals $Bij$ of macroblocks of both the forward-prediction picture and the backward-prediction picture are used in the computation of the sum.

The sum of the absolute values of prediction errors for each technique of prediction is supplied to the prediction determining circuit 54 which selects the forward prediction, the backward prediction or the forward & backward prediction with a smallest sum as a sum of absolute value of prediction error for an inter-picture prediction. The prediction determining circuit 54 further compares the smallest sum with the sum for the intra-picture prediction and selects either the inter-picture prediction or the intra-picture prediction with the much smaller sum as a prediction mode of processing to be carried out by the processing unit 53. To be more specific, if the sum for the intra-picture prediction is found smaller than the smallest sum for the inter-picture prediction, the prediction determining circuit 54 selects the intra-picture prediction as a type of processing to be carried out by the processing unit 53. If the smallest sum for the inter-picture prediction is found smaller than the sum for the intra-picture prediction, on the other hand, the prediction determining circuit 54 selects the inter-picture prediction as a type of processing to be carried out by the processing unit 53. As described above, the inter-picture prediction represents the forward prediction, the backward prediction or the forward & backward prediction selected as a prediction mode of processing with the smallest sum. The prediction mode is determined for each picture (or frame) while the frame-prediction or field-prediction mode is determined for each group of pictures.

As described above, the motion-vector detecting circuit 50 outputs signals of macroblocks of a referenced picture for either the frame-prediction mode or the field-prediction mode selected by the prediction-mode switching circuit 52 to the processing unit 53 by way of the prediction-mode switching circuit 52. At the same time, the motion-vector detecting circuit 50 also detects a motion vector between a referenced picture and a prediction picture for one of the four prediction modes selected by the prediction determining circuit 54. The motion-vector detecting circuit 50 then outputs the motion vector to a variable-length-encoding circuit 58 and a motion-compensation circuit 64. In this way, the motion-vector detecting circuit 50 outputs a motion vector that corresponds to the minimum sum of the absolute values of prediction errors for the selected prediction mode as described earlier.

While the motion-vector detecting circuit 50 is reading out picture data of an I-picture, the first frame of a GOP, from the forward source picture area 51a, the prediction determining circuit 54 sets the intra-picture prediction, strictly speaking, the intra-frame or intra-field prediction, as a prediction mode, setting a switch 53d employed in the processing unit 53 at a contact point a. With the switch 53d set at this position, the data of the I-picture is supplied to a DCT-mode switching circuit 55. As will be described later, the intra-picture prediction mode is a mode in which no motion compensation is carried out.

The DCT-mode switching circuit 55 receives the data passed on thereto by the switch 53d from the prediction-mode switching circuit 52 in a mixed state or a frame-DCT mode shown FIG. 10. The DCT-mode switching circuit 55 then converts the data into a separated state or a field-DCT mode shown in FIG. 11. In the frame-DCT mode, the data of lines of odd and even fields are mixed in each of the four luminance blocks. In the field-DCT mode, on the other hand, lines of odd fields are put in two of the four luminance blocks while lines of even fields are put in the other two blocks. The data of the I-picture in either the mixed or separated state will be supplied to a DCT circuit 56.

Before supplying the data to the DCT circuit 56, the DCT-mode switching circuit 55 compares the encoding efficiency of DCT processing of the data with the lines of odd and even fields mixed with each other with the encoding efficiency of DCT processing of the data with the lines of odd and even fields separated from each other to select the data with a higher efficiency. The frame-DCT mode or the field-DCT mode corresponding to the selected data is determined as the DCT mode.

The encoding efficiencies are compared with each other as follows. In the case of the data with the lines of odd and even fields mixed with each other as shown in FIG. 10, a difference between the signal of a line of an even field and the signal of a line of an odd field vertically adjacent to the even field is computed. Then, the sum or the square of the absolute value of the difference is found. Finally, the sum of the absolute values or the squares of differences between two adjacent even and odd fields is calculated.

In the case of the data with the lines of odd and even fields separated from each other as shown in FIG. 11, a difference between the signals of lines of vertically adjacent even fields and a difference between the signals of lines of vertically adjacent odd fields are computed. Then, the sum or the square of the absolute value of each difference is found. Finally, the sum of the absolute values or the squares of all differences between two adjacent even fields and two adjacent odd fields is calculated.

The sum calculated for the data shown in FIG. 10 is compared with the sum calculated for the data shown in FIG. 11 to select a DCT mode. To be more specific, if the former is found smaller than the latter, the frame-DCT mode is selected. If the latter is found smaller than the former, on the other hand, the field-DCT mode is selected.

Finally, the data with a configuration corresponding to the selected DCT mode is supplied to the DCT circuit 56, and at the same time, a DCT flag used for indicating the selected DCT mode is supplied to the variable-length-encoding circuit 58 and the motion-compensation circuit 64.

Comparison of the frame-prediction and field-prediction modes of FIGS. 8 and 9 determined by the prediction-mode switching circuit 52 with the DCT modes of FIGS. 10 and 11 determined by the DCT-mode switching circuit 55 clearly indicates that the data structures of the frame-prediction and field-prediction modes are substantially the same as the data structures of the frame-DCT mode and field-DCT modes respectively with regards to the luminous block.

If the prediction-mode switching circuit 52 selects the frame-prediction mode in which odd and even lines are mixed with each other, it is quite within the bounds of possibility that the DCT-mode switching circuit 55 also selects the frame-DCT prediction mode with odd and even lines mixed. If the prediction-mode switching circuit 52 selects the field-prediction mode in which odd and even fields are separated from each other, it is quite within the bounds of possibility that the DCT-mode switching circuit 55 also selects the field-DCT mode with the data of odd and even fields separated.

It should be noted, however, that a selected DCT-mode does not always correspond to a selected prediction mode. In any circumstances, the prediction-mode switching circuit 52 selects a frame-prediction or field-prediction mode that provides a smaller sum of the absolute values of prediction errors and the DCT-mode switching circuit 55 selects a DCT mode giving a better encoding efficiency.

As described above, the data of the I-picture is output by the DCT-mode switching circuit 55 to the DCT circuit 56. The DCT circuit 56 then carries out DCT processing on the data for conversion into DCT coefficients which are then supplied to a quantization circuit 57. The quantization circuit 57 then carries out a quantization process at a quantization scale adjusted to the amount of data stored in a transmission buffer 59 which is fed back to the quantization circuit 57 as will be described later. The data of the I-picture completing the quantization process is then supplied to a variable-length-encoding circuit 58.

The variable-length-encoding circuit 58 receives the data of the I-picture supplied from the quantization circuit 57, converting the picture data into variable-length code such as the Huffman code, at the quantization scale supplied thereto also by the quantization circuit 57. The variable-length code is then stored in the transmission buffer 59.

In addition to the picture data and the quantization scale supplied by the quantization circuit 57, the variable-length-encoding circuit 58 also receives information on a prediction mode from the prediction determining circuit 54, a motion vector from the motion-vector detecting circuit 50, a prediction flag from the prediction-mode switching circuit 52 and a DCT flag from the DCT-mode switching circuit 55. The information on a prediction mode indicates which type of processing is carried out by the processing unit among intra-picture encoding, forward-prediction encoding, backward-prediction encoding or forward & backward-prediction encoding. The prediction flag indicates that data supplied from the prediction-mode switching circuit 52 to the processing unit 53 is whether in the frame-prediction mode or field-prediction mode. The DCT flag indicates that data supplied from the DCT-mode switching circuit 55 to the DCT circuit 56 is set whether in the frame-DCT or field-DCT mode.

The transmission buffer 59 temporarily stores input data, feeding the amount of the data stored therein back to the quantization circuit 57. When the amount of data stored in the transmission buffer 59 exceeds an upper limit of an allowable range, the quantization control signal increases the quantization scale of the quantization circuit 57 to reduce the amount of data obtained as a result of the quantization. When the amount of data stored in the transmission buffer 59 becomes smaller than a lower limit of the allowable range, on the other hand, the quantization control signal decreases the quantization scale of the quantization circuit 57 to raise the amount of data obtained as a result of the quantization. In this way, an overflow and an underflow can be prevented from occurring in the transmission buffer 59.

Then, the data stored in the transmission buffer 59 is read back at predetermined timing to be supplied to the recording circuit 19 for recording the data onto the recording medium 3 which serves as a transmission line.

The data of the I-picture and the quantization scale output by the quantization circuit 57 are supplied also to an inverse-quantization circuit 60 for carrying out inverse quantization on the data at an inverse-quantization scale corresponding to the quantization scale. Data output by the inverse-quantization circuit 60 is then supplied to an IDCT (Inverse Discrete Cosine Transform) circuit 61 for carrying out inverse discrete cosine transformation. Finally, data output by the IDCT circuit 61 is supplied to a frame-memory unit 63 by way of a processor 62 to be stored in a forward-prediction picture area 63a of the frame-memory unit 63.

A GOP supplied to the motion-picture detecting circuit 50 to be processed thereby comprises a sequence of pictures I-, B-, P-, B-, P-, B-, etc. In this case, after processing data of the first frame as an I-picture as described above, data of the third frame is processed as a P-picture prior to processing of data of the second frame as a B-picture. This is because a B-picture may be subjected to backward prediction which involves the succeeding P-picture and backward prediction can not be carried out unless the succeeding P-picture has been processed in advance. It should be noted that the data of the I-picture is transferred from the prediction-mode switching circuit 52 to the processing unit 53 in the format for the frame-prediction or field-prediction mode set by the prediction-mode switching circuit 52 for the GOP and always processed by the processing unit 53 in the intra-frame prediction mode as described earlier.

For the reason described above, after processing data of the first frame as an I-picture, the motion-picture detecting circuit 50 starts-processing of the P-picture which has been stored in the backward-source-picture area 51c. Then, the prediction-mode switching circuit 52 computes a sum of the absolute values of differences between frames or prediction errors for data of the P-picture supplied thereto by the motion-vector detecting circuit 50 with the macroblock taken as a unit for each prediction mode and supplies the sum to the prediction determining circuit 54 as described above. The data of the P-picture itself is transferred to the processing unit 53 in the format for the frame-prediction or field-prediction mode which has been set by the prediction-mode switching circuit 52 for the GOP of the P-picture when the I-picture of the first frame of the GOP was input. On the other hand, the prediction determining circuit 54 determines the prediction mode in which the data of the P-picture is to be processed by the processing unit 53, that is, selects either the intra-picture, forward, backward or forward & backward prediction as the type of processing to be carried out by the processing unit 53 on the data of the P-picture on the basis of the sum of the absolute values of prediction errors computed by the prediction-error switching circuit 52 for each prediction mode. Strictly speaking, in the case of a P-picture, the type of processing can be the intra-picture or forward-prediction mode as described above.

In the first place, in the intra-picture prediction mode, the processing unit 53 sets the switch 53*d* at the contact point a. Thus, the data of the P-picture is transferred to the transmission line by way of the DCT-mode switching circuit 55, the DCT circuit 56, the quantization circuit 57, the variable-length-encoding circuit 58 and the transmission buffer 59 as is the case with an I-picture. The data of the P-picture is also supplied to the frame-memory unit 63 to be stored in the backward-prediction picture area 63*b* thereof by way of the quantization circuit 57, the inverse-quantization circuit 60, the IDCT circuit 61 and the processor 62.

In the second place, in the forward-prediction mode, the processing unit 53 sets the switch 53*d* at a contact point b and the motion-compensation circuit 64 reads out data from the forward-prediction picture area 63*a* of the frame-memory unit 63, carrying out motion compensation on the data in accordance with a motion vector supplied to the motion-compensation circuit 64 by the motion-vector detecting circuit 50. In this case, the data stored in the forward-prediction picture area 63*a* is the data of the I-picture. That is to say, informed of the forward-prediction mode by the prediction determining circuit 54, the motion-compensation circuit 64 generates data of a forward-prediction picture data by reading the data of the I-picture from a read address in the forward-prediction picture area 63*a*. The read address is a position shifted away from the position of a macroblock currently output by the motion-vector detecting circuit 50 by a distance corresponding to the motion vector.

The data of the forward-prediction picture read out by the motion-compensation circuit 64 is associated with the data of the referenced picture, that is, the P-picture, and supplied to a processor 53*a* employed in the processing unit 53. The processor 53*a* subtracts the data of the forward-prediction picture, that is, the I-picture, supplied by the motion-compensation circuit 64 from the data of macroblocks of the referenced picture supplied by the prediction-mode switching circuit 52 to find a difference or an error in prediction. The difference data is transferred to the transmission line by way of the DCT-mode switching circuit 55, the DCT circuit 56, the quantization circuit 57, the variable-length-encoding circuit 58 and the transmission buffer 59. The difference data is also locally decoded by the inverse-quantization circuit 60 and the IDCT circuit 61 and a result obtained from the local decoding is supplied to the processor 62.

The data of the forward-prediction picture supplied to the processor 53*a* by the motion-compensation circuit 64 is also fed to the processor 62. In the processor 62, the data of the forward-prediction picture is added to the difference data output by the IDCT circuit 61 in order to produce the data of the original P-picture. The data of the original P-picture is then stored in the backward-prediction picture area 63*b* of the frame-memory unit 63.

After the pieces of data of the I-picture and the P-picture have been stored in the forward-prediction picture area 63*a* and the backward-prediction picture area 63*b* of the frame-memory unit 63 respectively as described above, the processing of the second frame of the B-picture is started by the motion-vector detecting circuit 50. The B-picture is processed by the prediction-mode switching circuit 52 in the same way as the P-picture described above except that, in the case of the B-picture, the type of processing determined by the prediction determining circuit 54 can be the backward-prediction mode or the forward & backward-prediction mode in addition to the intra-picture prediction mode or the forward-prediction mode.

In the case of the intra-picture prediction-mode or the forward-prediction mode, the switch 53*d* is set at the contact point a or b respectively as described above as is the case with the P-picture. In this case, data of the B-picture output by the prediction-mode switching circuit 52 is processed and transferred in the same way as the P-picture described above.

In the case of the backward-prediction mode or the forward & backward-prediction mode, on the other hand, the switch 53*d* is set at a contact point c or d respectively.

In the backward-prediction mode wherein the switch 53*d* is set at the contact point c, the motion-compensation circuit 64 reads out data from the backward-prediction picture area 63*b* of the frame-memory unit 63, carrying out motion compensation on the data in accordance with a motion vector supplied to the motion-compensation circuit 64 by the motion-vector detecting circuit 50. In this case, the data stored in the backward-prediction picture area 63*b* is the data of the P-picture. That is to say, informed of the backward-prediction mode by the prediction determining circuit 54, the motion-compensation circuit 64 generates data of a backward-prediction picture by reading the data of the P-picture from a read address in the backward-prediction picture area 63*b*. The read address is a position shifted away from the position of a macroblock currently output by the motion-vector detecting circuit 50 by a distance corresponding to the motion vector.

The data of the backward-prediction picture read out by the motion-compensation circuit 64 is associated with the data of a referenced picture, that is, the B-picture, and supplied to a processor 53*b* employed in the processing unit 53. The processor 53*b* subtracts the data of the backward-prediction picture, that is, the P-picture, supplied by the motion-compensation circuit 64 from the data of macroblocks of the referenced picture supplied by the prediction-mode switching circuit 52 to find a difference or an error in prediction. The difference data is transferred to the transmission line by way of the DCT-mode switching circuit 55, the DCT circuit 56, the quantization circuit 57, the variable-length-encoding circuit 58 and the transmission buffer 59.

In the forward & backward-prediction mode wherein the switch 53*d* is set at the contact point d, on the other hand, the motion-compensation circuit 64 reads out the data of the I-picture, in this case, from the forward-prediction picture area 63*a* of the frame-memory unit 63 and the data of the P-picture from the backward-prediction picture area 63*b*, carrying out motion compensation on the data in accordance with motion vectors supplied to the motion-compensation circuit 64 by the motion-vector detecting circuit 50.

That is to say, informed of the forward & backward-prediction mode by the prediction determining circuit 54, the motion-compensation circuit 64 generates data of forward & backward-prediction pictures by reading the data of the I- and P-pictures from read addresses in the forward-prediction picture area 63*a* and the backward-prediction picture area 63*b* respectively. The read addresses are positions shifted away from the position of a macroblock currently output by the motion-vector detecting circuit 50 by distances corresponding to the motion vectors. In this case, there are 2 motion vectors, namely, motion vectors for the forward & backward-prediction pictures.

The data of the forward & backward-prediction pictures read out by the motion-compensation circuit 64 is associated with the data of the referenced picture and supplied to a processor 53*c* employed in the processing unit 53. The processor 53*c* subtracts the data of the prediction pictures supplied by the motion-compensation circuit 64 from the data of macroblocks of the referenced picture supplied by the prediction-mode switching circuit 52 employed in the motion-vector detecting circuit 50 to find a difference or an error in prediction. The difference data is transferred to the transmission line by way of the DCT-mode switching circuit 55, the DCT circuit 56, the quantization circuit 57, the variable-length-encoding circuit 58 and the transmission buffer 59.

Never used as a prediction picture for another frame, a B-picture is not stored in the frame-memory unit 63.

It should be noted that, typically, the forward-prediction picture area 63*a* and the backward-prediction picture area 63*b* of the frame-memory unit 63 are implemented as memory banks which can be switched from one to another. Thus, in an operation to read a forward-prediction picture, the frame-memory unit 63 is set to the forward-prediction picture area 63*a*. In an operation to read a backward-prediction picture, on the other hand, the frame-memory unit 63 is set to the backward-prediction picture area 63*b*.

While the above description is focused on luminance blocks, the color-difference blocks are also processed and transferred in macroblock units shown in FIGS. 8 to 11 in the same way as the luminance blocks. It should be noted that, as a motion vector in the processing of the color-difference blocks, components of the motion vector of the luminance blocks associated with the color-difference blocks in the vertical and horizontal directions are used with their magnitudes each cut in half.

FIG. 12 is a block diagram showing the configuration of the decoder 31 employed in the moving-picture encoding/decoding apparatus shown in FIG. 5. Encoded picture data transmitted through the transmission line implemented by the recording medium 3 is received by the decoder 31, by way of the playback circuit 30 of the moving-picture encoding/decoding apparatus and then stored temporarily in a reception buffer 81 employed in the decoder 31. Then, the picture data is supplied to a variable-length-decoding circuit 82 employed in a decoding circuit 90 of the decoder 31. The variable-length-decoding circuit 82 carries out variable-length decoding on the picture data read out from the reception buffer 81, outputting a motion vector, information on the prediction mode, a frame/field-prediction flag and a frame/field DCT-flag to a motion compensation-circuit 87 and a quantization scale as well as decoded picture data to an inverse-quantization circuit 83.

The inverse-quantization circuit 83 carries out inverse quantization on the picture data supplied thereto by the variable-length-decoding circuit 82 at the quantization scale also received from the variable-length-decoding circuit 82. The inverse-quantization circuit 83 outputs DCT coefficients data obtained as a result of the inverse quantization to an IDCT circuit 84 for carrying out IDCT (inverse discrete cosine transformation), supplying the result of the IDCT to a processor 85.

In the case of an I-picture, the picture data supplied to the processor 85 by the IDCT circuit 84 is output as it is, by the processor 85 to a frame-memory unit 86 to be stored in a forward-prediction picture area 86*a* of the frame-memory unit 86. The data of the I-picture stored in the forward-prediction picture area 86*a* will be used for generation of data of a forward-prediction picture for picture data of a P- or B-picture supplied to the processor 85 after the I-picture in the forward-prediction mode. The data of the I-picture is also output to a format converting circuit 32 employed in the moving-picture encoding/decoding apparatus shown in FIG. 5.

When the picture data supplied by the IDCT circuit 84 is the data of P-picture having the picture data leading ahead by one frame, that is, the picture data of the I-picture, is read out by the motion-compensation circuit 87 from the forward-prediction picture area 86*a* of the frame-memory unit 86. In the motion-compensation circuit 87, the picture data of the I-picture undergoes motion compensation for a motion vector supplied by the variable-length-decoding circuit 82. The picture data completing the motion compensation is then supplied to the processor 85 to be added to the picture data supplied by the IDCT circuit 84 which is actually difference data. The result of the addition, that is, data of the decoded P-picture is supplied to the frame-memory unit 86 to be stored in the backward-prediction picture area 86*b* of the frame-memory unit 86 as described above. The data of the P-picture stored in the backward-prediction picture area 86*b* will be used for generation of data of a backward-prediction picture for picture data of a B-picture supplied to the processor 85 thereafter in the backward-prediction mode.

On the other hand, picture data of a P-picture processed by the signal encoding apparatus 1 in the intra-frame prediction mode is output by the processor 85 as it is without undergoing any processing, to the backward-prediction picture area 86*b* as is the case with an I-picture.

Since the P-picture will be displayed after a B-picture to be processed after the P-picture, at this point of time, the P-picture is not output to the format converting circuit 32. Much like the encoder 18, the decoder 31 processes and transfers the P-picture prior to the B-picture even though the P-picture is received after the B-picture.

Picture data of a B-picture output by the IDCT circuit 84 is processed by the processor 85 in accordance with the information on the prediction mode supplied by the variable-length-decoding circuit 82. To be more specific, the processor 85 may output the picture data as it is in the intra-picture-prediction mode as is the case with the I-picture or process the picture data in the forward-prediction, backward-prediction or forward & backward-prediction mode. In the forward-prediction backward-prediction or forward & backward-prediction mode, the motion-compensation circuit 87 reads out the data of the I-picture stored in the forward-prediction picture area 86*a*, the data of the P-picture stored in the backward-prediction picture area 86*b* or the data of the I and P-pictures stored in the forward-prediction picture area 86*a* and the backward-prediction picture area 86*b* of the frame-memory unit 86 respectively. The motion-compensation circuit 87 then carries out motion compensation on the picture data read out from the frame-memory unit 86 in accordance with a motion vector output by the variable-length-decoding circuit 82 to produce a prediction picture. In the case of the intrapicture-prediction mode described above, no prediction picture is generated because no prediction picture is required by the processor 85.

The prediction picture experiencing the motion compensation in the motion-compensation circuit 87 is added by the processor 85 to the picture data of the B-picture, strictly speaking difference data, output by the IDCT circuit 84. Data output by the processor 85 is then supplied to the format converting circuit 32 as is the case with the I-picture.

Since the data output by the processor 85 is the picture data of a B-picture, however, the data is not required in generation of a prediction picture. Thus, the data output by the processor 85 is not stored in the frame-memory unit 86.

After the data of the B-picture has been output, the data of the P-picture is read out by the motion-compensation circuit 87 from the backward-prediction picture area 86*b* and supplied to the processor 85. This time, however, the data is not subjected to motion compensation since the data has experienced the motion compensation before being stored in the backward-prediction picture area 86*b*.

The decoder 31 does not include counterpart circuits of the prediction-mode switching circuit 52 and the DCT-mode switching circuit 55 employed in the encoder 18 shown in FIG. 5 because the counterpart processing, that is, processing to convert the signal formats with even and odd fields separated from each other as shown in FIGS. 9 and 11 back into the signal formats with even and odd fields mixed with each other as shown in FIGS. 8 and 10 respectively is carried out by the motion-compensation circuit 87.

While the above description is focused on luminance signals, the color-difference signals are also processed and transferred in macroblock units shown in FIGS. 8 to 11 in the same way as the luminance signals. It should be noted that, as a motion vector in the processing of the color-difference signals, components of the motion vector of the luminance signals associated with the color-difference blocks in the vertical and horizontal directions are used with their magnitudes each cut in half.

FIG. 13 is a diagram showing the quality of encoded pictures in terms of an SNR (Signal-to-Noise Ratio). As shown in the figure, the quality of a picture much depends on the type of the picture. To be more specific, transmitted I- and P-pictures have high qualities, but B-picture has poorer qualities respectively. Deliberate variations in picture quality shown in FIG. 13 is a sort of technique for making use of the human being's characteristic of the sense of sight. That is to say, by varying the quality, the quality appears better to the sense of sight than a case in which an average of all picture qualities is used. Control to vary the picture quality is executed by the quantization circuit 57 employed in the encoder 18 shown in FIG. 7.

Figure 15:
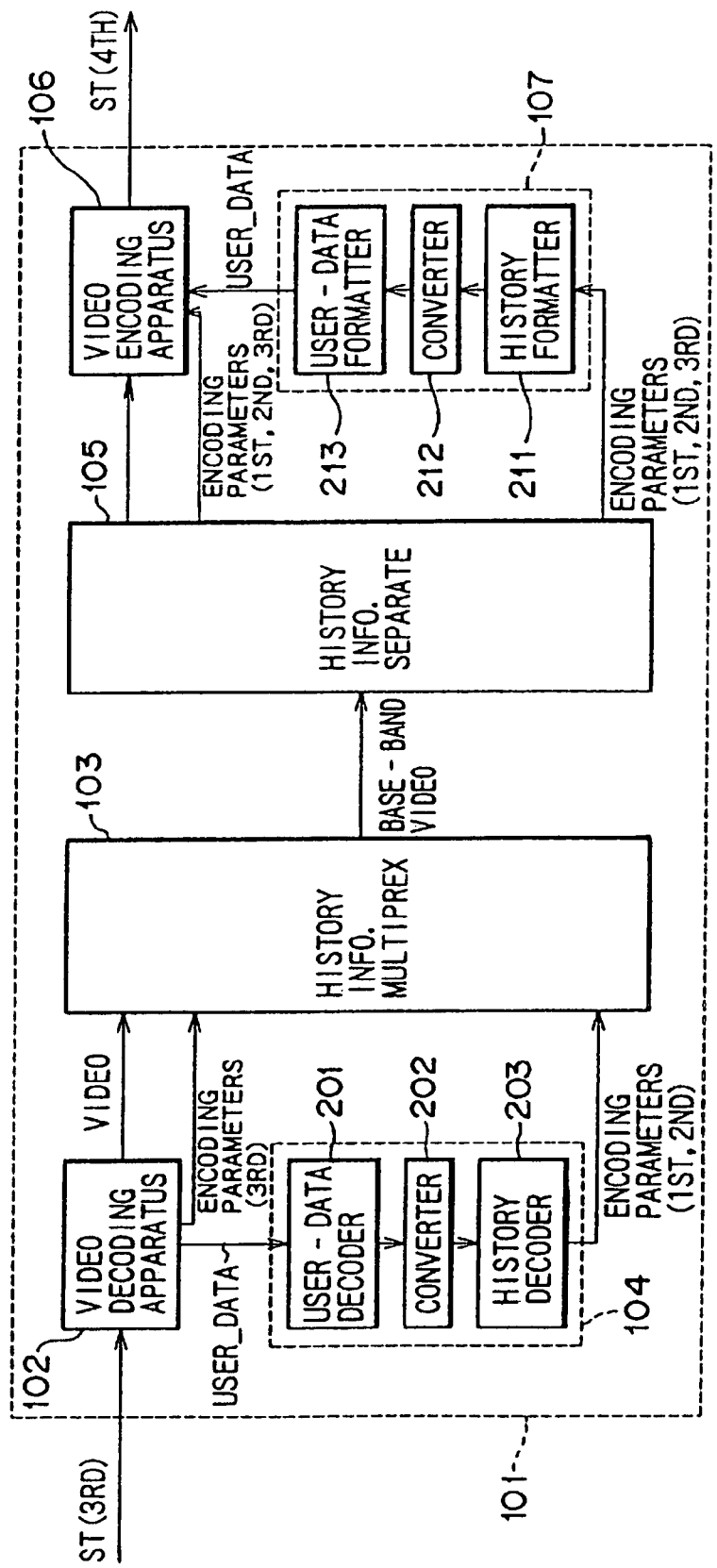
FIG. 15 is a block diagram showing a more detailed configuration of the transcoder 101 shown in FIG. 14.

FIGS. 14 and 15 are diagrams showing the configuration of the transcoder 101 provided by the present invention. FIG. 15 shows the configuration shown in FIG. 14 in more detail. The transcoder 101 converts the GOP structure and the bit rate of an encoded video bitstream supplied to the video decoding apparatus 102 into a GOP structure and a bit rate desired by the operator or specified by the host computer, respectively. The function of the transcoder 101 is explained by assuming that, in actuality, three other transcoders each having all but the same function as the transcoder 101 are connected at the front stage of the transcoder 101. In order to convert the GOP structure and the bit rate of bitstream into one of a variety of GOP structures and one of a variety of bit rates respectively, transcoders of the first, second and third generations are connected in series and the transcoder 101 of the fourth generation shown in FIG. 15 is connected behind the series connection of the transcoders of the first, second and third generation. It should be noted that the transcoders of the first, second and third generations themselves are not shown in FIG. 15.

In the following description of the present invention, an encoding process carried out by the transcoder of the first generation is referred to as an encoding process of the first generation and an encoding process carried out by the transcoder of the second generation connected after the transcoder of the first generation is referred to as an encoding process of the second generation. Likewise, an encoding process carried out by the transcoder of the third generation connected after the transcoder of the second generation is referred to as an encoding process of the third generation and an encoding process carried out by the fourth transcoder connected after the transcoder of the third generation, that is, the transcoder 101 shown in FIG. 15, is referred to as an encoding process of the fourth generation. In addition, encoding parameters used as well as obtained as a result of the encoding process of the first generation are referred to as encoding parameters of the first generation and encoding parameters used as well as obtained as a result of the encoding process of the second generation are referred to as encoding parameters of the second generation. Similarly, encoding parameters used as well as obtained as a result of the encoding process of the third generation are referred to as encoding parameters of the third generation and encoding parameters used as well as obtained as a result of the encoding process of the fourth generation are referred to as encoding parameters of the fourth generation or the current encoding parameters.

First, an encoded video-bitstream ST(3rd) of the third generation generated and supplied by the transcoder of the third generation to the transcoder 101 of the fourth generation shown in FIG. 15 is explained. The encoded video bitstream ST(3rd) of the third generation is an encoded video bitstream obtained as a result of the encoding process of the third generation carried out by the third transcoder provided at a stage preceding the transcoder 101 of the fourth generation. In the encoded video bitstream ST(3rd) of the third generation resulting from the encoding process of the third generation, the encoding parameters of the third generation generated in the encoding process of the third generation are described as a sequence_header( ) function, a sequence_extension( ) function, a group_of_pictures_header( ) function, a picture_header( ) function, a picture_coding_extension( ) function, a picture_data( ) function, a slice( ) function and a macroblock( ) function on a sequence layer, a GOP layer, a picture layer, a slice layer and a macroblock layer of the encoded video bitstream ST of the third generation, respectively. The fact that the encoding parameters of the third generation used in the encoding process of the third generation are described in the encoded video bitstream ST of the third generation resulting from the encoding process of the third generation conforms to MPEG2 standard and does not reveal any novelty whatsoever.

A point unique to the transcoder 101 provided by the present invention is not the fact that the encoding parameters of the third generation are described in the encoded video bitstream ST of the third generation, but the fact that the encoding parameters of the first and second generations obtained as results of the encoding processes of the first and second generations respectively are included in the encoded video bitstream ST of the third generation. The encoding parameters of the first and second generations are described as history_stream( ) in a user_data area of the picture layer of the encoded video bitstream ST of the third generation. In the present invention, the history stream described in a user_data area of the picture layer of the encoded video bitstream ST of the third generation is referred to as "history information" and the parameters described as a history stream are referred to as "history parameters". In another way of naming parameters, the encoding parameters of the third generation described in the encoded video bitstream ST of the third generation can also be referred to as current encoding parameters. In this case, the encoding-parameters of the first and second generations described as history_stream( ) in the user-data area of the picture layer of the encoded video bitstream ST of the third generation are referred to as "past encoding parameters" since the encoding processes of the first and second generations are each a process carried out in the past if viewed from the encoding process of the third generation.

The reason why the encoding parameters of the first and second generations obtained as results of the encoding processes of the first and second generations respectively are also described in the encoded video bitstream ST(3rd) of the third generation in addition to the encoding parameters of the third generation as described above is to avoid deterioration of the picture quality, even if the GOP structure and the bit rate of encoding stream are changed repeatedly in transcoding processes. For example, a picture may be encoded as a P-picture in the encoding process of the first generation and, in order to change the GOP structure of the encoded video bitstream of the first generation, the picture is encoded as a B-picture in the encoding process of the second generation. In order to further change the GOP structure of the encoded video bitstream of the second generation, the picture is again encoded as a P-picture in the encoding process of the third generation. Since conventional encoding and decoding processes based on the MPEG standard are not 100% reverse processed, the picture quality deteriorates each time encoding and decoding processes are carried out as is generally known. In such a case, encoding parameters such as the quantization scale, the motion vector and the prediction mode are not merely re-computed in the encoding process of the third generation. Instead, the encoding parameters such as the quantization scale, the motion vector and the prediction mode generated in the encoding process of the first generation are re-utilized. The encoding parameters such as the quantization scale, the motion vector and the prediction mode newly generated in the encoding process of the first generation obviously each have a precision higher than the counterpart encoding parameters newly generated in the encoding process of the third generation. Thus, by re-utilizing the encoding parameters generated in the encoding process of the first generation, it is possible to lower the degree to which the picture quality deteriorates even if the encoding and decoding processes are carried out repeatedly.

The processing according to the present invention described above is exemplified by explaining the decoding and encoding processes carried out by the transcoder 101 of the fourth generation shown in FIG. 15 in detail. The video decoding apparatus 102 decodes an encoded video signal included in the encoded video bitstream ST(3rd) of the third generation by using the encoding parameters of the third generation to generate decoded base-band digital video data. In addition, the video decoding apparatus 102 also decodes the encoding parameters of the first and second generations described as a history stream in the user-data area of the picture layer of the encoded video bitstream ST(3rd) of the third generation. The configuration and the operation of the video decoding apparatus 102 are described in detail by referring to FIG. 16 as follows.

Figure 16:
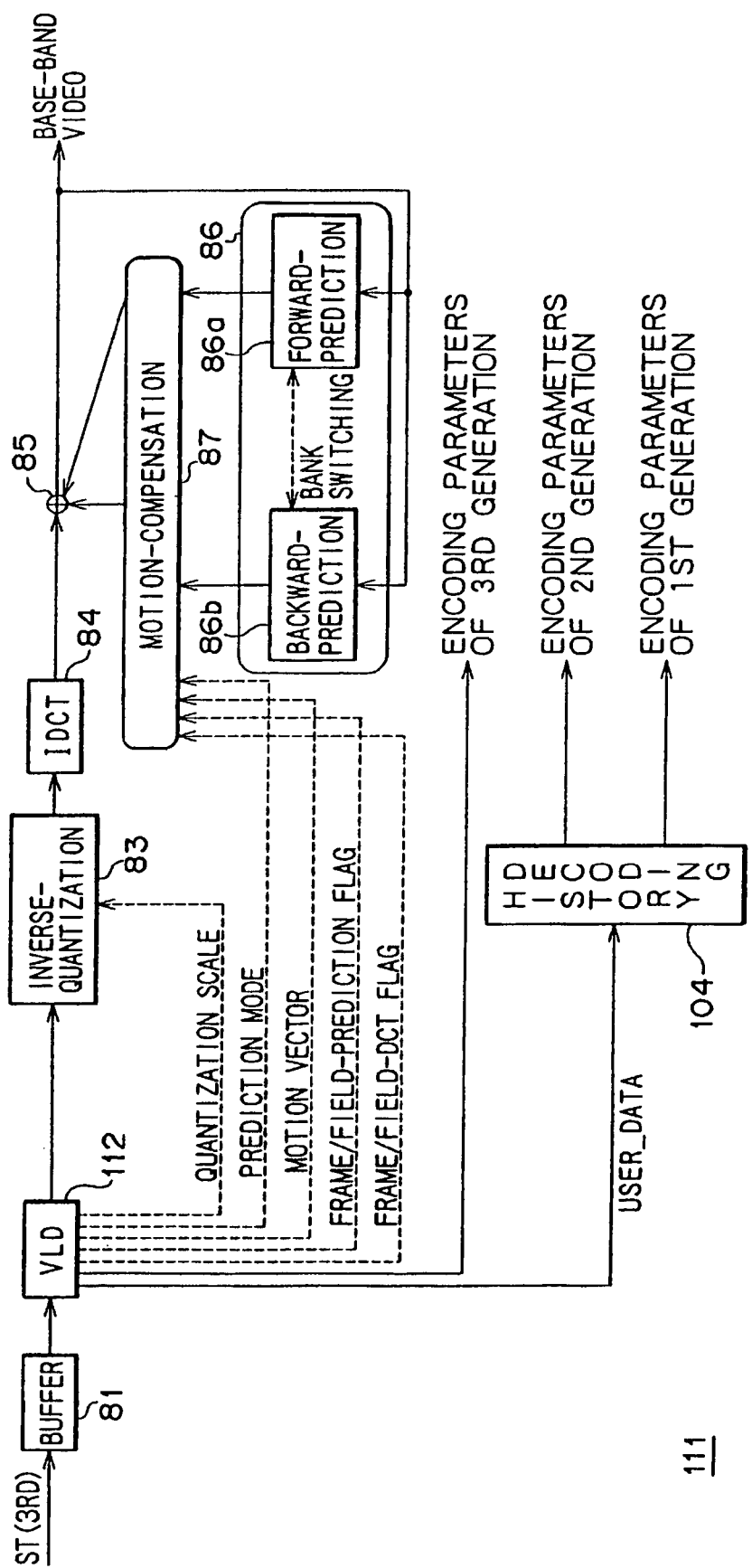
FIG. 16 is a block diagram showing the configuration of a decoder 111 employed in a decoding apparatus 102 of the transcoder 101 shown in FIG. 14.

FIG. 16 is a diagram showing a detailed configuration of the video decoding apparatus 102. As shown in the figure, the video decoding apparatus 102 comprises a buffer 81 for buffering a supplied encoded bitstream, a variable-length decoding circuit 112 for carrying out a variable-length decoding process on the encoded bitstream, an inverse-quantization circuit 83 for carrying out inverse quantization on data completing the variable-length decoding process in accordance with a quantization scale supplied by the variable-length decoding circuit 112, an IDCT circuit 84 for carrying out inverse discrete cosine transformation on DCT coefficients completing the inverse quantization, a processor 85 for carrying out motion compensation processing, a frame-memory unit 86 and a motion-compensation circuit 87.

In order to decode the encoded video bitstream ST(3rd) of the third generation, the variable-length decoding circuit 112 extracts the encoding parameters of the third generation described on the picture layer, the slice layer and the macroblock layers of the encoded video bitstream ST(3rd) of the third generation. Typically, the encoding parameters of the third generation extracted by the variable-length decoding circuit 112 include picture_coding_type representing the type of the picture, quantiser_scale_code representing the size of the quantization-scale step, macrobloc_type representing the prediction mode, motion_vector representing the motion vector, frame/field_motion_type indicating a frame prediction mode or a field prediction mode and dct_type indicating a frame-DCT mode or a field-DCT mode. The quantiser_scale_code encoding parameter is supplied to the inverse-quantization circuit 83. On the other hand, the rest of the encoding parameters such as picture_coding_type, quantiser_scale_code, macroblock_type, motion_vector, frame/field_motion_type and dct_type are supplied to the motion-compensation circuit 87.

The variable-length decoding circuit 112 extracts not only the above mentioned encoding parameters required for decoding the encoded video bitstream ST(3rd) of the third generation, but all other encoding parameters of the third generation to be transmitted to a transcoder of the fifth generation connected behind the transcoder 101 shown in FIG. 15 as history information of the third generation from the sequence layer, the GOP layer, the picture layer, the slice layer and the macroblock layer of the encoded video bitstream ST(3rd) of the third generation. It is needless to say that the above encoding parameters of the third generation such as picture_coding_type, quantiser_scale_code, macrobloc_type, motion_vector, frame/field_motion_type and dct_type used in the process of the third generation as described above are also included in the history information of the third generation. The operator or the host computer determines in advance what encoding parameters are to be extracted as history information in accordance with the transmission capacity.

In addition, the variable-length decoding circuit 112 also extracts user data described in the user-data area of the picture layer of the encoded video bitstream ST(3rd) of the third generation, supplying the user data to the history decoding apparatus 104.

The history decoding apparatus 104 extracts the encoding parameters of the first and second generations described as history information from the user data extracted from the picture layer of the encoded video bitstream ST(3rd) of the third generation. To put it concretely, by analyzing the syntax of the user data received from the variable-length decoding circuit 112, the history decoding apparatus 104 is capable of detecting unique History_Data_Id described in the user data and using it for extracting converted_history_stream( ). Then, by fetching 1-bit marker bits (marker_bit) inserted into converted_history_stream( ) at predetermined intervals, the history decoding apparatus 104 is capable of acquiring history_stream( ). By analyzing the syntax of history_stream( ), the history decoding apparatus 104 is capable of extracting the encoding parameters of the first and second generations recorded in history_stream( ). The configuration and the operation of the history decoding apparatus 104 will be described in detail later.

In order to eventually supply the encoding parameters of the first, second and third generations to the video encoding apparatus 106 for carrying out the encoding process of the fourth generation, the history information multiplexing apparatus 103 multiplexes the encoding parameters of the first, second and third generations in base-band video data decoded by the video decoding apparatus 102. The history information multiplexing apparatus 103 receives the base-band video data from the video decoding apparatus 102, the encoding parameters of the third generation from the variable-length decoding circuit 112 employed in the video decoding apparatus 102 and the encoding parameters of the first as well as second generations from the history decoding apparatus 104, multiplexing the encoding parameters of the first, second and third generations in base-band video data. The base-band video data with the encoding parameters of the first, second and third generations multiplexed therein is then supplied to the history information separating apparatus 105.

Next, a technique of multiplexing the encoding parameters of the first, second and third generations in the base-band video data is explained by referring to FIGS. 17 and 18. FIG. 17 is a diagram showing a macroblock composed of a luminance-signal portion and a color-difference-signal portion with the portions each comprising 16 pixels 16 pixels as defined in accordance with MPEG standard. One of the portions comprising 16 pixels 16 pixels is composed of 4 sub-blocks Y[0], Y[1], Y[2] and Y[3] for the luminance signal whereas the other portion is composed of 4 sub-blocks Cr[0], Cr[1], Cb[0] and Cb[1] for the color-difference signal. The sub-blocks Y[0], Y[1], Y[2] and Y[3] and the sub-blocks Cr[0], Cr[1], Cb[0] and Cb[1] each comprise 8 pixels 8 pixels.

FIG. 18 is a diagram showing a format of video data. Defined in accordance with an RDT601 recommended by ITU, the format represents the so-called D1 format used in the broadcasting industry. Since the D1 format is standardized as a format for transmitting video data, 1 pixel of video data is expressed by 10 bits.

Base-band video data decoded in conformity with the MPEG standard is 8 bits in length. In the transcoder provided by the present invention, base-band video data decoded in conformity with the MPEG standard is transmitted by using the 8 high-order bits D9 to D2 of the 10-bit D1 format as shown in FIG. 18. Therefore, the 8-bit decoded video data leaves 2 low-order bits D1 and D2 unallocated in the D1 format. The transcoder provided by the present invention utilizes an unallocated area comprising these unallocated bits for transmitting history information.

The data block shown in FIG. 18 is a data block for transmitting a pixel in the 8 sub-blocks of a macroblock. Since each sub-block actually comprises 64 (=8 8) pixels as described above, 64 data blocks each shown in FIG. 18 are required to transmit a volume of data of macroblock comprising the 8 sub-blocks. As described above, the macroblock for the luminance and color-difference signals comprises 8 sub-blocks each composed of 64 (=8 8) pixels. Thus, the macroblock for the luminance and color-difference signals comprises 8 64 pixels=512 pixels. Since each pixel leaves 2 bits unallocated as described above, the macroblock for the luminance and color-difference signals has 512 pixels 2 unallocated bits/pixel=1,024 unallocated bits. By the way, history information of one generation is 256 bits in length. Thus, history information of four (=1,024/256) previous generations can be superposed on the macroblock of video data for the luminance and color-difference signals. In the example shown in FIG. 18, history information of the first, second and third generations is superposed on the one macroblock of video data by utilizing the 2 low-order bits of D1 and D0.

The history information separating apparatus 105 extracts base-band video data from the 8 high-order bits of data transmitted thereto as the D1 format and history information from the 2 low-order bits. In the example shown in FIG. 15, the history information separating apparatus 105 extracts base-band video data from transmitted data, supplying the base-band video data to the video encoding apparatus 106. At the same time, the history information separating apparatus 105 extracts history information comprising encoding parameters of the first, second and third generations from the transmitted data, supplying the history information to the signal encoding circuit 106 and the history encoding apparatus 107.

The video encoding apparatus 106 encodes the base-band video data supplied thereto by the history information separating apparatus 105 into a bitstream having a GOP structure and a bit rate specified by the operator or the host computer. It should be noted that changing the GOP structure means changing the number of pictures included in the GOP, changing the number of P-pictures existing between two consecutive I-pictures or changing the number of B-pictures existing between two consecutive I-pictures or between an I-picture and a P-picture.

In the embodiment shown in FIG. 15, the supplied base-band video data includes history information of the encoding parameters of the first, second and third generations superposed thereon. Thus, the video encoding apparatus 106 is capable of carrying out an encoding process of the fourth generation by selective re-utilization of these pieces of history information so as to lower the degree to which the picture quality deteriorates.

Figure 19:
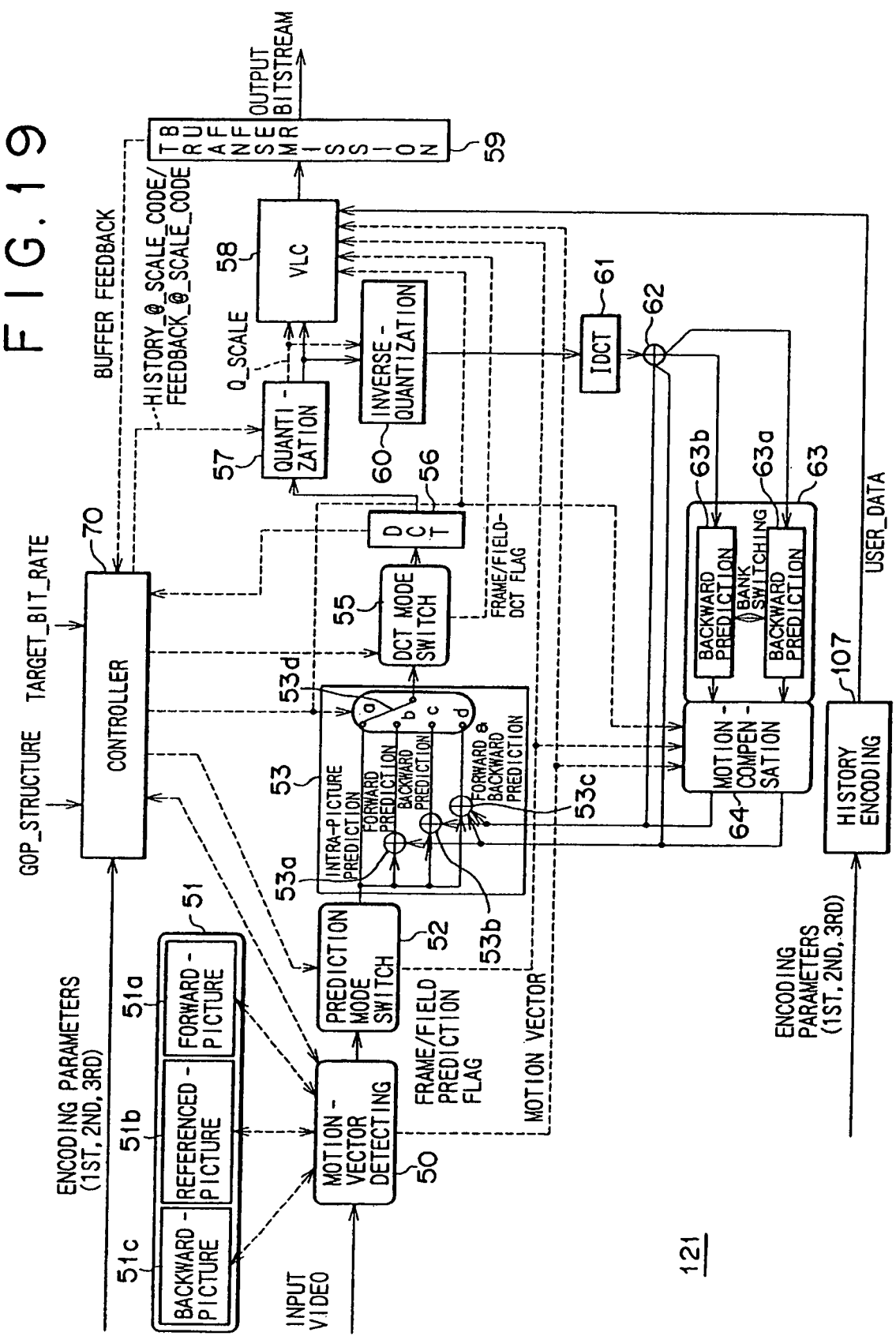
FIG. 19 is a block diagram showing the configuration of an encoder 121 employed in an encoding apparatus 106 of the transcoder 101 shown in FIG. 14.

FIG. 19 is a concrete diagram showing the configuration of an encoder 121 employed in the video encoding apparatus 106. As shown in the figure, the encoder 121 comprises a motion-vector detecting circuit 50, a prediction mode switch circuit 52, a processor 53, a DCT switch circuit 55, a DCT circuit 56, a quantization circuit 57, a variable-length coding circuit 58, a transmission buffer 59, an inverse-quantization circuit 60, an inverse-DCT circuit 61, a processor 62, a frame memory unit 63 and a motion compensation 64. The functions of these circuits are all but the same as those employed in the encoder 18 shown in FIG. 7, making it unnecessary to repeat their explanation. The following description thus focuses on differences between the encoder 121 and the encoder 18 shown in FIG. 7.

The encoder 121 also includes a controller 70 for controlling the operations and the functions of the other aforementioned components composing the encoder 121. The controller 70 receives an instruction specifying a GOP structure from the operator or the host computer, determining the types of pictures constituting the GOP structure. In addition, the controller 70 also receives information on a target bit rate from the operator or the host computer, controlling the quantization circuit 57 so as to set the bit rate output by the encoder 121 at the specified target bit rate.

Furthermore, the controller 70 also receives history information of a plurality of generations output by the history information separating apparatus 105, encoding a referenced picture by reutilization of this history information. The functions of the controller 70 are described in detail as follows.

First, the controller 70 forms a judgment as to whether or not the type of a referenced picture determined from the GOP structure specified by the operator or the host computer matches with the picture type included in the history information. That is to say, the controller 70 forms a judgment as to whether or not the referenced picture has been encoded in the past in the same picture type as the specified picture type.

The formation of the judgment described above can be exemplified by using the example shown in FIG. 15. The controller 70 forms a judgment as to whether or not the picture type assigned to the referenced picture in the encoding process of the fourth generation is the same type as that of the referenced picture in the encoding process of the first generation, the type of the referenced picture in the encoding process of the second generation or the type of the referenced picture in the encoding process of the third generation.

If the result of the judgment indicates that the picture type assigned to the referenced picture in the encoding process of the fourth generation is not the same type as that of the referenced picture in an encoding process of any previous generation, the controller 70 carries out a normal encoding process. This result of the judgment implies that this referenced picture was never subjected to the encoding processes of the first, second and third generations previously in the picture type assigned to the referenced picture in the encoding process of the fourth generation. If the result of the judgment indicates that the picture type assigned to the referenced picture in the encoding process of the fourth generation is the same type as that of the referenced picture in an encoding process of a previous generation, on the other hand, the controller 70 carries out a parameter-reuse-encoding-process by reutilization of parameters of the previous generation. This result of the judgment implies that this referenced picture was subjected to the encoding process of the first, second or third generation previously in the picture type assigned to the referenced picture in the encoding process of the fourth generation.

First, the normal encoding process carried out by the controller 70 is explained. In order to allow the controller 70 to make a decision as to which one of the frame-prediction mode or the field-prediction mode should be selected, the motion-vector detecting circuit 50 detects a prediction error in the frame prediction mode and a prediction error in the field prediction mode, supplying the values of the prediction errors to the controller 70. The controller 70 compares the values with each other, selecting the prediction mode with the smaller prediction error. The prediction mode switch circuit 52 then carries out signal processing to correspond to the prediction mode selected by the controller 70, supplying a signal obtained as a result of the processing to the processing unit 53. With the frame-prediction mode selected, the prediction mode switch circuit 52 carries out signal processing so as to supply the luminance signal to the processing unit 53 as it is on receiving the signal, and carries out signal processing of the color-difference signal so as to mix odd field lines with even field lines as being described earlier by referring to FIG. 8. With the field-prediction mode selected, on the other hand, the prediction mode switch circuit 52 carries out signal processing of the luminance signal so as to make the luminance sub-blocks Y[1] and Y[2] comprise odd field lines and luminance sub-blocks Y[3] and Y[4] comprise even field lines, and carries out signal processing of the color-difference signal so as to make the four upper lines comprise odd field lines and the four lower lines comprise even field lines as described earlier by referring to FIG. 9.

In addition, in order to allow the controller 70 to make a decision as to which one of the intra-picture prediction mode, the forward prediction mode, the backward prediction mode or the forward & backward prediction mode to be selected, the motion-vector detecting circuit 50 generates a prediction error for each of the prediction modes, supplying the prediction errors to the controller 70. The controller 70 selects a mode having the smallest prediction error as an inter-picture prediction mode from the forward prediction mode, the backward prediction mode or the forward & backward prediction mode. Then, the controller 70 compares the smallest prediction error of the selected inter-picture prediction mode with the prediction error of the intra-picture prediction mode, selecting either the selected inter-picture prediction or the intra-picture prediction mode with a smaller prediction error as a prediction mode. To put it in detail, if the prediction error of the intra-picture prediction mode is found smaller, the intra-picture prediction mode is established. If the prediction error of the inter-picture prediction mode is found smaller, on the other hand, the selected forward prediction, backward prediction mode or forward & backward prediction mode with the smallest prediction error is established. The controller 70 then controls the processor 53 and the motion compensation 64 to operate in the established prediction mode.

Furthermore, in order to allow the controller 70 to make a decision as to which one of the frame-DCT mode or the field-DCT mode to be selected, the DCT mode switch circuit 55 converts data of the four luminance sub-blocks into a signal with a format of the frame-DCT mode comprising mixed odd and even field lines and a signal with a format of the field-DCT mode comprising separated odd and even field lines, supplying the signals resulting from the conversion to the DCT circuit 56. The DCT circuit 56 computes an encoding efficiency of DCT processing of the signal comprising mixed odd and even field lines and an encoding efficiency of DCT processing of the signal comprising separated odd and even field lines, supplying the computed encoding efficiencies to the controller 70. The controller 70 compares the encoding efficiencies with each other, selecting a DCT mode with a higher efficiency. The controller 70 then controls the DCT mode switch circuit 55 to work in the selected DCT mode.

The controller 70 also receives a target bit rate representing a desired bit rate specified by the operator or the host computer and a signal representing the volume of data stored in the transmission buffer 59 or the size of a residual free area left in the buffer 59, generating feedback_q_scale_code for controlling the size of the quantization step used by the quantization circuit 57 on the basis of the target bit rate and the size of the residual free area left in the buffer 59. The feedback_q_scale_code is a control signal generated in accordance with the size of the residual free area left in the transmission buffer 59 so as to prevent an overflow or an underflow from occurring in the buffer 59 and to cause a bitstream to be output from the transmission buffer 59 at the target bit rate. To put it concretely, if the volume of data buffered in the transmission buffer 59 becomes small, for example, the size of the quantization step is reduced so that the number of bits of a picture to be encoded next increases. If the volume of data buffered in the transmission buffer 59 becomes large, on the other hand, the size of the quantization step is increased so that the number of bits of a picture to be encoded next decreases. It should be noted that the size of the quantization step is proportional to feedback_q_scale_code. That is to say, when feddback_q_scale_code is increased, the size of the quantization step rises. When feddback_q_scale_code is reduced, on the other hand, the size of the quantization step decreases.

Next, the parameter-reuse-encoding process reutilizing encoding parameters which characterizes the transcoder 101 is explained. In order to make the explanation easy to understand, it is assumed that the referenced picture was encoded as an I-picture in the encoding process of the first generation, as a P-picture in the encoding process of the second generation and as a B-picture in the encoding process of the third generation, and has to be encoded again as an I-picture in the current encoding process of the fourth generation. In this case, since the referenced picture was previously encoded in the encoding process of the first generation in the required picture type as the I-picture assigned to the encoding process of the fourth generation, the controller 70 carries out an encoding process by using the encoding parameters of the first generation instead of creating new encoding parameters from the supplied video data. Representatives of such encoding parameters to be reutilized in the encoding process of the fourth generation include quantiser_scale_code representing the size of the quantization-scale step, macrobloc_type representing the prediction mode, motion_vector representing the motion vector, frame/field_motion_type indicating a frame prediction mode or a field prediction mode and dct_type indicating a frame-DCT-mode or a field-DCT mode. The controller 70 does not reutilize all encoding parameters received as information history. Instead, the controller 70 reutilizes only encoding parameters judged to be appropriate for reutilization and newly creates encoding parameters for which previous encoding parameters are not suitable for reutilization.

Next, the parameter-reuse-encoding process reutilizing encoding parameters is explained by focusing on differences from the normal encoding process described earlier. In the normal encoding process, the motion-vector detecting circuit 50 detects a motion vector of a referenced picture. In the parameter-reuse-encoding process reutilizing encoding parameters, on the other hand, the motion-vector detecting circuit 50 does not detect a motion vector of a referenced picture. Instead, the motion-vector detecting circuit 50 reutilizes motion_vector transferred as history information of the first generation. The reason motion_vector of the first generation is used is explained as follows. Since the base-band video data obtained as a result of a decoding process of the encoded bitstream of the third generation has experienced at least three encoding processes, the picture quality thereof is obviously poor in comparison with the original video data. A motion vector detected from video data with a poor picture quality is not accurate. To be more specific, a motion vector supplied to the transcoder 101 of the fourth generation as history information of the first generation is certainly has a precision better than a motion vector detected in the encoding process of the fourth generation. By reutilization of the motion vector received as an encoding parameter of the first generation, the picture quality does not deteriorate during the encoding process of the fourth generation. The controller 70 supplies the motion vector received as the history information of the first generation to the motion compensation 64 and the variable-length coding circuit 58 to be used as the motion vector of a referenced picture being encoded in the encoding process of the fourth generation.

In the normal processing, the motion-vector detecting circuit 50 detects a prediction error in the frame-prediction mode and a prediction error in the field-prediction mode in order to select either the frame-prediction mode or the field-prediction mode. In the parameter-reuse-encoding processing based on reutilization of encoding parameters, on the other hand, the motion-vector detecting circuit 50 detects neither prediction error in the frame-prediction mode and nor prediction error in the field-prediction mode. Instead, frame/field_motion_type received as history information of the first generation to indicate either the frame-prediction mode or the field-prediction mode is reutilized. This is because the prediction error of each prediction mode detected in the encoding process of the first generation has a precision higher than the prediction error of each prediction mode detected in the encoding process of the fourth generation. Thus, a prediction mode selected on the basis of prediction errors each having a high precision will allow a more optimum encoding process to be carried out. To put it concretely, the controller 70 supplies a control signal representing frame/field_motion_type received as history information of the first generation to the prediction mode switch circuit 52. The control signal drives the prediction mode switch circuit 52 to carry out signal processing according to reutilized frame/field_motion_type.

In the normal processing, the motion-vector detecting circuit 50 also detects a prediction error in each of the intra-picture prediction mode, the forward prediction mode, the backward prediction mode and the forward & backward prediction mode in order to select one of these prediction modes. In the processing based on reutilization of encoding parameters, on the other hand, the motion-vector detecting circuit 50 detects no prediction errors of these prediction modes. Instead, one of the intra-picture prediction mode, the forward prediction mode, the backward prediction mode and the forward & backward prediction mode indicated by macroblock_type received as history information of the first generation is selected. This is because the prediction error of each prediction mode detected in the process of the first generation has a precision higher than the prediction error of each prediction mode detected in the process of the fourth generation. Thus, a prediction mode selected on the basis of prediction errors each having a high precision will allow a more efficient encoding process to be carried out. To put it concretely the controller 70 selects a prediction mode indicated by macroblock_type included in the history information of the first generation and controls the processor 53 and the motion-compensation 64 to operate in the selected prediction mode.

In the normal encoding process, the DCT mode switch circuit 55 supplies both of a signal converted into a format of the frame-DCT mode and a signal converted into a format of the field-DCT mode to the DCT circuit 56 for use in comparison of an encoding efficiency in the frame-DCT mode with an encoding efficiency in the field-DCT mode. In the processing based on reutilization of encoding parameters, on the other hand, neither the signal converted into a format of the frame-DCT mode nor the signal converted into a format of the field-DCT mode is generated. Instead, only processing in a DCT mode indicated by dct_type included in the history information of the first generation is carried out. To put it concretely, the controller 70 reutilizes dct_type included in the history information of the first generation and controls the DCT-mode switching circuit 55 to carry out signal processing in accordance with a DCT mode indicated by dct_type.

In the normal encoding process, the controller 70 controls the size of the quantization step used in the quantization circuit 57 on the basis of a target bit rate specified by the operator or the host computer and the size of a residual free area left in the transmission buffer 59. In the processing based on reutilization of encoding parameters, on the other hand, the controller 70 controls the size of the quantization step used in the quantization circuit 57 on the basis of a target bit rate specified by the operator or the host computer, the size of a residual free area left in the transmission buffer 59 and a past quantization scale included in history information. It should be noted that, in the following description, the past quantization scale included in history information is referred to as history_q_scale_code. In a history stream to be described later, the quantization scale is referred to as quantiser_scale_code.

First, the controller 70 generates feedback_q_scale_code representing the current quantization scale as is the case with the normal encoding process. Feedback_q_scale_code is set at such a value determined from the size of the residual free area left in the transmission buffer 59 that neither overflow nor underflow occurs in the transmission buffer 59. Then, history_q_scale_code representing a previous quantization scale included in the history stream of the first generation is compared with feedback_q_scale_code representing the current quantization scale to determine which quantization scale is greater. It should be noted that a large quantization scale implies a large quantization step. If feedback_q_scale_code representing the current quantization scale is found greater than history_q_scale_code representing the largest among a plurality of previous quantization scales, the controller 70 supplies feedback_q_scale_code representing the current quantization scale to the quantization circuit 57. If history_q_scale_code representing the largest previous quantization scale is found greater than feedback_q_scale_code representing the current quantization scale, on the other hand, the controller 70 supplies history_q_scale_code representing the largest previous quantization scale to the quantization circuit 57. The controller 70 selects the largest among a plurality of previous quantization scales included in the history information and the current quantization scale derived from the size of the residual free area left in the transmission buffer 59. In other words, the controller 70 controls the quantization circuit 57 to carry out quantization using the largest quantization step among the quantization steps used in the current encoding process (or the encoding process of the fourth generation) and the previous encoding processes (or the encoding processes of the first, second and third generations). The reason is described as follows.

Assume that the bit rate of a stream generated in the encoding process of the third generation is 4 Mbps and the target bit rate set for the encoder 121 carrying out the encoding process of the fourth generation is 15 Mbps. Such a target bit rate which is higher than the previous bit rate cannot be actually achieved by simply decreasing the quantization step. This is because a current encoding process carried out at a small quantization step on a picture completing a previous encoding process performed at a large quantization step by no means improves the quality of the picture. That is to say, a current encoding process carried out at a small quantization step on a picture completing a previous encoding process performed at a large quantization step merely increases the number of resulting bits, but does not help to improve the quality of the picture. Thus, by using the largest quantization step among the quantization steps used in the current encoding process (or the encoding process of the fourth generation) and the previous encoding processes (or the encoding processes of the first, second and third generations), the most efficient encoding process can be carried out.

Next, the history decoding apparatus 104 and the history encoding apparatus 107 are explained by referring to FIG. 15. As shown in the figure, the history decoding apparatus 104 comprises a user-data decoder 201, a converter 202 and a history decoder 203. The user-data decoder 201 decodes user data supplied by the decoding apparatus 102. The converter 202 converts data output by the user-data decoder 201 and the history decoder 203 reproduces history information from data output by the converter 202.

On the other hand, the history encoding apparatus 107 comprises a history formatter 211, a converter 212 and a user-data formatter 213. The history formatter 211 formats encoding parameters of the three generations supplied thereto by the history information separating apparatus 105. The converter 212 converts data output by the history formatter 211 and the user-data formatter 213 formats data output by the converter 212 into a format of the user data.

The user-data decoder 201 decodes user data supplied by the decoding apparatus 102, supplying a result of the decoding to the converter 202. Details of the user data will be described later. At any rate, the user data denoted by user_data( ) comprises user_data_start_code and user_data. According to MPEG specifications, generation of 23 consecutive bits of "0" in the user-data is prohibited in order to prevent start_code from being detected incorrectly. Since the history information may include 23 or more consecutive bits of "0", it is necessary to process and convert the history information into converted_history_stream( ) to be described later by referring to FIG. 38. The component that carries out this conversion by insertion of a "1" bit is the converter 212 employed in the history encoding apparatus 107. On the other hand, the converter 202 employed in the history encoding apparatus 104 carries out conversion of deletion of a bit opposite to the conversion performed by the converter 212 employed in the history encoding apparatus 107.

The history decoder 203 generates history information from data output by the converter 202, outputting the information to the history information multiplexing apparatus 103.

On the other hand, the history formatter 211 employed in the history encoding apparatus 107 converts formats encoding parameters of the three generations supplied thereto by the history information separating apparatus 105 into a format of history information. The format of history information can have a fixed length shown in FIGS. 40 to 46 to be described later or a variable length shown in FIG. 47 also to be described later.

The history information formatted by the history formatter 211 is converted by the converter 212 into converted_history_stream( ) to prevent start_code of user_data( ) from being detected incorrectly as described above. That is to say, while history information may include 23 or more consecutive bits of "0", generation of 23 consecutive bits of "0" in user_data is prohibited by MPEG specifications. The converter 212 thus converts the history information by insertion of a "1" bit in accordance with the imposed prohibition.

The user-data formatter 213 adds Data_ID and user_data_stream_code to converted_history_stream( ) supplied by the converter 212 on the basis of a syntax shown in FIG. 38 to be described later to generate user_data that can be inserted into video_stream, outputting user_data to the encoding apparatus 106.

Figure 20:
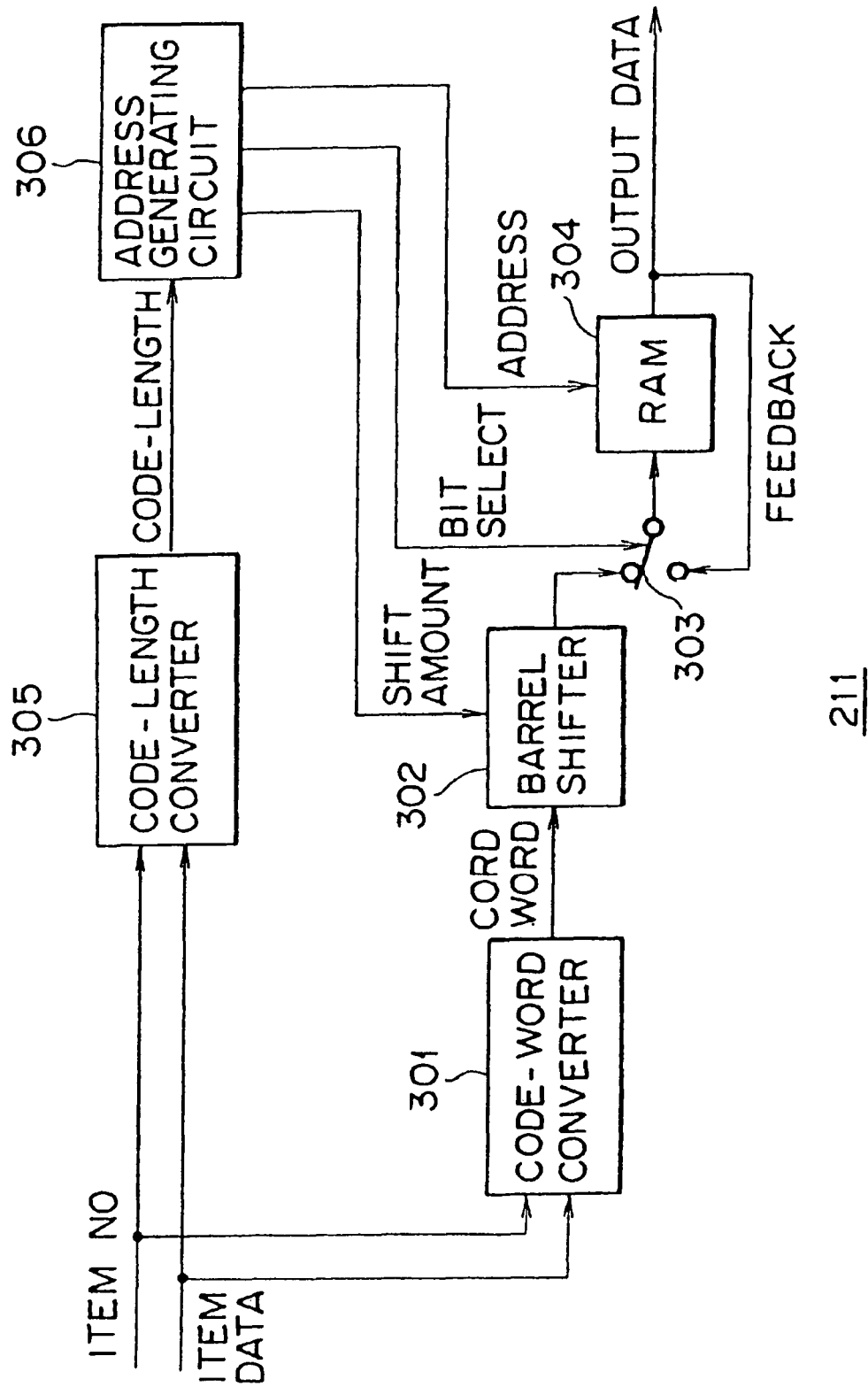
FIG. 20 is a block diagram showing a typical configuration of a history formatter 211 employed in the transcoder 101 shown in FIG. 15.

FIG. 20 is a block diagram showing a typical configuration of the history formatter 211. As shown in the figure, code-language converter 301 and a code-language converter 305 receive item data and item-number data from the encoding-parameter separating circuit 105. The item data is encoding parameters, that is, encoding parameters transmitted this time as history information. The item-number data is information used for identifying a stream including the encoding parameters. Examples of the item-number data are a syntax name and the name of sequence_header to be described later. The code-language converter 301 converts an encoding parameter supplied thereto into a code language conforming to a specified syntax, outputting the code to a barrel shifter 302. The barrel shifter 302 barrel-shifts the code language supplied thereto by a shift amount corresponding to information supplied thereto by an address generating circuit 306, outputting the shifted code to a switch 303 in byte units. The switch 303, the contact position of which can be changed over by a bit select signal output by the address generating circuit 306, has as many pairs of contact poles as bits supplied by the barrel shifter 302. The switch 303 passes on the code supplied thereto by the barrel shifter 302 to a RAM unit 304 to be stored at a write address specified by the address generating circuit 306. The code language stored in the RAM unit 304 is read out back from a read address specified by the address generating circuit 306 and supplied to the converter 212 provided at the following stage. If necessary, the code read out from the RAM unit 304 is again supplied to the RAM unit 304 by way of the switch 303 to be stored therein again.

The code-length converter 305 determines the code length of the encoding parameter from the syntax and the encoding parameter supplied thereto, outputting information on the code length to the address generating circuit 306. The address generating circuit 306 generates the shift amount, the bit select signal, the write address and the read address described above in accordance with the information on the code length received from the code-length converter 305. The shift amount, the bit select signal and the addresses are supplied to the barrel shifter 302, the switch 303 and the RAM unit 304 respectively.

As described above, the history formatter 211 functions as the so-called variable-length encoder for carrying out a variable-length encoding process on an encoding parameter supplied thereto and for outputting a result of the variable-length encoding process.

Figure 22:
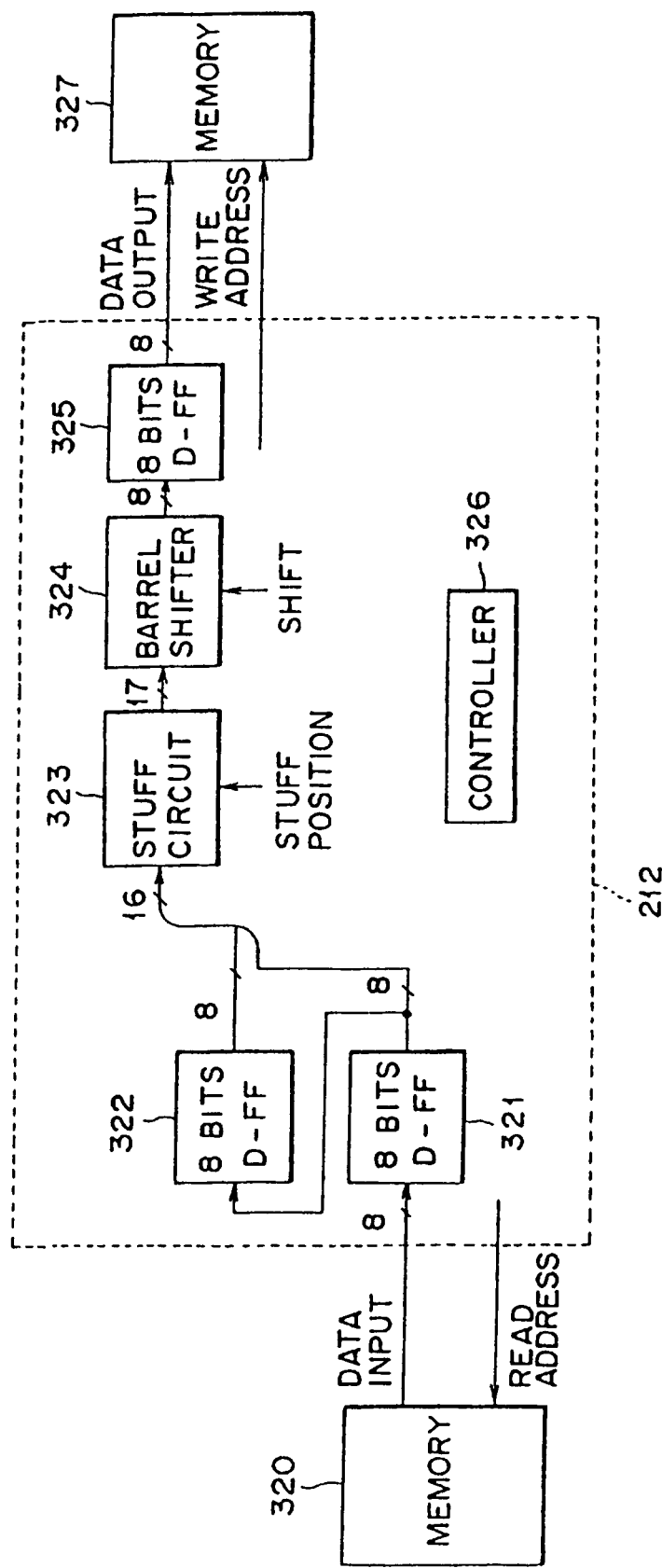
FIG. 22 is a block diagram showing a typical configuration of a converter 212 employed in the transcoder 101 shown in FIG. 15.

FIG. 22 is a block diagram showing a typical configuration of the converter 212. In this typical configuration, 8-bit data is read out from a read address in a buffer-memory unit 320 provided between the history formatter 211 and the converter 212 and supplied to an 8-bit D-type flip-flop (D-FF) circuit 321 to be held therein. The read address is generated by a controller 326. The 8-bit data read out from the D-type flip-flop circuit 321 is supplied to a stuff circuit 323 and an 8-bit D-type flip-flop circuit 322 to be held therein. The 8-bit data read out from the D-type flip-flop circuit 322 is also supplied to the stuff circuit 323. To put it in detail, the 8-bit data read out from the D-type flip-flop circuit 321 is concatenated with the 8-bit data read out from the D-type flip-flop circuit 322 to form 16-bit parallel data which is then supplied to the stuff circuit 323.

The stuff circuit 323 inserts the code "1" into a stuff position specified by a signal to produce data with a total of 17 bits which is supplied to a barrel shifter 324. The signal indicating a stuff position is supplied by the controller 326 and the operation to insert the code "1" is called stuffing.

The barrel shifter 324 barrel-shifts the data supplied thereto by the stuff circuit 323 by a shift amount indicated by a signal received from the controller 326, extracting 8-bit data out off the shifted one. The extracted data is then output to an 8-bit D-type flip-flop circuit 325 to be held therein. The data held in the D-type flip-flop circuit 325 is finally output to the user-data formatter 213 provided at the following stage by way of a buffer-memory unit 327. That is to say, the data is temporarily stored in the buffer-memory unit 327 provided between the converter 212 and the user-data formatter 213 at a write address generated by the controller 326.

Figure 23:
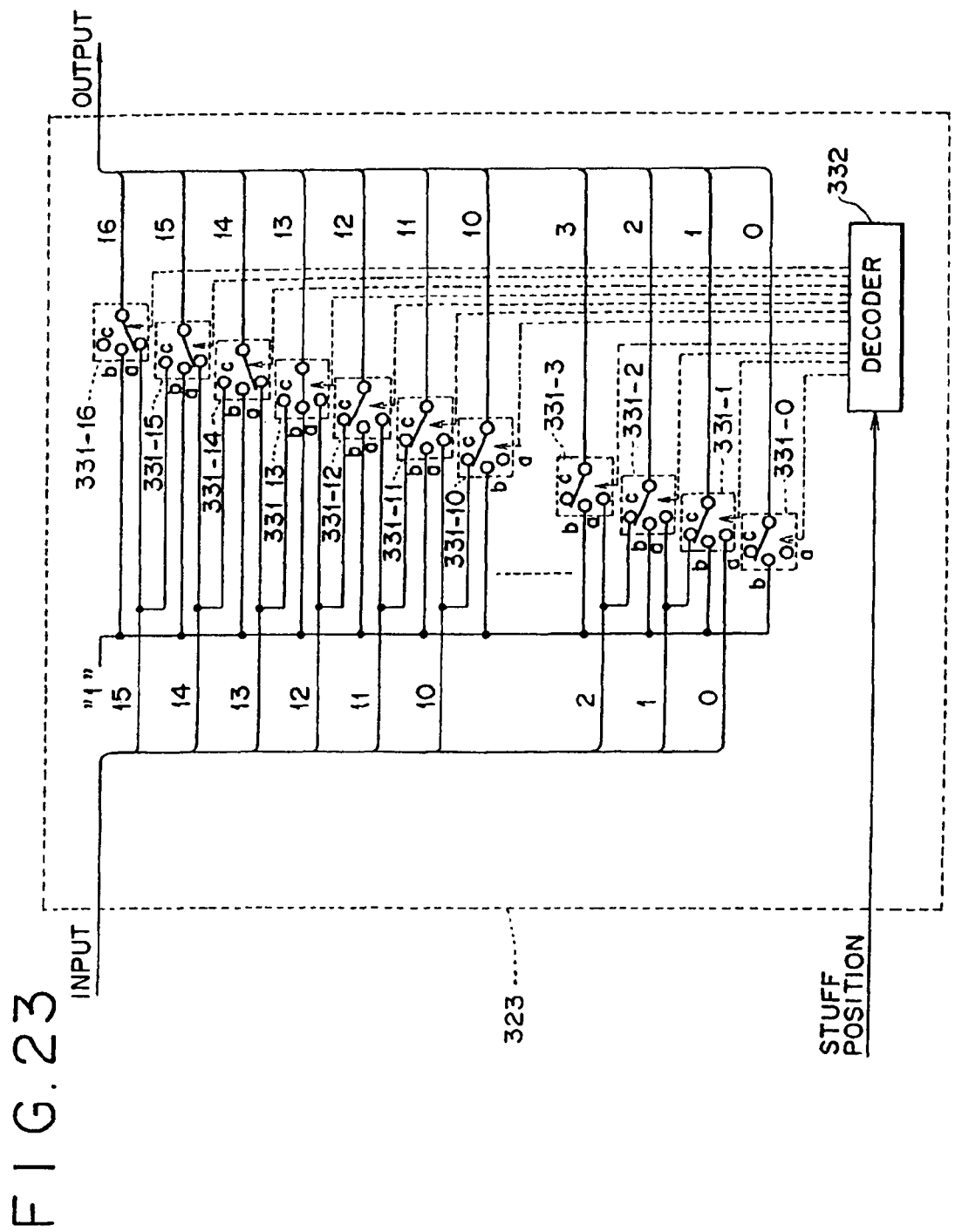
FIG. 23 is a block diagram showing a typical configuration of a stuff circuit 323 employed in the converter 212 shown in FIG. 22.

FIG. 23 is a block diagram showing a typical configuration of the stuff circuit 323. In this configuration, the 16-bit data received from the D-type flip-flop circuits 321 and 322 is supplied to contact points a of switches 331-16 to 331-1. Pieces of data supplied to the contact points a of the switches 331-i where i=0 to 15 are also supplied to contact points c of the switches 331-i. The switches 331-i where i=1 to 16 are switches adjacent to the switches 331-i where i=0 to 15 respectively on the MSB side shown in the figure) of the switches 331-i where i=0 to 15. For example, the thirteenth piece of data from the LSB supplied to the contact point a of the switch 331-13 on the MSB side of the adjacent switch 331-12 is also supplied to the contact point c of the switch 331-12. At the same time, the fourteenth piece of data from the LSB supplied to the contact point a of the switch 331-14 on the MSB side of the adjacent switch 331-14 is also supplied to the contact point c of the switch 331-13.

However, the contact point a of the switch 331-0 provided on the lower side of the switch 331-1 is open because no switch is provided on the lower side of the switch 331-0 which corresponds to the LSB. In addition, the contact point c of the switch 331-16 provided on the upper side of the switch 331-15 is also open because no switch is provided on the upper side of the switch 331-16 which corresponds to the MSB.

The data "1" is supplied to contact points b of the switches 331-0 to 331-16. The decoder 332 changes over one of the switches from 331-0 to 331-16 at a stuff position indicated by a staff position signal received from the controller 326 to the contact point b in order to insert the data "1" into the stuff position. The switches 331-0 to 331-16 on the LSB side of the switch at the stuff position are changed over to their contact points c whereas the switches 331 on the MSB side of the switch at the stuff position are changed over to their contact points a.

FIG. 23 shows an example in which the data "1" is inserted into the thirteenth bit from the LSB side. Thus, in this case, the switches 331-0 to 331-12 are changed over to their contact points c and the switches 331-14 to 331-16 are changed over to their contact points a. The switch 331-13 is changed over to the contact point b thereof.

With the configuration described above, the converter 212 shown in FIG. 22 converts the 22-bit code into a 23-bit code including the inserted data "1", outputting the 23-bit result of the conversion.

Figure 24:
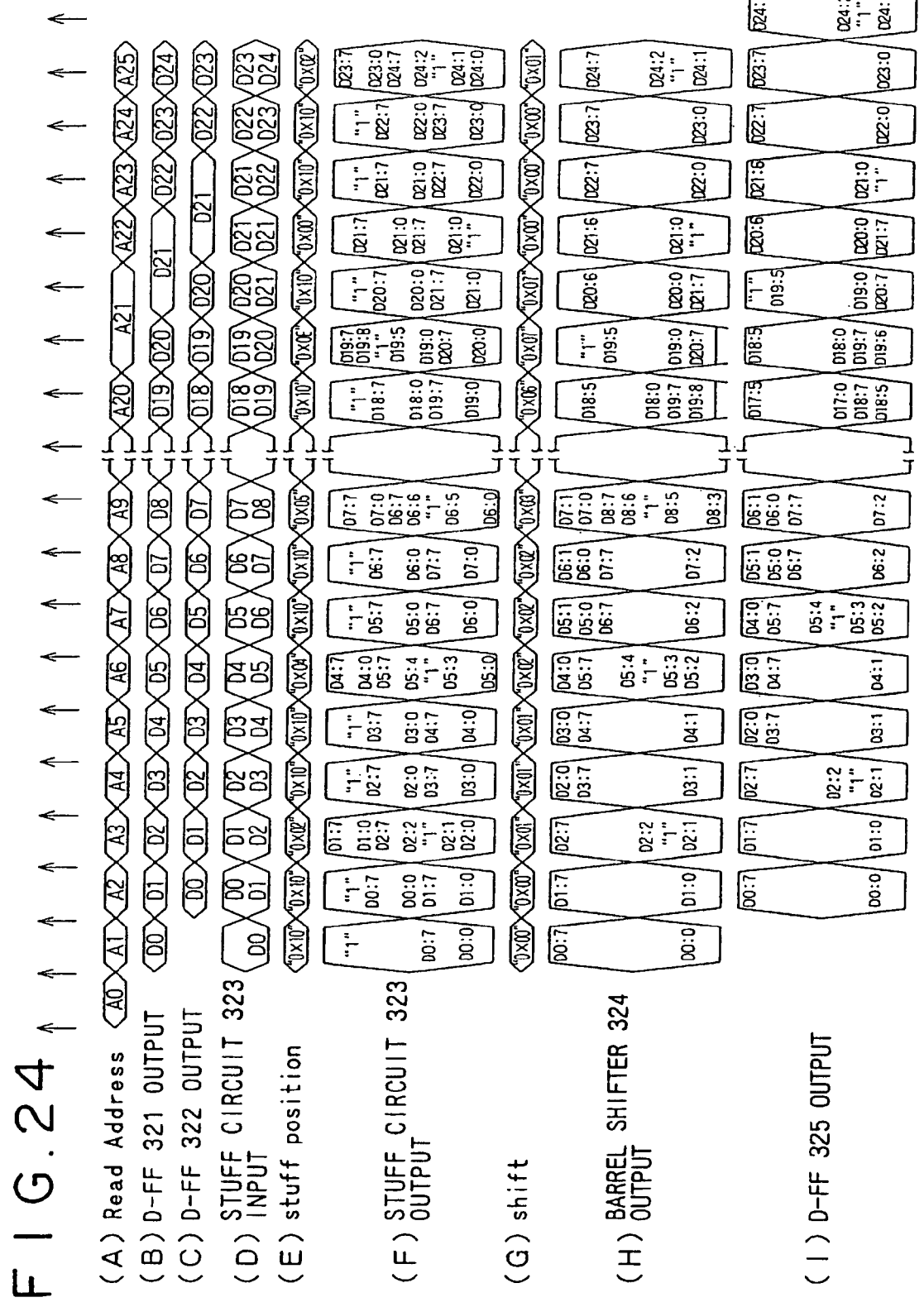
FIGS. 24A to I are timing charts used for explaining the operation of the converter 212 shown in FIG. 22.

FIG. 24 is a diagram showing timing of pieces of data output by a variety of portions of the converter 212 shown in FIG. 22. When the controller 326 employed in the converter 212 generates a read address shown in FIG. 24A synchronously with a clock signal for a byte of data, byte data stored at the read address is read out from the buffer-memory unit 320 and temporarily held by the D-type flip-flop circuit 321. Then, data of FIG. 24B read out from the D-type flip-flop circuit 321 is supplied to the stuff circuit 323 and the D-type flip-flop circuit 322 to be held therein. Data of FIG. 24C read out from the D-type flip-flop circuit 322 is concatenated with the data of FIG. 24B read out from the D-type flip-flop circuit 321 and data obtained as a result of the concatenation shown in FIG. 24D is supplied to the stuff circuit 323.

As a result, with timing of a read address A1, the first byte D0 of the data of FIG. 24B read out from the D-type flip-flop circuit 321 is supplied to the stuff circuit 323 as a first byte of the data shown in FIG. 24D. Then, with timing of a read address A1, the second byte D1 of the data of FIG. 24B read out from the D-type flip-flop circuit 321 and concatenated with the first byte D0 of the data of FIG. 24C read out from the D-type flip-flop circuit 322 is supplied to the stuff circuit 322 as a second two bytes of the data shown in FIG. 24D. Subsequently, with timing of a read address A3, the third byte D2 of the data of FIG. 24B read out from the D-type flip-flop circuit 321 and concatenated with the second byte D1 of the data of FIG. 24C read out from the D-type flip-flop circuit 322 is supplied to the stuff circuit 322 as a third two bytes of the data shown in FIG. 24D and so on.

The stuff circuit 323 receives a signal of FIG. 24E indicating a stuff position, into which the data "1" is to be inserted, from the controller 326. The decoder 332 employed in the stuff circuit 323 changes over one of the switches 331-0 to 331-16 at the stuff position to the contact point b thereof. The switches 331 on the LSB side of the switch at the stuff position are changed over to their contact points c whereas the switches 331 on the MSB side of the switch at the stuff position are changed over to their contact points a. As a result, the stuff circuit 323 inserts the data "1" into the stuff position signal, outputting data with the inserted data "1" shown in FIG. 24F.

The barrel shifter 324 barrel-shifts the data supplied thereto by the stuff circuit 323 by a shift amount indicated by a shift signal of FIG. 24G received from the controller 326, outputting a shifted signal shown in FIG. 24H. The shifted signal is held temporarily in the D-type flip-flop circuit 325 before being output to a later stage as shown in FIG. 24I.

The data output from the D-type flip-flop circuit 325 includes the data "1" inserted into a position following to 22-bit data. Thus, the number of consecutive 0 bits never exceeds 22 even if all bits between the data "1" and the next data "1" are "0".

Figure 25:
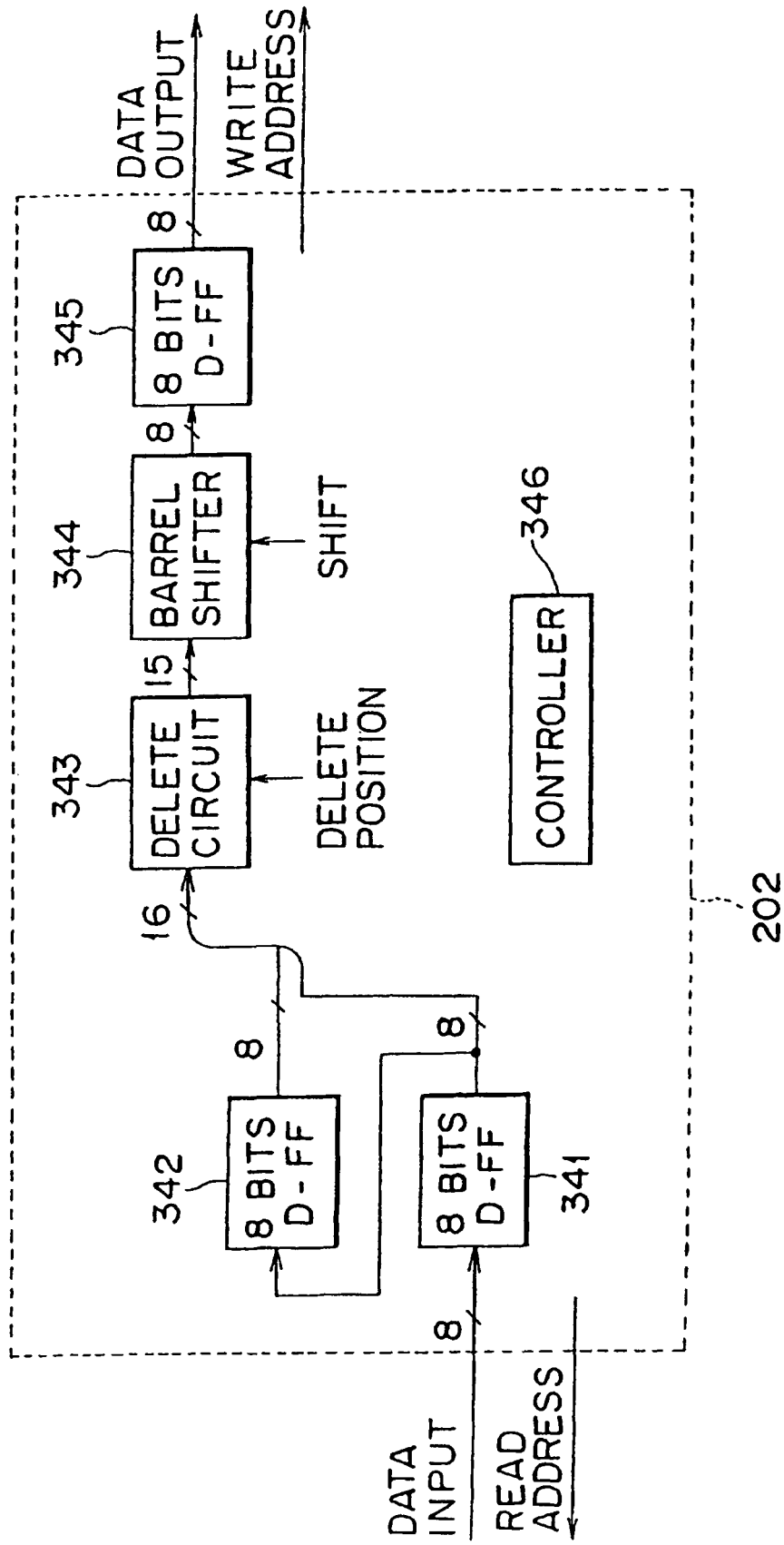
FIG. 25 is a block diagram showing a typical configuration of a converter 202 employed in the transcoder 101 shown in FIG. 15.

FIG. 25 is a block diagram showing a typical configuration of the converter 202. The fact that components ranging from a D-type flip-flop circuit 341 to a controller 346 are employed in the converter 202 as the components ranging from the D-type flip-flop circuit 321 to the controller 326 are employed in the converter 212 shown in FIG. 22 indicates that the configuration of the former is basically the same as the configuration of the latter. The converter 202 is different from the converter 212 in that, in the case of the former, a delete circuit 343 is employed in place of the stuff circuit 323 of the latter. Otherwise, the configuration of the converter 202 is the same as that of the converter 212 shown in FIG. 22.

The delete circuit 343 employed in the converter 202 deletes a bit at a delete position indicated by a signal output by the controller 346. The delete position corresponds to the stuff position, into which the stuff circuit 323 shown in FIG. 23 inserts the data "1".

The remaining operations of the converter 202 are the same as those carried out by the converter 212 shown in FIG. 22.

Figure 26:
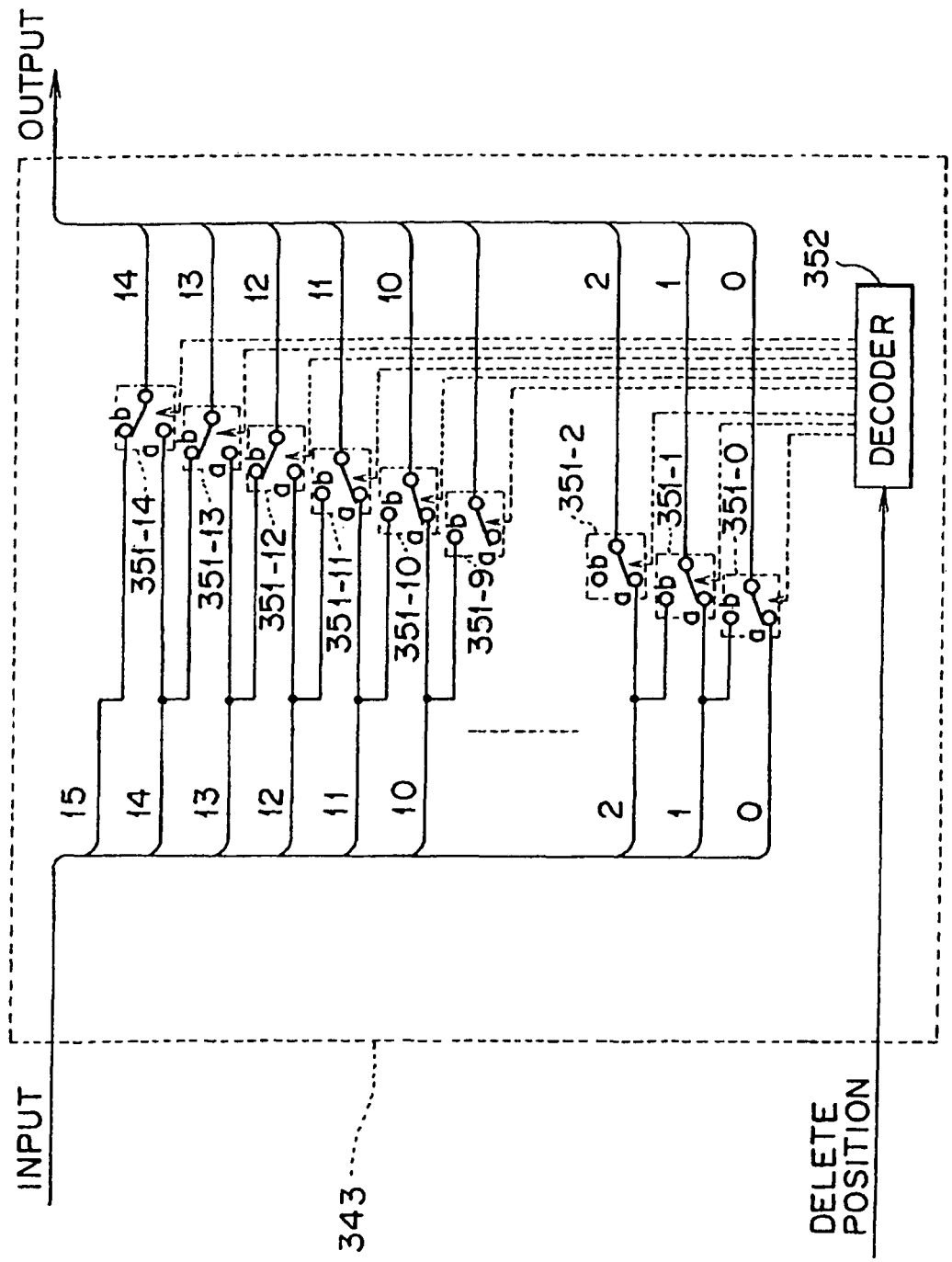
FIG. 26 is a block diagram showing a typical configuration of a delete circuit 343 employed in the converter 202 shown in FIG. 25.

FIG. 26 is a block diagram showing a typical configuration of the delete circuit 343. In this configuration, the 15 bits on LSB side of which 16-bit data received from the D-type flip-flop circuits 341 and 342 are supplied to contact points a of switches 351-0 to 351-14. Pieces of data supplied to the contact points a of the switches 351-$i$ where $i$=1 to 14 are also supplied to contact points b of the switches 351-$i$ where $i$=0 to 13. The switches 351-$i$ where $i$=1 to 14 are switches adjacent to the switches 351-$i$ where $i$=0 to 13 respectively on the MSB side (or the upper side shown in the figure) of the switches 351-$i$ where $i$=0 to 13. For example, the thirteenth piece of data from the LSB supplied to the contact point a of the switch 351-13 on the MSB side of the adjacent switch 351-12 is also supplied to the contact, point b of the switch 351-12. At the same time, the 14th piece of data from the LSB supplied to the contact point a of the switch 351-14 on the MSB side of the adjacent switch 351-13 is also supplied to the contact point c of the switch 351-13. The decoder 352 deletes a bit at a delete position indicated by a signal output by the controller 346, outputting the remaining 15-bit data excluding the deleted bit.

FIG. 26 shows a state in which the thirteenth input bit from the LSB (input bit 12) is deleted. Thus, in this case, the switches 351-0 to 351-11 are changed over to their contact points a to output 12 input bits from the LSB (bit 0) to the twelfth bit (bit 11) as they are. On the other hand, the switches 351-12 to 351-14 are changed over to their contact points b to pass on the fourteenth to sixteenth input bits (input bits 13 to 15) as the thirteenth to fifteenth output bits (output bits 12 to 14) respectively. In this state, the thirteenth input bit from the LSB (input bit 12) is connected to none of the output lines.

16-bit data is supplied to the stuff circuit 323 shown in FIG. 23 and the delete circuit 343 shown in FIG. 26. This is because the data supplied to the stuff circuit 323 is a result of concatenation of pieces of data output by the 8-bit D-type flip-flop circuits 321 and 322 employed in the converter 212 shown in FIG. 22. By the same token, the data supplied to the delete circuit 343 is a result of concatenation of pieces of data output by the 8-bit D-type flip-flop circuits 341 and 342 employed in the converter 202 shown in FIG. 25. The barrel shifter 324 employed in the converter 212 shown in FIG. 22 barrel-shifts the 17-bit data supplied thereto by the stuff circuit 323 by a shift amount indicated by a signal received from the controller 326, finally extracting data of typically 8 bits out off the shifted one. Likewise, the barrel shifter 344 employed in the converter 202 shown in FIG. 25 barrel-shifts the 15-bit data supplied thereto by the stuff circuit 324 by a shift amount indicated by a signal received from the controller 346, finally extracting data of 8 bits out off the shifted one.

Figure 21:
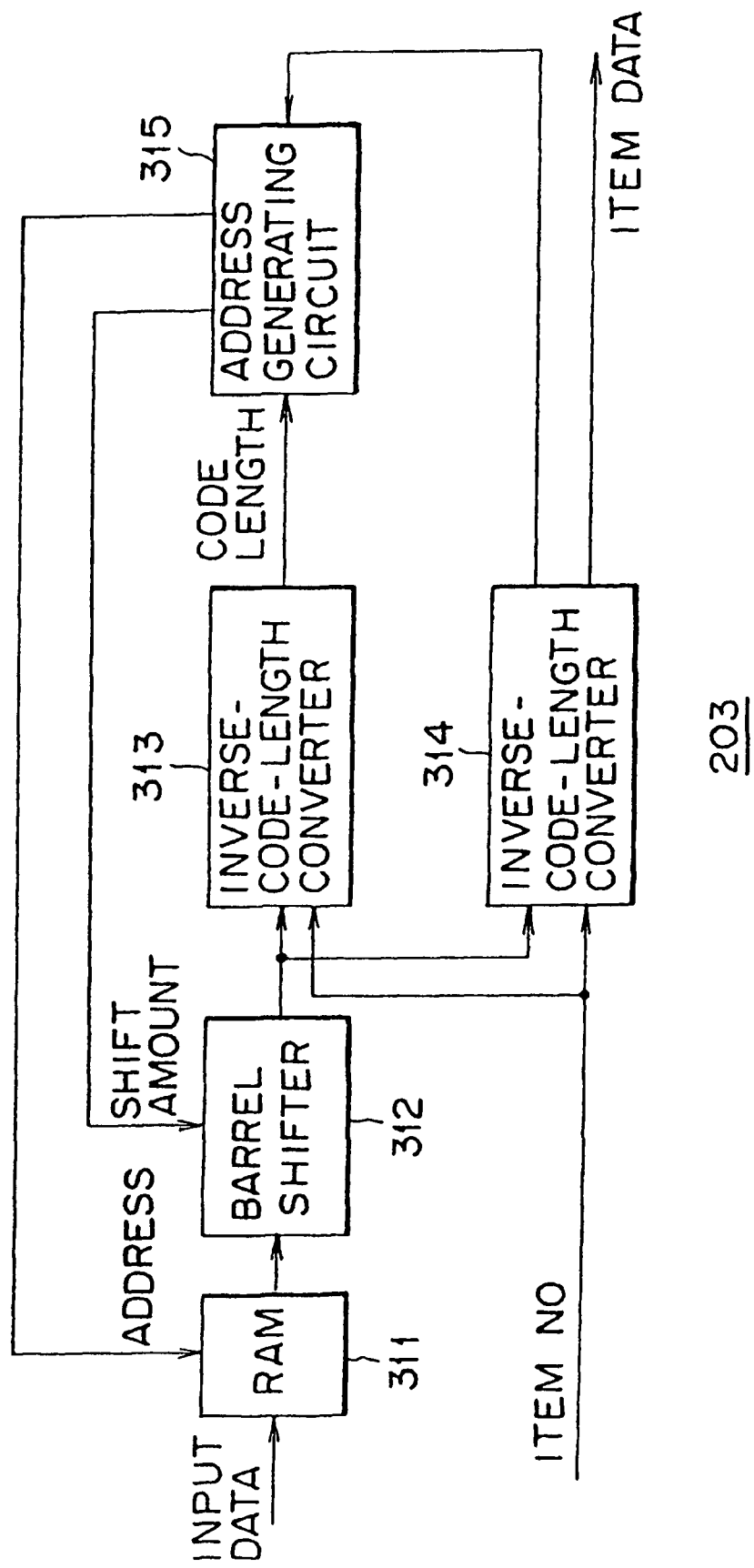
FIG. 21 is a block diagram showing a typical configuration of a history decoder 203 employed in the transcoder 101 shown in FIG. 15.

FIG. 21 is a block diagram showing a typical configuration of the history decoder 203 for decoding data completing the history formatting process in the converter 202. Data of an encoding parameter supplied to the history decoder 203 by the converter 202 is fed to a RAM unit 311, to be stored therein at a write address specified by an address generating circuit 315. The address generating circuit 315 also outputs a read address with predetermined timing to the RAM unit 311. At that time, data stored at the read address in the RAM unit 311 is output to a barrel shifter 312. The barrel shifter 312 barrel-shifts the data supplied thereto by a shift amount corresponding to information supplied thereto by the address generating circuit 315, outputting the shifted data to inverse-code-length converters 313 and 314.

The inverse-code-length converters 313 and 314 also receive the name of a syntax of a stream including the encoding parameters from the converter 202. The inverse code-length converter 313 determines the code length of the encoding parameter from the data or the code language supplied thereto in accordance with the syntax, outputting information on the code length to the address generating circuit 315.

On the other hand, the inverse-code-length converter 314 decodes or reversely encodes the data supplied by the barrel shifter 312 on the basis of the syntax, outputting a result of the decoding process to the encoding-parameter multiplexing apparatus 103.

In addition, the inverse-code-length converter 314 also extracts information required for identifying what code language is included, that is, information required for determining a delimiter of a code, outputting the information to the address generating circuit 315. The address generating circuit 315 generates write and read addresses and a shift amount based on this information and the code length received from the inverse-code-length converter 313, outputting the write/read addresses to the RAM unit 311 and the shift amount to the barrel register 312.

Figure 27:
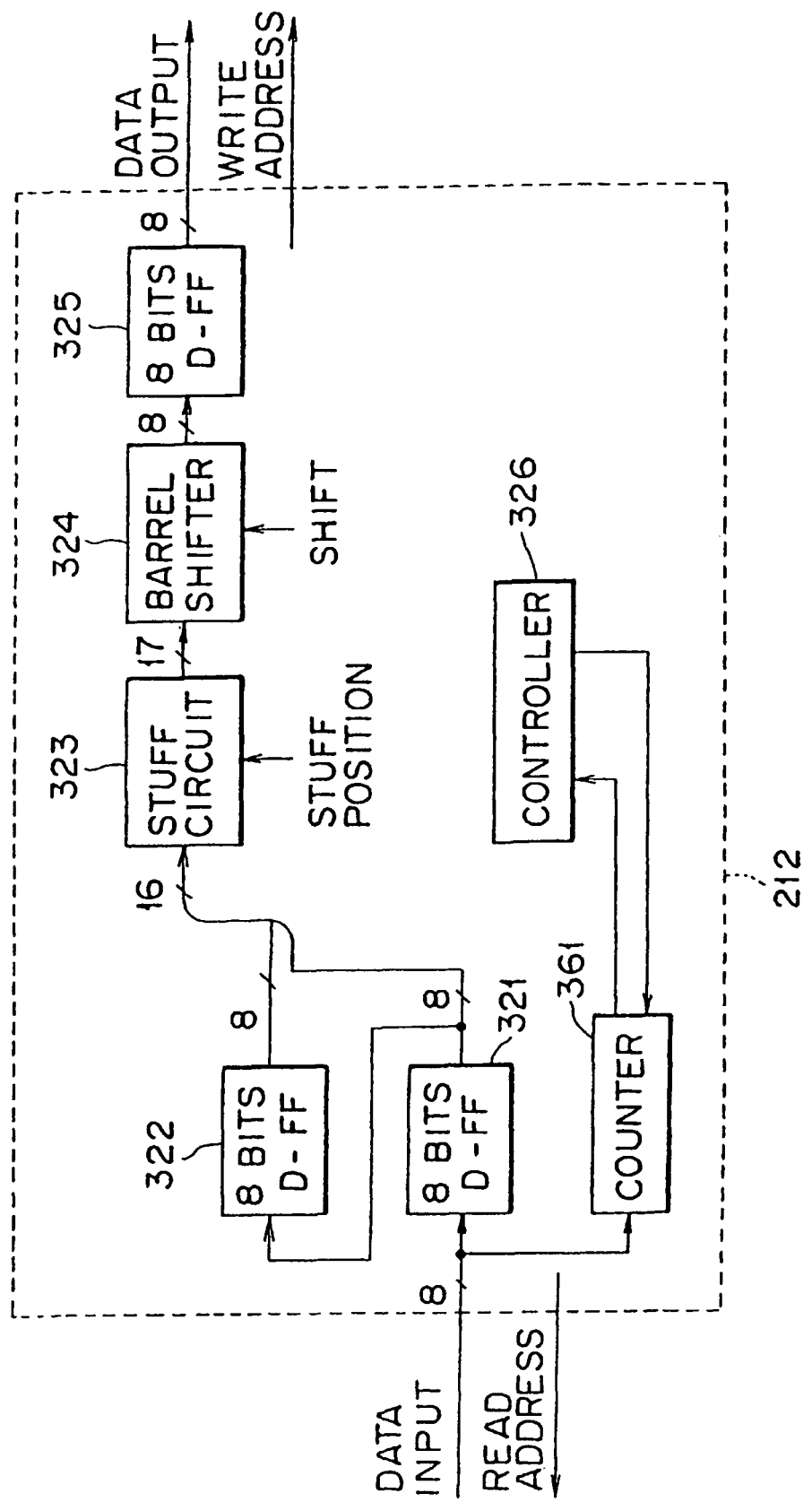
FIG. 27 is a block diagram showing another typical configuration of the converter 212 employed in the transcoder 101 shown in FIG. 15.

FIG. 27 is a block diagram showing another typical configuration of the converter 212. A counter 361 employed in this configuration counts the number of consecutive 0 bits of data supplied thereto, outputting the result of counting to the controller 326. When the number of consecutive 0-bit of data supplied to the counter 361 reaches 22, the controller 326 outputs a signal representing a stuff position to the stuff circuit 323. At the same time, the controller 326 resets the counter 361, allowing the counter 361 to start counting the number of consecutive 0-bit again from 0. The rest of the configuration and the operation are the same as those of the converter 212 shown in FIG. 22.

Figure 28:
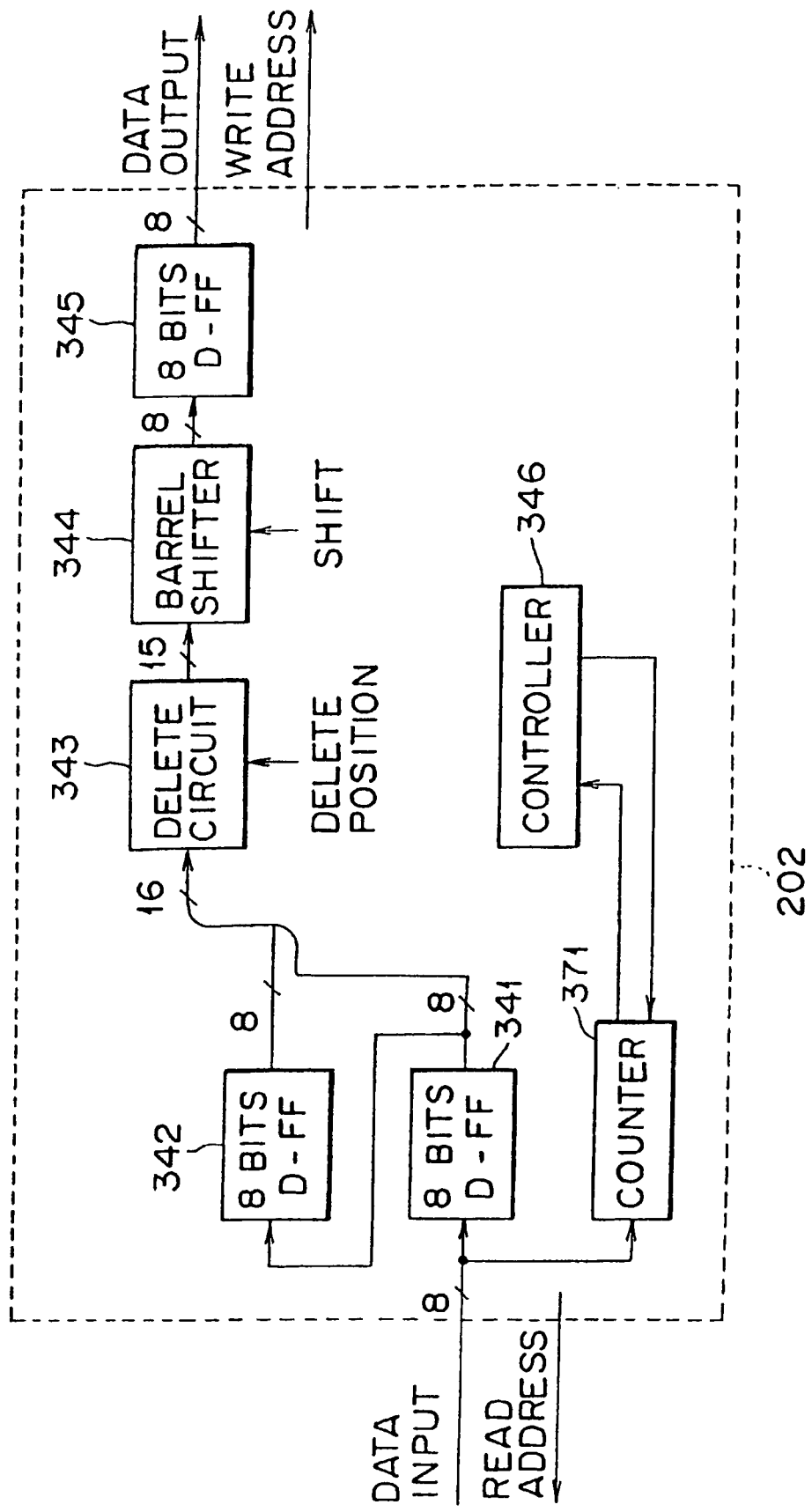
FIG. 28 is a block diagram showing another typical configuration of the converter 202 employed in the transcoder 101 shown in FIG. 15.

FIG. 28 is a block diagram showing another typical configuration of the converter 202. A counter 371 employed in this configuration counts the number of consecutive 0-bit of data supplied thereto, outputting the result of counting to the controller 346. When the number of consecutive 0-bit of data supplied to the counter 371 reaches 22, the controller 346 outputs a signal representing a delete position to the delete circuit 343. At the same time, the controller 346 resets the counter 371, allowing the counter 371 to start counting the number of consecutive 0-bit again from 0. The rest of the configuration and the operation are the same as those of the converter 202 shown in FIG. 25.

As described above, in the typical configurations shown in FIGS. 27 and 28, the data "1" is inserted as a marker bit and deleted respectively when a predetermined pattern comprising a predetermined number of consecutive 0-bit is detected by the counter. The typical configurations shown in FIGS. 27 and 28 allow processing to be carried out with a higher degree of efficiency than the configurations shown in FIGS. 22 and 25 respectively.

Figure 29:
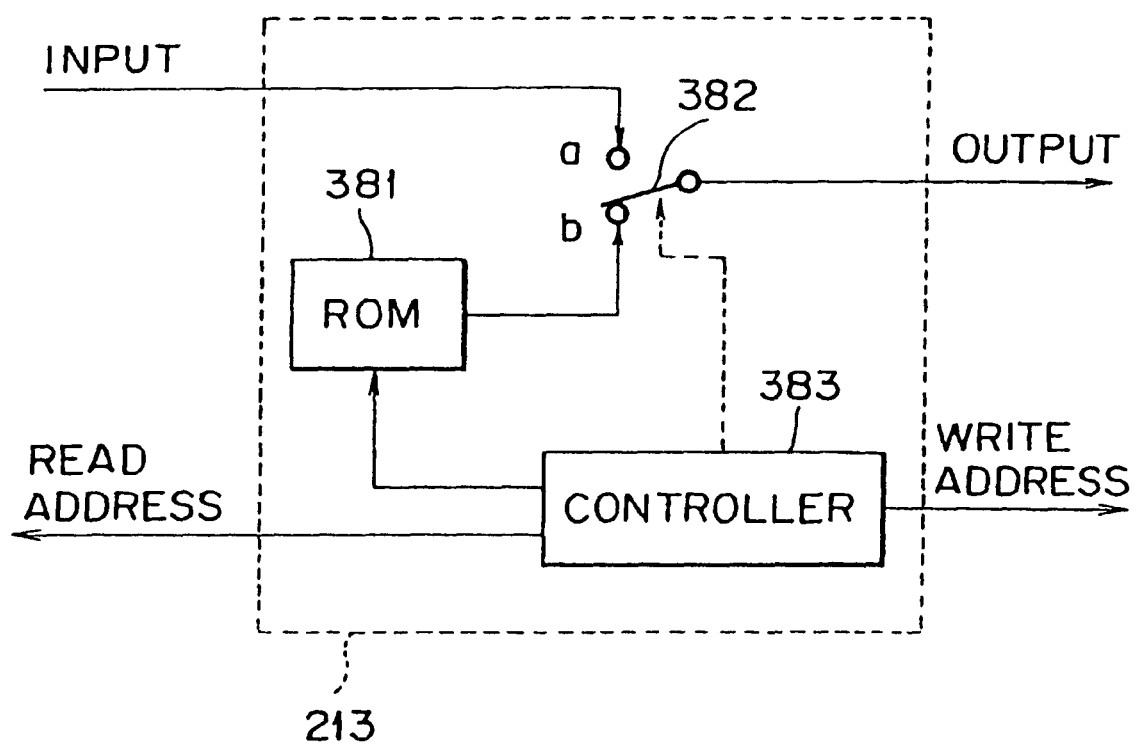
FIG. 29 is a block diagram showing a typical configuration of a user-data formatter 213 employed in the transcoder 101 shown in FIG. 15.

FIG. 29 is a block diagram showing a typical configuration of the user-data formatter 213. In this configuration, when a controller 383 outputs a read address to a buffer memory not shown provided between the converter 212 and the user-data formatter 213, data is output from the read address and supplied to a contact point a of a switch 382 employed in the user-data formatter 213. It should be noted that the buffer memory itself is not shown in the figure. In a ROM unit 381, data required for generating user_data( ) such as a user-data start code and a data ID is stored. A controller 313 changes over the switch 382 to the contact point a or a contact point b with predetermined timing in order to allow the switch 382 to select the data stored in the ROM unit 381 or data supplied by the converter 212 and pass on the selected data. In this way, data with a format of user_data( ) is output to the encoding apparatus 106.

It is worth noting that the user-data decoder 201 can be implemented by outputting input data by way of a switch for deleting inserted data read out from a ROM unit like the ROM unit 381 employed in the user-data formatter 213 shown in FIG. 29. The configuration of the user-data decoder 201 is shown in none of the figures.

Figure 30:
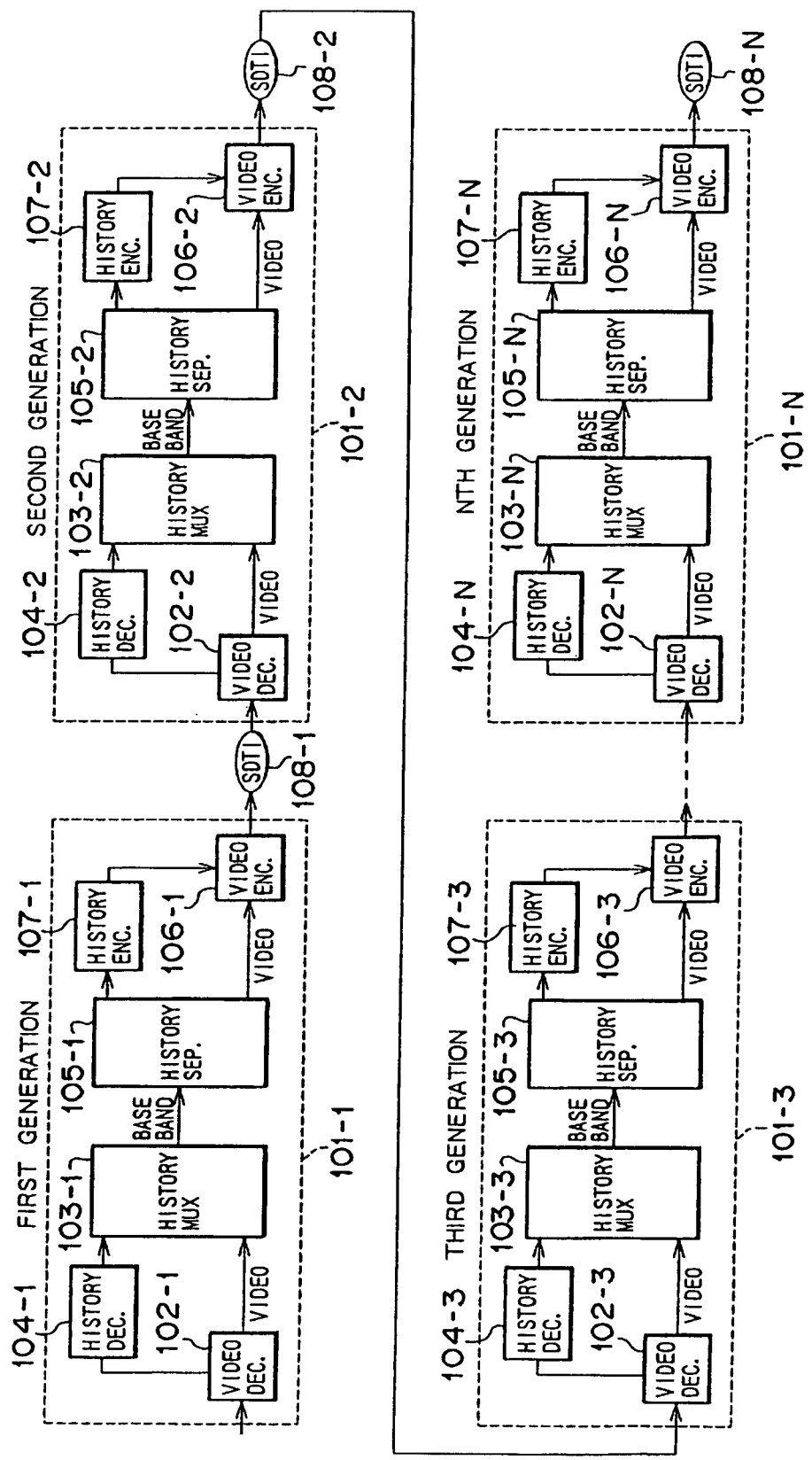
FIG. 30 is a block diagram showing the configuration of an actual system employing a plurality of transcoders 101 each shown in FIG. 14.

FIG. 30 is a block diagram showing the state of an implementation in which a plurality of transcoders 101-1 to 101-N are connected in series for the use of video editing studio service. The encoding-parameter multiplexing apparatuses 103-i employed in the transcoders 101-i where i=1 to N each write most recent encoding parameters used by itself over a region for storing least recent encoding parameters in an area used for recording encoding parameters. As a result, baseband picture data includes encoding parameters or generation history information of the four most recent generations associated with the macroblocks of the picture data.

The variable-length-encoding circuit 58 employed in the encoder 121-i of FIG. 19 employed in the encoding apparatus 106-i encodes video data received from the quantization circuit 57 on the basis of current encoding parameters received from the encoding-parameter separating circuit 105-i. As a result, the current encoding parameters are multiplexed typically in picture_header( ) included in a bitstream generated by the variable-length-encoding circuit 58.

In addition, the variable-length-encoding circuit 58 also multiplexes user data, which includes generation history information and is received from the history encoding apparatus 107-i, into the output bitstream. This multiplexing process is not the embedded processing like the one shown in FIG. 18, but multiplexing of the user data into the bitstream. Then, the bitstream output by the encoding apparatus 106-i is supplied to the transcoder 101-(i+1) at the following stage by way of the SDTI 108-i.

The configurations of the transcoders 101-i and 101-(i+1) are the same as the one shown in FIG. 15. The processing carried out by them can thus be explained by referring to FIG. 15. If it is desired to change the current picture type from the I-picture to the P- or B-picture in an encoding operation using the history of actual encoding parameters, the history of previous encoding parameters is searched for those of a P- or B-picture used in the previous. If a history of a P or B-picture is found in the history, its parameters including a motion vector are used to change the picture type. If a history of a P- or B-picture is not found in the history, on the other hand, the modification of the picture type without motion detection is given up. It is needless to say that the picture type can be changed even if an encoding parameter of a P- or B-picture is not found in the history provided that motion detection is carried out.

Figure 31:
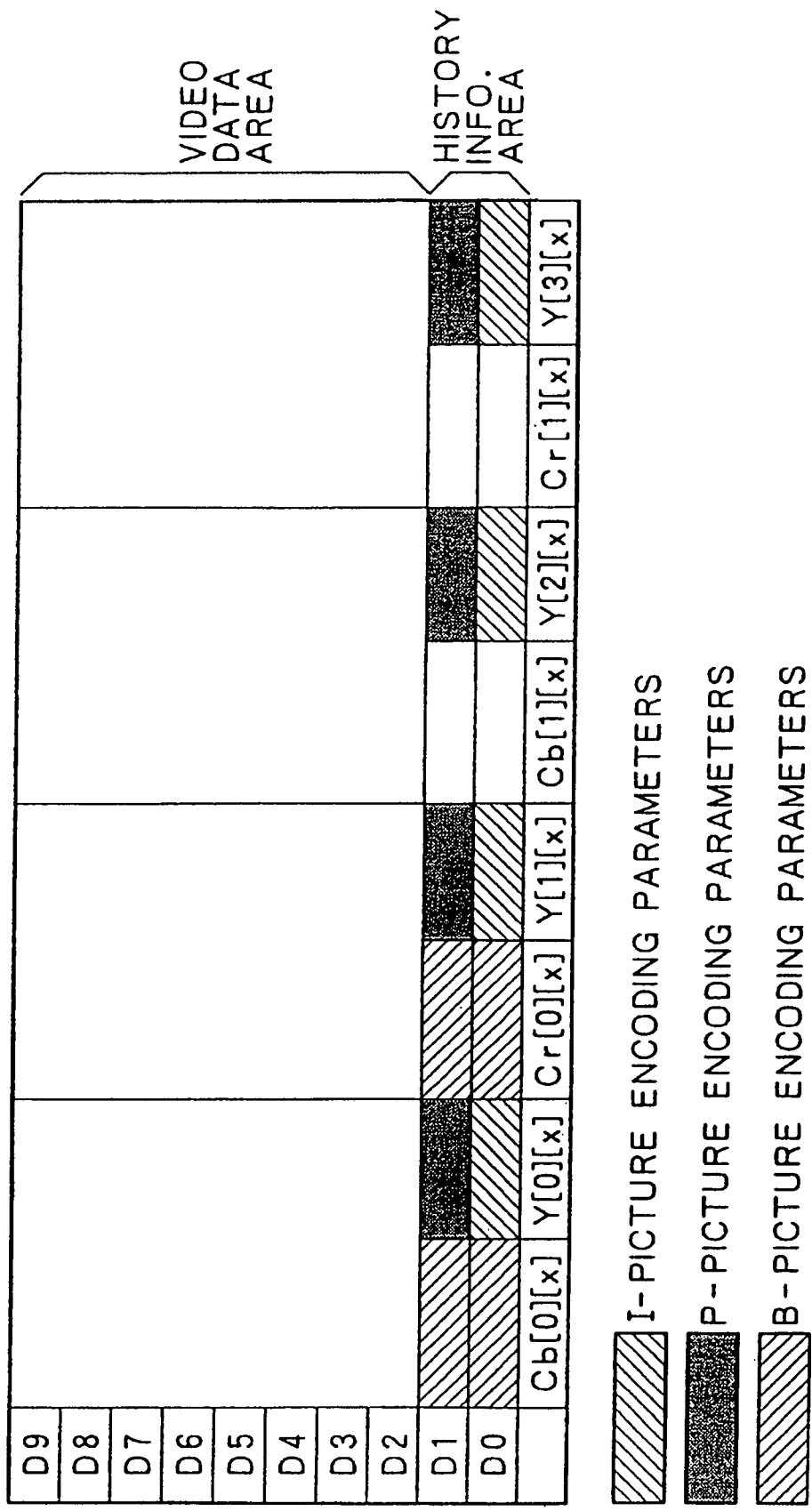
FIG. 31 is a diagram showing areas for recording encoding parameters.

In the format shown in FIG. 18, encoding parameters of four generations are embedded in picture data. As an alternative, parameters for each of the I-, P- and B-pictures can also be embedded in a format like one shown in FIG. 31. In the example shown in FIG. 31, encoding parameters or picture history information of one generation are recorded for each picture type in an operation to encode the same macroblocks accompanying changes in picture type occurring in the previous. In this case, the decoder 111 shown in FIG. 16 outputs encoding parameters of one generation for the I-, P- and B-pictures to be supplied to the encoder 121 shown in FIG. 19 instead of encoding parameters of most recent; the first, second and third preceding generations.

In addition, since the area of Cb[1][x] and Cr[1] [x] is not used, the present invention can also be applied to picture data of a 4:2:0 format which does not use the area of Cb[1][x] and Cr[1] [x]. In the case of this example, the decoding apparatus 102 fetches encoding parameters in the course of decoding and identifies the picture type. The decoding apparatus 102 writes or multiplexes the encoding parameters into a location corresponding to the picture type of the picture signal and outputs the multiplexed picture signal to the encoding-parameter separating apparatus 105. The encoding-parameter separating apparatus 105 separates the encoding parameters from the picture data and, by using the separated encoding parameters, the encoding-parameter separating apparatus 105 is capable of carrying out a post-decoding-encoding process while changing the picture type by taking a picture type to be changed and previous encoding parameters supplied thereto into consideration.

The transcoder 101 has another operation which is different from the parameter-reuse-encoding process to deter mine a changeable picture type in only case of the controller 70 does not allow the motion vector detecting circuits to operate.

Figure 32:
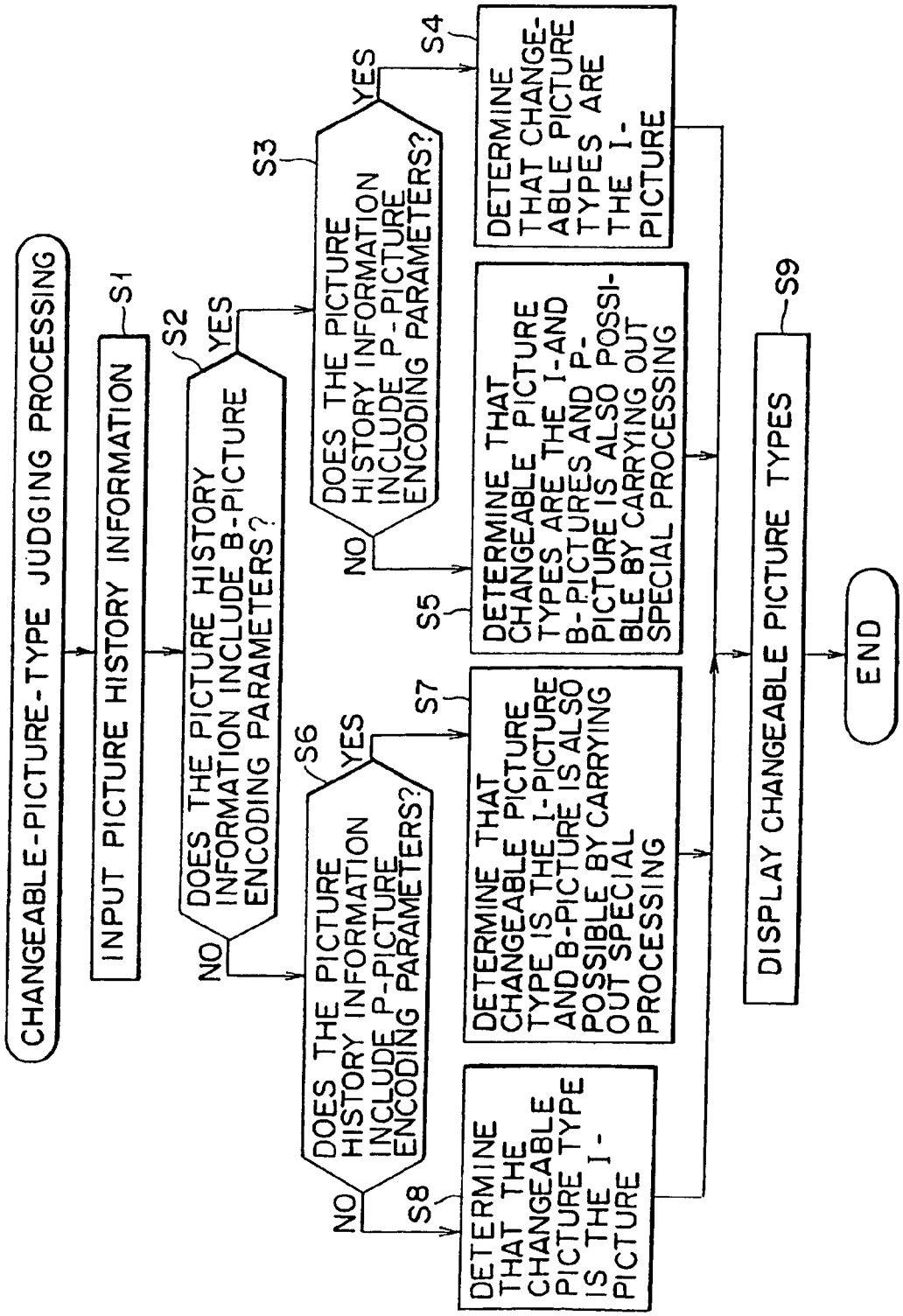
FIG. 32 is a flowchart used for explaining processing carried out by the encoding apparatus 106 employed in the transcoder 101 shown in FIG. 14 to determine changeable picture types.

The other operation is explained by referring to a flowchart shown in FIG. 32. As shown in FIG. 32, the flowchart begins with a step S1 at which encoding parameters or picture history information of one generation for each picture type are supplied to the controller 70 of the encoder 121. The flow of the processing then goes on to a step S2 at which the encoding-parameter separating apparatus 105 forms a judgment as to whether or not picture history information includes encoding parameters used in a change to a B-picture. If the picture history information includes encoding parameters used in a change to a B-picture, the flow of the processing proceeds to a step S3.

At the step S3, the econtroller 70 forms a judgment as to whether or not picture history information includes encoding parameters used in a change to a P-picture. If the picture history information includes encoding parameters used in a change to a P-picture, the flow of the processing proceeds to a step S4.

At the step S4, the controller 70 determines that changeable picture types are the I-, P- and B-pictures. If the outcome of the judgment formed at the step S3 indicates that the picture history information does not include encoding parameters used in a change to a P-picture, on the other hand, the flow of the processing proceeds to a step S5.

At the step S5, the controller 70 determines that changeable picture types are the I- and B-pictures. In addition, the controller 70 determines that a pseudo-change to a P-picture is also possible by carrying out special processing using only a forward-prediction vector and no backward-prediction vector included in history information of the B-picture. If the outcome of the judgment formed at the step S2 indicates that the picture history information does not include encoding parameters used in a change to a B-picture, on the other hand, the flow of the processing proceeds to a step S6.

At the step S6, the controller 70 forms a judgment as to whether or not picture history information includes encoding parameters used in a change to a P-picture. If the picture history information includes encoding parameters used in a change to a P-picture, the flow of the processing proceeds to a step S7.

At the step S7, the controller 70 determines that changeable picture types are the I- and P-pictures. In addition, the encoding-parameter separating apparatus 105 determines that a change to a B-picture is also possible by carrying out special processing using only a forward-prediction vector and no backward-prediction vector included in history information of the P-picture.

If the outcome of the judgment formed at the step S6 indicates that the picture history information does not include encoding parameters used in a change to a P-picture, on the other hand, the flow of the processing proceeds to a step S8. At the step S8, the controller 70 determines that the only changeable picture type is the I-picture because there is no motion vector. An I-picture can not be changed to any other picture type than the I-picture.

After completing the steps S4, S5, S7 or S8, the flow of the processing goes on to a step S9 at which the controller 70 notifies the user of the changeable picture types on a display unit which is shown in none of the figures.

Figure 33:
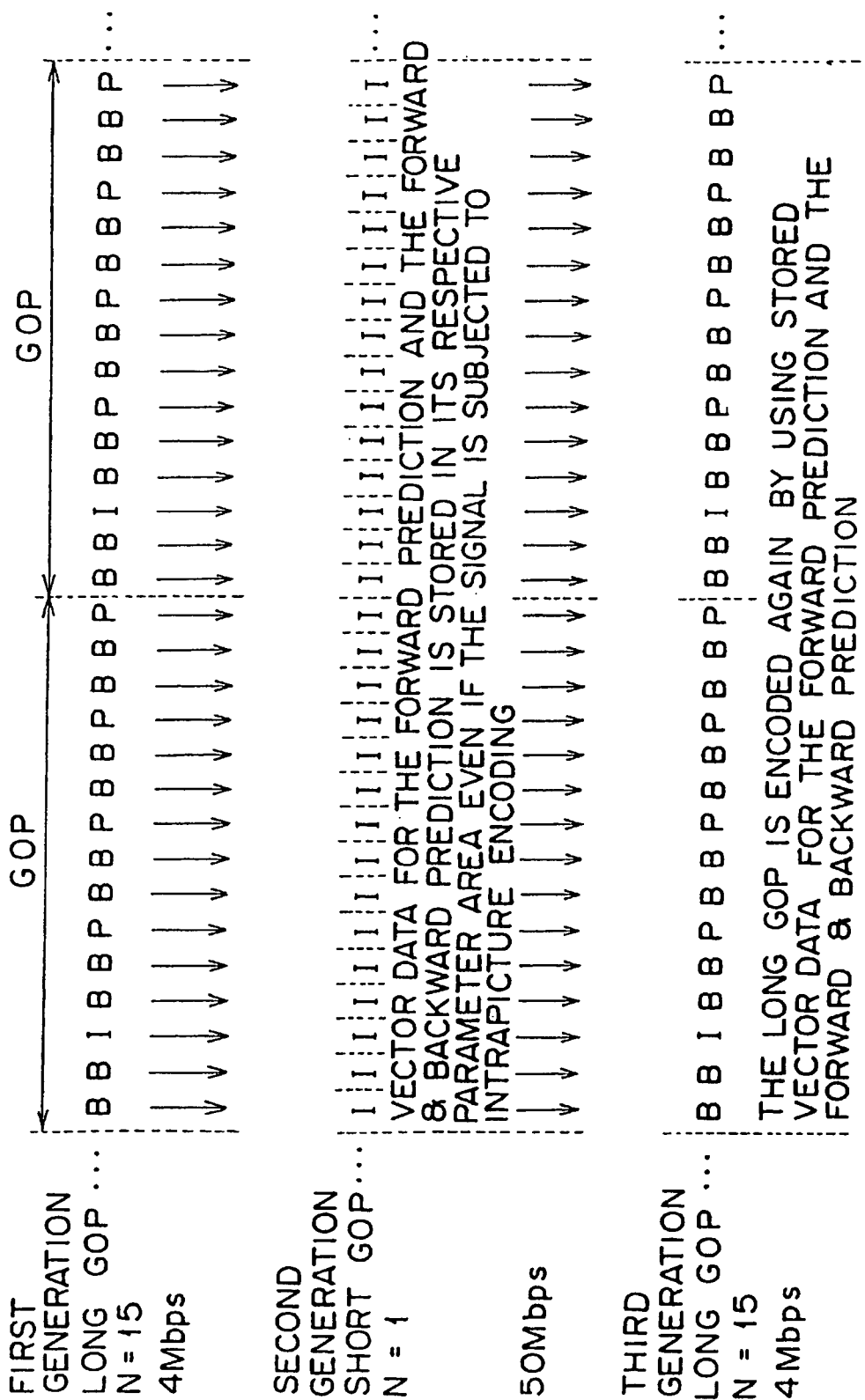
FIG. 33 is a diagram showing an example of changing picture types.

FIG. 33 is a diagram showing examples of changes in picture type. When the picture type is changed, the number of frames composing a GOP structure is changed. To put it in detail, in these examples, a long GOP structure is changed to a short GOP structure of the second generation. And then, the GOP structure of athe second generation is changed back to a long GOP at a third generation. The long GOP structure has an N=15 and an M=3, where N is the number of frames constituting the GOP and M is the period of the appearance of the P-picture expressed in terms of frames. On the other hand, the short GOP has an N=1 and an M=1 where M is the period of the appearance of the I-picture expressed in terms of frames. It should be noted that a dashed line shown in the figure represents a boundary between two adjacent GOPs.

When the GOP structure of the first generation is changed to the GOP structure of the second generation, the picture types of all the frames can be changed to the I-picture as is obvious from the explanation of the processing to determine changeable picture types given above. When these picture types are changed, all motion vectors which were processed when the source video signal was encoded in the first generation are saved or left. Then, when the short GOP structure is changed back to the long GOP structure at the third generation. That is, even if picture types are changed, the motion vector for each type which was saved when the source video signal was encoded at the first generation is re-utilized, allowing a change back to the long GOP structure to be made with deterioration of the picture quality avoided.

Figure 34:
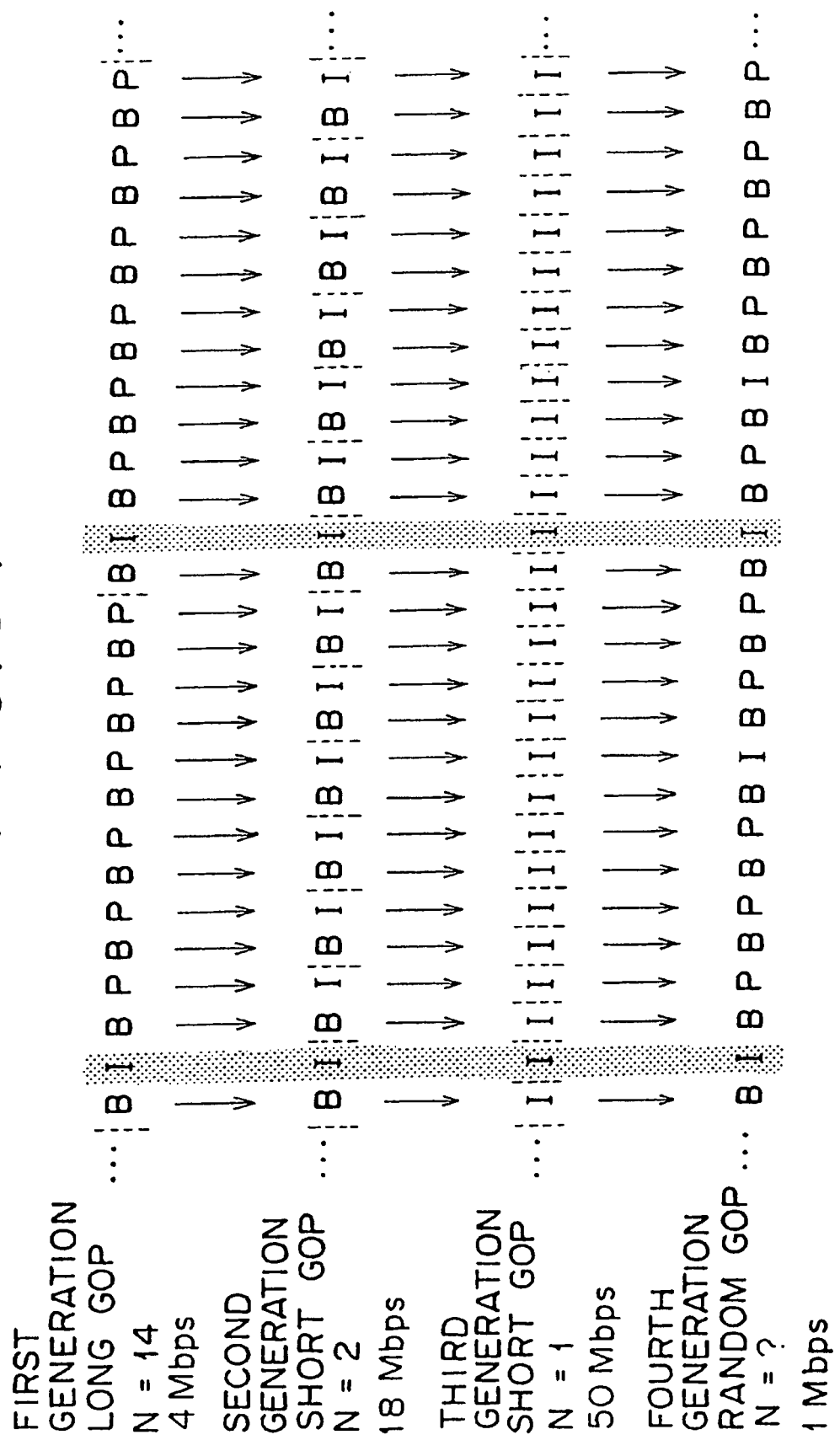
FIG. 34 is a diagram showing another example of changing picture types.

FIG. 34 is a diagram showing another examples of changes in picture type. In the case of these examples, changes are made from a long GOP structure with N=14 and M=2 to a short GOP structure with N=2 and M=2 at the second generation and then to a short GOP structure with N=1 and M=1 and finally to a random GOP with an undetermined frame count N at the fourth generation.

Also in these examples, a motion vector for each picture type which was processed when the source video signal was encoded as the first generation is saved until the fourth generation. As a result, by re-utilizing the saved encoding parameters, deterioration of the picture quality can be reduced to a minimum even if the picture types are changed in a complicated manner as shown in FIG. 34. In addition, if the quantization scale of the saved encoding parameters is utilized effectively, an encoding process which entails only little deterioration of the picture quality can be implemented.

Figure 35:
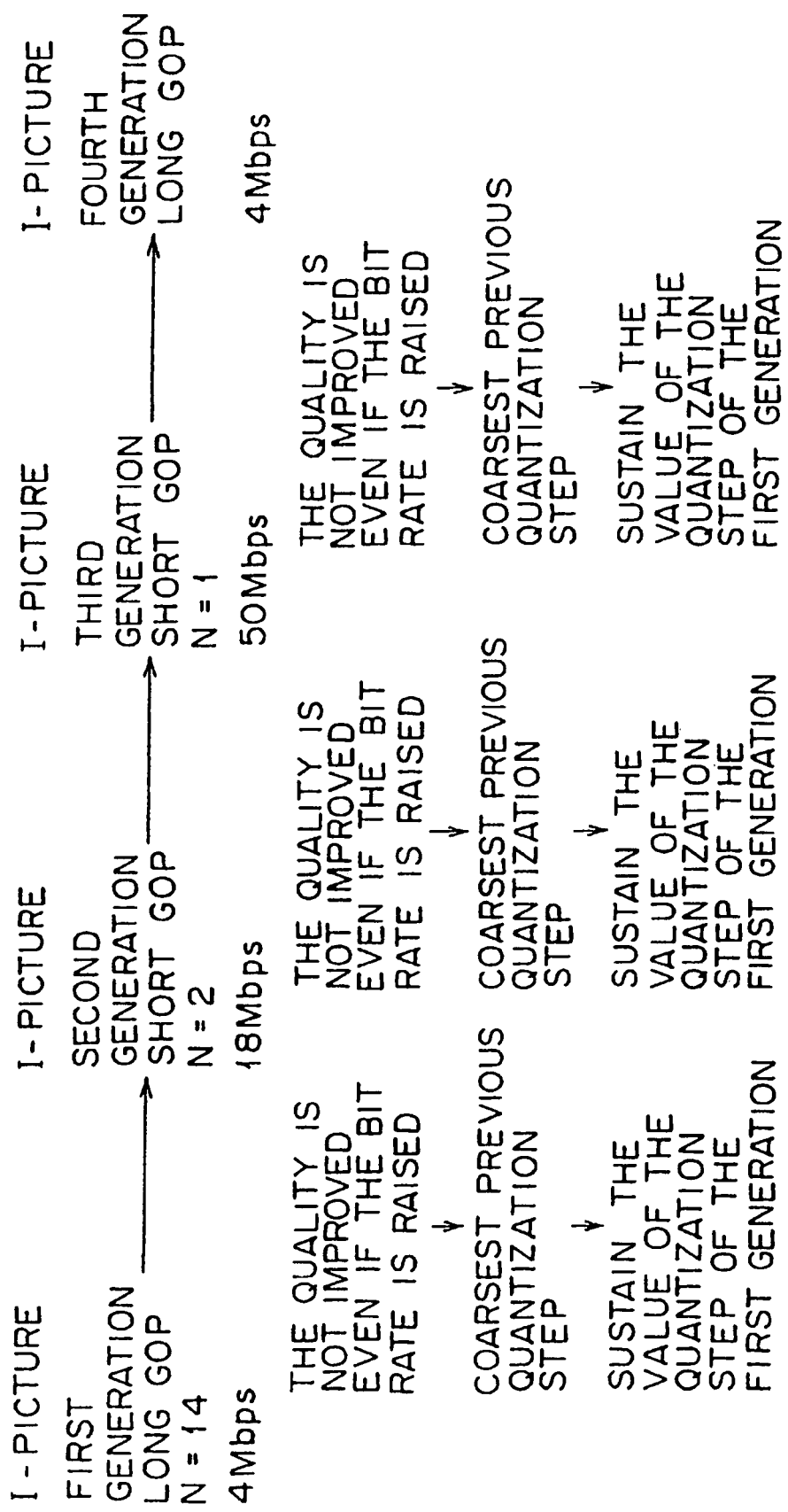
FIG. 35 is an explanatory diagram used for describing quantization control processing carried out by the encoding apparatus 106 employed in the transcoder 101 shown in FIG. 14.

The re-utilization of the quantization scale is explained by referring to FIG. 35. FIG. 35 is a diagram showing a case in which a certain reference frame is always encoded with an I-picture from a first generation to a fourth generation. Only the bit rate is changed from 4 Mbps for the first generation to 18 Mbps for the second generation and then to 50 Mbps for the third generation and finally back to 4 Mbps for the fourth generation.

When a bit rate of 4 Mbps of bitstream generated at first generation is changed to a bit rate of 18 Mbps at second generation, the picture quality is not improved even a post-decoding-encoding process is carried out at a fine quantization scale accompanying the increase in bit rate. This is because data quantized in the previous at a coarse quantization step is not restored. Thus, quantization at a fine quantization step accompanying a raise in bit rate in the course of processing as shown in FIG. 35 merely increases the amount of information and does not lead to an improvement of the picture quality. For this reason, if control is executed to sustain a coarsest or largest quantization scale used in the previous, the encoding process can be implemented least wastefully and most efficiently.

As described above, when the bit rate is changed, by making use of the previous history of the quantization scale, the encoding process can be implemented most effectively.

Figure 36:
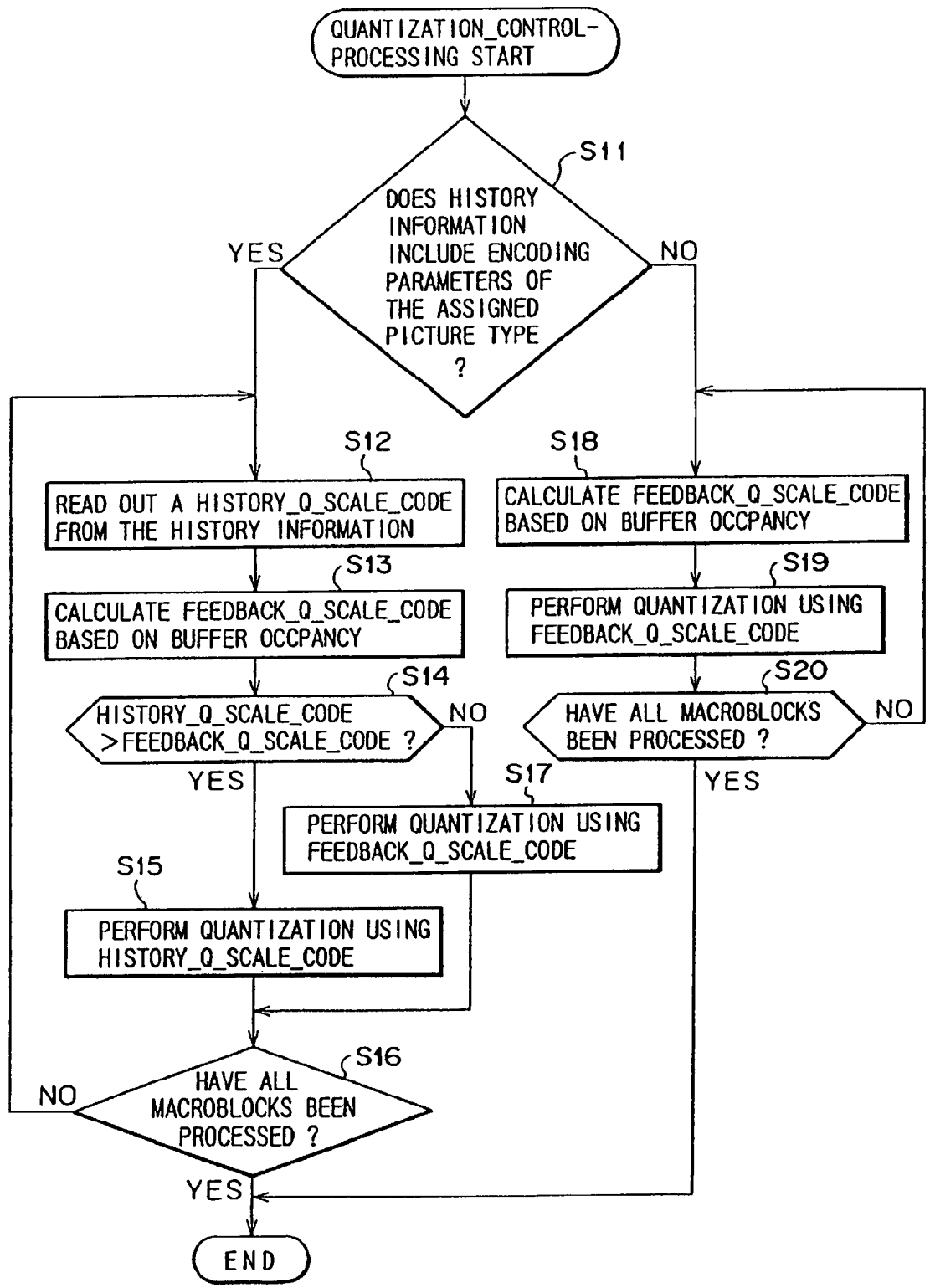
FIG. 36 is a flowchart used for explaining quantization control processing carried out by the encoding apparatus 106 employed in the transcoder 101 shown in FIG. 14.

This quantization control processing is explained by referring to a flowchart shown in FIG. 36. As shown in the figure, the flowchart begins with a step S11 at which controller 70 forms a judgment as to whether or not input picture history information includes an encoding parameter of a picture type to be changed from now on. If the outcome of the judgment indicates that the input picture history information includes an encoding parameter of a picture type to be changed, the flow of the processing goes on to a step S12.

At the step S12, the controller 70 extracts the history_q_scale_code from the encoding parameters in question for comparison included in the picture history information.

The flow of the processing then proceeds to a step S13 at which the controller 70 calculates a candidate value of the feedback_q_scale_code obased on a data fullness of the transmission buffer 59.

The flow of the processing then proceeds to a step S14 at which the controller 70 forms a judgment as to whether or not history_q_scale_code is larger or coarser than feedback_q_scale_code. If the outcome of the judgment indicates that history_q_scale_code is larger or coarser than feedback_q_scale_code, the flow of the processing continues to a step S15.

At the step S15, the controller 70 supplies history_q_scale_code as a quantization scale to the quantization circuit 57 which then carries out a quantization process by using history_q_scale_code.

The flow of the processing then proceeds to a step S16 at which the controller 70 forms a judgment as to whether or not all macroblocks included in the frame have been quantized. If the outcome of the judgment indicates that all the macroblocks included in the frame not have been quantized yet, the flow of the processing goes back to the step S13 to carry out the pieces of processing of the steps S13 to S16 repeatedly till all the macroblocks included in the frame are quantized.

If the outcome of the judgment formed at the step S14 indicates that history_q_scale_code is not larger than feedback_q_scale_code, that is, history_q_scale_code is finer than feedback_q_scale_code, on the other hand, the flow of the processing continues to a step S17.

At the step S17, the controller 70 supplies feeds back feedback_q_scale_code as a quantization scale to the quantization circuit 57 which then carries out a quantization process by using feedback_q_scale_code.

If the outcome of the judgment formed at the step S11 indicates that the input picture history information does not include an encoding parameter of a picture type to be changed, on the other hand, the flow of the processing goes on to a step S18.

At the step S18, the quantization circuit 57 receives the candidate value of the feedback_q_scale_code from the controller 70.

The flow of the processing then proceeds to a step S19 at which the quantization circuit 57 which carries out a quantization process by using Q_feedback.

The flow of the processing then proceeds to a step S20 at which controller 70 forms a judgment as to whether or not all macroblocks included in the frame have been quantized. If the outcome of the judgment indicates that all the macroblocks included in the frame not have been quantized yet, the flow of the processing goes back to the step S18 to carry out the pieces of processing of the steps S18 to S20 repeatedly till all the macroblocks included in the frame are quantized.

The transcoder 101 explained earlier by referring to FIG. 15 supplies previous encoding parameters of the first, second and third generations to the video encoding apparatus 106 by multiplexing these parameters in base-band video data. In the present invention, however, a technology of multiplexing previous encoding parameters in base-band video data is not absolutely required. For example, previous encoding parameters can be transferred by using a transmission line such as a data transfer bus provided separately from that for the base-band video data as shown in FIG. 37.

Figure 37:
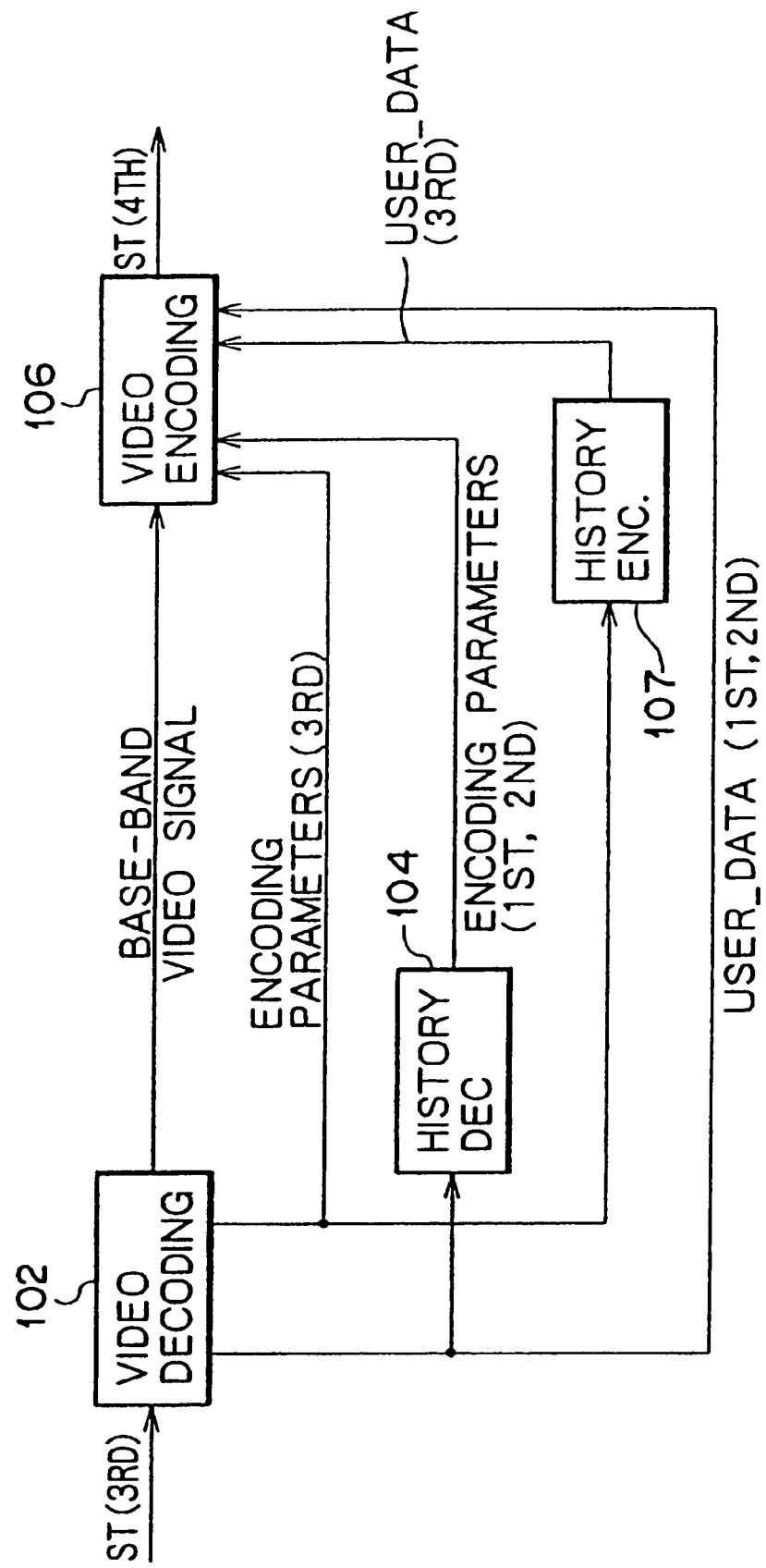
FIG. 37 is a block diagram showing the configuration of a tightly coupled transcoder 101.

The video decoding apparatus 102, the history decoding apparatus 104, the video encoding apparatus 106 and the history encoding apparatus 107 shown in FIG. 37 have entirely the same configurations and functions as the video decoding apparatus 102, the history decoding apparatus 104, the video encoding apparatus 106 and the history encoding apparatus 107 respectively which have been described earlier by referring to FIG. 15.

The variable-length decoding circuit 112 employed in the video decoding apparatus 102 extracts encoding parameters of the third generation from the sequence layer, the GOP layer, the picture layer, the slice layer and the macroblock layer of the encoded video bitstream ST(3rd) of the third generation, supplying the parameters to the history encoding apparatus 107 and the controller 70 employed in the video encoding apparatus 106. The history encoding apparatus 107 converts the encoding parameters of the third generation supplied thereto into converted_history_stream( ) which can be described in the user-data area on the picture layer, supplying converted_history_stream( ) to the variable-length coding circuit 58 employed in the video encoding apparatus 106 as user data.

In addition, the variable-length decoding circuit 112 also extracts user data (user_data) including previous encoding parameters of the first and second generations from the user-data area on the picture layer of the encoded video bitstream ST(3rd) of the third generation, supplying the user_data to the history decoding apparatus 104 and the variable-length coding circuit 58 employed in the video encoding apparatus 106. The history decoding apparatus 104 extracts the encoding parameters of the first and second generations from a history steam of the user data which is described in the user-data area as converted_history_stream( ), supplying the parameters to the controller 70 employed in the video encoding apparatus 106.

The controller 70 of the video encoding apparatus 106 controls the encoding process carried out by the video encoding apparatus 106 on the basis of the encoding parameters of the first and second generations received from the history decoding apparatus 104 and the encoding parameters of the third generation received from the video decoding apparatus 102.

In the meantime, the variable-length coding circuit 58 employed in the video encoding apparatus 106 receives the user data (user_data) including encoding parameters of the first and second generations from the video decoding apparatus 102 and the user data (user_data) including encoding parameters of the third generation from the history encoding apparatus 107, describing these pieces of user_data in the user-data area on the picture layer of an encoded video bitstream of the fourth generation as history information.

FIG. 38 is a diagram showing a syntax used for decoding an MPEG video stream. The decoder decodes an MPEG bit stream in accordance with this syntax in order to extract a plurality of meaningful data items or meaningful data elements from the bitstream. In the syntax to be explained below, a function and a conditional statement are each represented by a string of normal characters whereas a data element is represented by a string of bold characters. A data item is described by the Mnemonic representing the name of the data item. In some cases, the Mnemonic also indicates the bit length composing the data item and the type of the data item.

First of all, functions used in the syntax shown in FIG. 38 are explained. A next_start_code( ) is a function used for searching a bitstream for a start code described in the bitstream. In the syntax shown in FIG. 38, the next_start_code( ) function is followed by a sequence_header( ) function and a sequence_extension( ) function which are laid out sequentially to indicate that the bitstream includes data elements defined by the sequence_header( ) and sequence_extension( ) functions. Thus, a start code, a kind of data element described at the beginning of the sequence_header( ) and sequence_extension( ) functions, is found by the next_start_code( ) function from the bitstream in an operation to decode the bitstream. The start code is then used as a reference to further find the sequence_header( ) and sequence_extension( ) functions and decode data elements defined by the sequence_header( ) and sequence_extension( ) functions.

It should be noted that the sequence_header( ) function is a function used for defining header data of a sequence layer in the MPEG bitstream whereas the sequence_extension( ) function is a function used for defining extension data of a sequence layer in the MPEG bitstream.

A do { } while statement is described after the sequence_extension( ) function. The do { } while statement comprises a { } block following a do statement and a while statement following the { } block. Data elements described by functions in the { } block following the do statement are extracted from the bitstream as long as a condition defined by the while statement is true. That is to say, the do { } while syntax defines a decoding process to extract data elements described by functions in the { } block following the do statement from the bitstream as long as the condition defined by the while statement is true.

A nextbits( ) used in the while statement is a function used to compare a bit or a string of bits appearing in the bitstream with a data element to be decoded next. In the example of the syntax shown in FIG. 38, the nextbits( ) function compares a string of bits appearing in the bitstream with sequence_end_code used for indicating the end of a video sequence. The condition defined by the while statement is the to be true if the string of bits appearing in the bitstream does not match sequence_end_code. Thus, the do { } while statement described after the sequence_extension( ) function indicates that data elements defined by functions in the { } block following the do statement are described in the bitstream as long as sequence_end_code used for indicating the end of a video sequence does not appear in the bitstream.

After the data elements defined by the sequence_extension( ) function in the bitstream, data elements defined by an extension_and_user_data(0) function are described. The extension_and_user_data(0) function is a function used for defining extension data and user data of the sequence layer of the MPEG bitstream.

A do { } while statement following the extension_and_user_data(0) function is a function to extract data elements described by functions in the { } block following the do statement from the bitstream as long as a condition defined by the while statement is true. The nextbits( ) functions used in the while statement are functions used to form a judgment as to whether or not a bit or a string of bits appearing in the bitstream matches picture_start_code or group_start_code start codes respectively by comparing the string with the start code specified in the function. If the string of bits appearing in the bitstream matches picture_start_code or group_start_code, a condition defined by the while statement is said to be true. Thus, if picture_start_code or group_start_code appears in the bitstream, the codes of data elements defined by functions in the { } block following the do statement are described after this start code. Accordingly, by finding a start code represented by picture_start_code or group_start_code, it is possible to extract data elements defined by functions in the { } block of the do statement from the bitstream.

An if-statement described at the beginning of the { } block of the do statement states a condition "if group_start_code appears in the bitstream." A true (satisfied) condition stated by the if-statement indicates that data elements defined by a group_of_picture_header(1) function and a extension_and_user_data(1) function are described sequentially after group_start_code.

The group_of_picture_header(1) function is a function used for defining header data of a GOP layer of the MPEG bitstream and the extension_and_user_data(1) function is a function used for defining extension data named extension_data and/or user data named user_data of the GOP layer of the MPEG bitstream.

Furthermore, in this bitstream, data elements defined by a picture_header( ) function and a picture_coding_extension( ) function are described after the data elements defined by the group_of_picture_header(1) function and the extension_and_user_data(1) function. Of course, if the condition defined by the if-statement is not true, the data elements defined by the group_of_picture_header(1) function and the extension_and_user_data(1) function are not described. In this case, the data elements defined by the picture_header( ) function and the picture_coding_extension( ) function are described after the data elements defined by an extension_and_user_data(0) function.

The picture_header( ) function is a function used for defining header data to a picture layer of the MPEG stream and the picture_coding_extension( ) function is a function used for defining first extension data of the picture layer of the MPEG stream.

The next while statement is a function used for defining a condition. A condition defined by each if-statement described in a { } block following the condition defined by the while statement is judged to be true or false as long as the condition defined by the while statement is true. nextbits( ) functions used in the while statement are functions for forming a judgment as to whether a string of bits appearing in the bitstream matches extension_start_code and user_start_code respectively. If the string of bits appearing in the bitstream matches extension_start_code or user_data_start, a condition defined by the while statement is said to be true.

A first if-statement in the { } block following the while statement is a function for forming a judgment as to whether or not a string of bits appearing in the bitstream matches extension_start_code. A string of bits appearing in the bitstream that matches 32-bit extension_start_code indicates that data elements defined by an extension_data(2) function are described after extension_start_code in the bitstream.

A second if-statement is a function for forming a judgment as to whether or not a string of bits appearing in the bitstream matches user_data_start_code. If a string of bits appearing in the bitstream matches 32-bit user_data_start_code, a condition defined by a third if-statement is judged to be true or false. The user_data_start_code is a start code used for indicating the beginning of a user-data area of the picture layer of the MPEG bitstream.

The third if-statement in the { } block following the while statement is a function for forming a judgment as to whether or not a string of bits appearing in the bitstream matches History_Data_ID. A string of bits appearing in the bitstream that matches 8-bit History_Data_ID indicates that data elements defined by a converted_history_stream( ) function are described after a code indicated by 8-bit History_Data_ID in the user-data area of the picture layer of the MPEG bitstream.

A converted_history_stream( ) function is a function used for describing history information and history data for transmitting all encoding parameters used in the MPEG encoding process. Details of data elements defined by this converted_history_stream( ) function will be described later. History_Data_ID is a start code used for indicating the beginning of a description of the history information and the history data in the user-data area of the picture layer of the MPEG bitstream.

An else statement is syntax indicating a case for a false condition defined by the third if-statement. Thus, if data elements defined by a converted_history_stream( ) function are not described in the user-data area of the picture layer of the MPEG bitstream, data elements defined by a user_data( ) function are described.

A picture_data( ) function is a function used for describing data elements related to a slice layer and a macroblock layer after user data of the picture layer of the MPEG bitstream. Normally, data elements defined by this picture_data( ) function are described after data elements defined by a user_data( ) function or data elements defined by a converted_history_stream( ) function described in the user-data area of the picture layer of the bitstream. If neither extension_start_code nor user_data_start_code exists in a bitstream showing data elements of the picture layer, however, data elements defined by this picture_data( ) function are described after data elements defined by a picture_coding_extension( ) function.

After the data elements defined by this picture_data( ) function, data elements defined by a sequence_header( ) function and a sequence_extension( ) function are described sequentially. The data elements described by the sequence_header( ) function and the sequence_extension( ) function are exactly the same data elements as defined by a sequence_header( ) function and a sequence_extension( ) function described at the beginning of a sequence of the video stream. The reason why the same pieces of data are defined in the stream is to prevent data of the sequence layer from being no longer receivable, thus, preventing a stream from being no longer decodable when reception of a bitstream is started by a bitstream receiving apparatus in the middle of a data stream, such as part of bitstream corresponding to a picture layer.

After the data elements defined by the sequence_header( ) function and the sequence_extension( ) function, that is, at the end of the data stream, 32-bit sequence_end_code used for indicating the end of the sequence is described.

FIG. 39 is a schematic diagram showing an outline of the basic configuration of the syntax described so far.

Next, a history stream defined by a converted_history_stream( ) function is explained.

The converted_history_stream( ) function is a function used for inserting a history stream showing history information into the user-data area of the picture layer of the MPEG bitstream. It should be noted that the word 'converted' means that the stream has completed a conversion process to insert one marker bit for at least every 22 bits of the history stream composed of history data to be inserted into the user area in order to avoid start emulation.

The converted_history_stream( ) function is described in either one of a format of a fixed-length history stream shown in FIGS. 40 to 46 or a variable-length history stream shown in FIG. 47 to be described later. If the fixed-length history stream is selected on the encoder side, there is a merit that a circuit and software employed in the decoder for decoding data elements from the history stream become simple. If the variable-length history stream is selected on the encoder side, on the other hand, the encoder is capable of selecting arbitrarily history information or data elements described in the user area of the picture layer when necessary. Thus, the amount of data of the history stream can be reduced. As a result, the data rate of the bitstream as a whole can also be lowered as well.

The history information, the history data and the history parameter cited in the explanation of the present invention are encoding parameters or data elements used in the related art encoding processes and are not encoding-parameter data used in the current encoding process or the encoding process carried out at the last stage. Consider a case in which a picture is encoded and transmitted as an I-picture in an encoding process of a first generation, as a P-picture in an encoding process of a second generation and as a B-picture in an encoding process of a third generation. Encoding parameters used in the encoding process of the third generation are described at predetermined locations of the sequence, GOP-picture, slice and macroblock layers of an encoded bitstream generated as a result of the encoding process of the third generation. On the other hand, encoding parameters used in the encoding process of the first and second generations are not recorded in the sequence or GOP layer for recording the encoding parameters used in the encoding process of the third generation, but recorded in the user-data area of the picture layer as history information of the encoding parameters.

First of all, the syntax of the fixed-length history stream is explained by referring to FIGS. 40 to 46.

In the first place, encoding parameters related to the sequence header of the sequence layer used in the previous encoding processes, that is, the encoding processes of typically the first and second generations, are inserted as a history stream into the user-data area of the picture layer of the bitstream generated in the encoding process carried out at the last stage, that is, the encoding process of typically the third generation. It should be noted that history information related to the sequence header of the sequence layer of the bitstream generated in the previous encoding processes is never inserted into the sequence header of the sequence layer of the bitstream generated in the encoding process carried out at the last stage.

Data elements related to the sequence header used in the previous encoding processes include sequence_header_code, sequence_header_present_flag, horizontal_size_value, vertical_size_value, aspect_ratio_information, frame_rate_code, bit_rate_value, marker_bit, VBV_buffer_size_value, constrained_parameter_flag, load_intra_quantizer_matrix, intra_quantizer_matrix, load_non_intra_quantizer_matrix and non_intra_quantizer_matrix as shown in FIG. 40.

The data elements listed above are described as follows. The sequence_header_code data element is a start synchronization code of the sequence layer. The sequence_header_present_flag data element is a flag used for indicating whether data in the sequence header is valid or invalid. The horizontal_size_value data element is data comprising the low-order 12 bits of the number of pixels of the picture in the horizontal direction. The vertical_size_value data element is data comprising low-order 12 bits of the number of pixels of the picture in the vertical direction. The aspect_ratio_information data element is an aspect ratio, that is, a ratio of the height to the width of the picture, or the aspect ratio of the display screen. The frame_rate_code data element is data representing the picture display period.

The bit_rate_value data element is data comprising the low-order 18 bits of a bit rate for limiting the number of generated bits. The data is rounded up in 400-bsp units. The marker_bit data element is bit data inserted for preventing start-code emulation. The VBV_buffer_size_value data element is data comprising the low-order 10 bits of a value for determining the size of a virtual buffer (video buffer verifier) used in control of the amount of generated code. The constrained_parameter_flag data element is a flag used for indicating whether or not parameters are under constraint. The load_intra_quantizer_matrix data element is a flag used for indicating whether or not data of an intra-MB quantization matrix exists. The intra_quantizer_matrix data element is the value of the intra-MB quantization matrix. The load_non_intra_quantizer_matrix data element is a flag used for indicating whether or not data of a non-intra-MB quantization matrix exists. The non_intra_quantizer_matrix data element is the value of the non-intra-MB quantization matrix.

Subsequently, data elements representing a sequence extension used in the previous encoding processes are described as a history stream in the user area of the picture layer of the bitstream generated in the encoding process carried out at the last stage.

Data elements representing the sequence extension used in the previous encoding include extension_start_code, extension_start_code_identifier, sequence_extension_present_flag, profile_and_level_identification, progressive_sequence, chroma_format, horizontal_size_extension, vertical_size_extension, bit_rate_extension, vbv_buffer_size_extension, low_delay, frame_rate_extension_n and frame_rate_extension_d as shown in FIGS. 40 and 41.

The data elements listed above are described as follows. The extension_start_code data element is a start synchronization code of extension data. The extension_start_code_identifier data element is data used for indicating which extension data is transmitted. The sequence_extension_present_flag data element is a flag used for indicating whether data in the sequence extension is valid or invalid. The profile_and_level_identification data element is data specifying a profile and a level of the video data. The progressive_sequence data element is data showing that the video data has been obtained from sequential scanning. The chroma_format data element is data specifying the color-difference format of the video data.

The horizontal_size_extension data element is the two high-order bits data to be added to horizontal_size_value of the sequence header. The vertical_size_extension data element is the two high-order bits data to be added to vertical_size_value of the sequence header. The bit_rate_extension data element is the twelve high-order bits data to be added to bit_rate_value of the sequence header. The vbv_buffer_size_extension data element is the eight high-order bits data to be added to vbv_buffer size_value of the sequence header. The low_delay data element is data used for indicating that a B-picture is not included. The frame_rate_extension_n data element is data used for obtaining a frame rate in conjunction with frame_rate_code of the sequence header. The frame_rate_extension_d data element is data used for obtaining a frame rate in conjunction with frame_rate_code of the sequence header.

Subsequently, data elements representing a sequence-display extension of the sequence layer used in the previous encoding processes are described as a history stream in the user area of the picture layer of the bitstream.

Data elements described as a sequence-display extension are extension_start_code, extension_start_code_identifier, sequence_display_extension_present_flag, video_format, color_decription, color_primaries, transfer_characteristics, matrix_coefficients, display_horizontal_size and display_vertical_size as shown in FIG. 41.

The data elements listed above are described as follows. The extension_start_code data element is a start synchronization code of extension data. The extension_start_code_identifier data element is data used for indicating which extension data is transmitted. The sequence_display_extension_presentation_flag data element is a flag used for indicating whether data elements in the sequence extension are valid or invalid. The video_format data element is data representing the video format of the source signal. The color_description data element is data used for indicating that detailed data of a color space exists. The color_primaries data element is data showing details of a color characteristic of the source signal. The transfer_characteristics data element is data showing details of how opto-electrical conversion has been carried out. The matrix_coefficients data element is data showing details of how a source signal has been converted from the three primary colors of light. The display_horizontal_size data element is data representing the activation area or the horizontal size of an intended display. The display_vertical_size data element is data representing the activation area or the vertical size of the intended display.

Subsequently, macroblock assignment data (named macroblock_assignment_in_user_data) showing phase information of a macroblock generated in the previous encoding processes is described as a history stream in the user area of the picture layer of a bitstream generated in the encoding process carried out at the last stage.

The macroblock_assignment_in_user_data showing phase information of a macroblock comprises data elements such as macroblock_assignment_present_flag, v_phase and h_phase as shown in FIG. 41.

The data elements listed above are described as follows. The macroblock_assignment_present_flag data element is a flag used for indicating whether data elements of macroblock_assignment_in_user_data are valid or invalid. The v_phase data element is data showing phase information in the vertical direction which is obtained when the macroblock is detached from picture data. The h_phase data element is data showing phase information in the horizontal direction which is obtained when the macroblock is detached from picture data.

Subsequently, data elements representing a GOP header of the GOP layer used in the previous encoding processes are described as a history stream in the user area of the picture layer of a bitstream generated in the encoding process carried out at the last stage.

The data elements representing the GOP header are group_start_code, group_of_picture_header_present_flag, time_code, closed_gop and broken_link as shown in FIG. 41.

The data elements listed above are described as follows. The group_start_code data element is the start synchronization code of the GOP layer. The group_of_picture_header_present_flag data element is a flag used for indicating whether data elements in group_of_picture_header are valid or invalid. The time_code data element is a time code showing the length of time measured from the beginning of the first picture of the GOP. The closed_gop data element is a flag used for indicating whether or not it is possible to carry out an independent playback operation of a picture in one GOP from another GOP. The broken_link data element is a flag used for indicating whether or not the B-picture at the beginning of the GOP can not be reproduced with a high degree of accuracy because of reasons such as editing.

Subsequently, data elements representing a picture header of the picture layer used in the previous encoding processes are described as a history stream in the user area of the picture layer of a bitstream generated in the encoding process carried out at the last stage.

The data elements related to a picture header are picture_start_code, temporal_reference, picture_coding_type, vbv_delay, full_pel_forward_vector, forward_f_code, full_pel_backward_vector and backward_f_code as shown in FIGS. 41 and 42.

The data elements listed above are described concretely as follows. The picture_start_code data element is the start synchronization code of the picture layer. The temporal_reference data element is a number used for indicating a display order of the picture. This number is reset at the beginning of the GOP. The picture_coding_type data element is data used for indicating the type of the picture. The vbv_delay data element is data showing an initial state of a virtual buffer at a random access. The full_pel_forward_vector data element is a flag used for indicating whether the precision of the forward motion vector is expressed in terms of pixel units or half-pixel units. The forward_f_code data element is data representing a forward-motion-vector search range. The full_pel_backward_vector data element is a flag used for indicating whether the precision of the backward motion vector is expressed in terms of pixel units or half-pixel units. The backward_f_code data element is data representing a backward-motion-vector search range.

Subsequently, data elements representing a picture-coding extension of the picture layer used in the previous encoding processes are described as a history stream in the user area of the picture layer of a bitstream generated in the encoding process carried out at the last stage.

The data elements related to the picture-coding extension are extension_start_code, extension_start_code_identifier, f_code[0] [0], f_code[0] [1], f_code[1][0], f_code[1][1], intra_dc_precision, picture_structure, top_field_first, frame_predictive_frame_dct, concealment_motion_vectors, q_scale_type, intra_vlc_format, alternate_scan, repeat_first_field, chroma_420_type, progressive_frame, composite_display_flag, v_axis, field_sequence, sub_carrier, burst_amplitude and sub_carrier_phase as shown in FIG. 42.

The data elements listed above are described as follows. The extension_start_code data element is a start code used for indicating the start of extension data of the picture layer. The extension_start_code_identifier data element is a code used for indicating which extension data is transmitted. The f_code [0] [0] data element is data representing a horizontal motion-vector search range in the forward direction. The f_code[0] [1] data element is data representing a vertical motion-vector search range in the forward direction. The f_code[1] [0] data element is data representing a horizontal motion-vector search range in the backward direction. The f_code[1] [1] data element is data representing a vertical motion-vector search range in the backward direction.

The intra_dc_precision data element is data representing the precision of DC coefficients. The picture_structure data element is data used for indicating whether the data structure is a frame structure or a field structure. In the case of the field structure, the picture_structure data element also indicates whether the field structure is the high-order field or the low-order field. The top_field_first data element is data used for indicating whether the first field of a frame structure is the high-order field or the low-order field. The frame_predictive_frame_dct data element is data used for indicating that the prediction of frame-mode DCT is carried out only in the frame-DCT mode in the case of a frame structure. The concealment_motion_vectors data element is data used for indicating that the intra-macroblock includes a motion vector for concealing a transmission error.

The q_scale_type data element is data used for indicating whether to use a linear quantization scale or a non-linear quantization scale. The intra_vlc_format data element is data used for indicating whether or not another 2-dimensional VLC is used in the intra-macroblock. The alternate_scan data element is data representing selection to use a zigzag scan or an alternate scan. The repeat_first_field data element is data used in the case of a 2:3 pull-down. The chroma_420_type data element is data equal to the value of the next progressive_frame data element in the case of a 4:2:0 signal format or 0 otherwise. The progressive_frame data element is data used for indicating whether or not this picture has been obtained from sequential scanning. The composite_display_flag data element is a flag used for indicating whether or not the source signal is a composite signal.

The v_axis data element is data used in the case of a PAL source signal. The field_sequence data element is data used in the case of a PAL source signal. The sub_carrier data element is data used in the case of a PAL source signal. The burst_amplitude data element is data used in the case of a PAL source signal. The sub_carrier_phase data element is data used in the case of a PAL source signal.

Subsequently, a quantization-matrix extension used in the previous encoding processes is described as a history stream in the user area of the picture layer of the bitstream generated in the encoding process carried out at the last stage.

Data elements related to the quantization-matrix extension are extension_start_code, extension_start_code_identifier, quant_matrix_extension_present_flag, load_intra_quantizer_matrix, intra_quantizer_matrix[64], load_non_intra_quantizer_matrix, non_intra_quantizer_matrix[64], load_chroma_intra_quantizer_matrix, chroma_non_intra_quantizer_matrix[64], load_chroma_intra_quantizer_matrix and chroma_non_intra_quantizer_matrix[64] as shown in FIG. 43.

The data elements listed above are described as follows. The extension_start_code data element is a start code used for indicating the start of the quantization-matrix extension. The extension_start_code_identifier data element is a code used for indicating which extension data is transmitted. The quant_matrix_extension_present_flag data element is a flag used for indicating whether data elements of the quantization-matrix extension are valid or invalid. The load_intra_quantizer_matrix data element is data used for indicating whether or not quantization-matrix data for an intra-macroblock exists. The intra_quantizer_matrix data element is data representing values of a quantization-matrix for an intra-macroblock.

The load_non_intra_quantizer_matrix data element is data used for indicating whether or not quantization-matrix data for a non-intra-macroblock exists. The non_intra_quantizer_matrix data element is data representing values of a quantization-matrix for a non-intra-macroblock. The load_chroma_intra_quantizer_matrix data element is data used for indicating whether or not quantization-matrix data for a color-difference intra-macroblock exists. The chroma_intra_quantizer_matrix data element is data representing values of a quantization-matrix for a color-difference intra-macroblock. The load_chroma_non_intra_quantizer_matrix data element is data used for indicating whether or not quantization-matrix data for a color-difference non-intra-macroblock exists. The chroma_non_intra_quantizer_matrix data element is data representing values of a quantization-matrix for a color-difference non-intra-macroblock.

Subsequently, a copyright extension used in the previous encoding processes is described as a history stream in the user area of the picture layer of the bitstream generated in the encoding process carried out at the last stage.

Data elements related to the copyright extension are extension_start_code, extension_start_code_identifier, copyright_extension_present_flag, copyright_flag, copyright_identifier, original_or_copy, copyright_number_1, copyright_number_2 and copyright_number_3 as shown in FIG. 43.

The data elements listed above are described as follows. The extension_start_code data element is a start code used for indicating the start of the copyright extension. The extension_start_code_identifier data element is a code used for indicating which extension data is transmitted. The copyright_extension_present_flag data element is a flag used for indicating whether data elements of the copyright extension are valid or invalid. The copyright_flag data element is a flag used for indicating whether or not a copyright has been given to encoded video data in a range up to the next copyright extension or the end of the sequence.

The copyright_identifier data element is data used for identifying an institution cataloging the copyright specified by the ISO/IEC JTC/SC29. The original_or_copy data element is a flag used for indicating whether data of the bitstream is original or copied data. The copyright_number_1 data element indicates bits 44 to 63 of a copyright number. The copyright_number_2 data element indicates bits 22 to 43 of the copyright number. The copyright_number_3 data element indicates bits 0 to 21 of the copyright number.

Subsequently, a picture-display extension (picture_display_extension) used in the previous encoding processes is described as a history stream in the user area of the picture layer of the bitstream generated in the encoding process carried out at the last stage.

Data elements representing the picture-display extension are extension_start_code, extension_start_code_identifier, picture_display_extension_present_flag, frame_center_horizontal_offset_1, frame_center_vertical_offset_1, frame_center_horizontal_offset_2, frame_center_vertical_offset_2, frame_center_horizontal_offset_3 and frame_center_vertical_offset_3 as shown in FIG. 44.

The data elements listed above are described as follows. The extension_start_code data element is a start code used for indicating the start of the picture-display extension. The extension_start_code_identifier data element is a code used for indicating which extension data is transmitted. The picture_display_extension_present_flag data element is a flag used for indicating whether data elements of the picture-display extension are valid or invalid. The frame_center_horizontal_offset data element is an offset of the display area in the horizontal direction and the frame_center_vertical_offset data element is an offset of the display area in the vertical direction. Up to three offset value of horizontal and vertical offsets can be defined respectively.

User data is described as a history stream after the history information representing the picture-display extension already explained in the user area of the picture layer of the bitstream generated in the encoding process carried out at the last stage as shown in FIG. 44.

Following to the user data, information on a macroblock used in the previous encoding processes is described as a history stream as shown in FIGS. 44 to 46.

Information on the macroblock comprises data elements related to the position of the macroblock, data elements related to the mode of the macroblock, data elements related to control of the quantization step, data elements related to motion compensation, data elements related to the pattern of the macroblock and data elements related to the amount of generated code as shown in FIGS. 44 to 46. The data elements related to the position of the macroblock include such as macroblock_address_h, macroblock_address_v, slice_header_present_flag and skipped_macroblock_flag. The data elements related to the mode of the macroblock include such as macroblock_quant, macroblock_motion_forward, macroblock_motion_backward, macroblock_pattern, macroblock_intra, spatial_temporal_weight_code_flag, frame_motion_type and dct_type. The data elements related to control of the quantization step includes such as quantiser_scale_code. The data elements related to motion compensation include PMV[0] [0] [0], PMV[0] [0] [1], motion_vertical_field_select[0] [0], PMV[0] [1] [0], PMV[0] [1] [1], motion_vertical_field_select[0] [1], PMV[1] [1] [0], PMV[1] [0] [1], motion_vertical_field_select[1] [0], PMV[1] [1] [0], PMV[1] [1] [1] and motion_vertical_field_select [1] [1]. The data elements related to the pattern of the macroblock include such as coded_block_pattern, and the data elements related to the amount of generated code are num_mv_bits, num_coef_bits and num_other_bits or the like.

The data elements-related to the macroblock are described in detail as follows.

The macroblock_address_h data element is data defining the present absolute position of the macroblock in horizontal direction. The macroblock_address_v data element is data defining the present absolute position of the macroblock in vertical direction. The slice_header_present_flag data element is a flag used for indicating this macroblock is located at the beginning of a slice layer, and whether or not being accompanied by a slice header. The skipped_macroblock_flag data element is a flag used for indicating whether or not to skip this macroblock in a decoding process.

The macroblock_quant data element is data derived from macroblock_type shown in FIGS. 65 to 67. This data element indicates whether or not quantiser_scale_code appears in the bitstream. The macroblock_motion_forward data element is data derived from the macroblock_type shown in FIGS. 65 to 67 and used in the decoding process. The macroblock_motion_backward data element is data derived from the macroblock_type shown in FIGS. 65 to 67 and used in the decoding process. The macroblock_pattern data element is data derived from the macroblock_type shown in FIGS. 65 to 67 and it indicates whether or not coded_block_pattern appears in the bitstream.

The macroblock_intra data element is data derived from the macroblock_type shown in FIGS. 65 to 67 and used in the decoding process. The spatial_temporal_weight_code_flag data element is a flag derived from the macrobloc_type shown in FIGS. 65 to 67 and used for indicating whether or not spatial_temporal_weight_code showing an up-sampling technique of a low-order layer picture with time scalability exists in the bitstream.

The frame_motion_type data element is a 2-bit code used for indicating the prediction type of the macroblock of a frame. A frame_motion_type value of "00" indicates that there are two prediction vectors and the prediction type is a field-based prediction type. A frame_motion_type value of "01" indicates that there is one prediction vector and the prediction type is a field-based prediction type. A frame_motion_type value of "10" indicates that there is one prediction vector and the prediction type is a frame-based prediction type. A frame_motion_type value of "11" indicates that there is one prediction vector and the prediction type is a dual-prime prediction type. The field_motion_type data element is a 2-bit code showing the motion prediction of the macroblock of a field. A field_motion_type value of "01" indicates that there is one prediction vector and the prediction type is a field-based prediction type. A field_motion_type value of "10" indicates that there is two prediction vectors and the prediction type is a 18×8 macroblock-based prediction type. A field_motion_type value of "11" indicates that there is one prediction vector and the prediction type is a dual-prime prediction type. The dct_type data element is data used for indicating whether the DCT is carried out in the frame-DCT mode or the field-DCT mode. The quantiser_scale_code data element indicates the quantization-step size of the macroblock.

Next, data elements related to a motion vector are described. In order to reduce the magnitude of a motion vector required in a decoding process, a particular motion vector is subjected to an encoding process by actually encoding a difference between the particular motion vector and a motion vector decoded earlier. A decoder for decoding a motion vector has to sustain four motion-vector prediction values, each of which comprises horizontal and vertical components. These motion-vector prediction values are represented by PMV[r] [s] [v]. The subscript [r] is a flag used for indicating whether the motion vector in a macroblock is the first or second vector. To be more specific, an [r] value of "0" indicates the first vector and an [r] value of "1" indicates the second vector. The subscript [s] is a flag used for indicating whether the direction of the motion vector in the macroblock is the forward or backward direction. To be more specific, an [s] value of "0" indicates the forward direction of the motion vector and an [r] value of "1" indicates the backward direction of the motion vector. The subscript [v] is a flag used for indicating whether the component of the motion vector in the macroblock is a component in the horizontal or vertical direction. To be more specific, a [v] value of "0" indicates the horizontal component of the motion vector and a [v] value of "1" indicates the vertical component of the motion vector.

Thus, PMV[0] [0] [0] is data representing the horizontal component, the forward motion vector of the first vector. PMV[0] [0] [1] is data representing the vertical component of the forward motion vector of the first vector. PMV[0] [1] [0] is data representing the horizontal component of the backward motion vector of the first vector. PMV[0] [1] [1] is data representing the vertical component of the backward motion vector of the first vector. PMV[1] [0] [0] is data representing the horizontal component of the forward motion vector of the second vector. PMV[1] [0] [1] is data representing the vertical component of the forward motion vector of the second vector. PMV[1] [1] [0] is data representing the horizontal component of the backward motion vector of the second vector. PMV[1] [1] [1] is data representing the vertical component of the backward motion vector of the second vector.

A motion_vertical_field_select[r] [s] is data used for indicating which referenced field of the prediction format is used. To be more specific, a motion_vertical_field_select[r] [s]-value of "0" indicates the top referenced field and a motion_vertical_field_select[r] [s]-value of "1" indicates the bottom referenced field to be used.

In motion_vertical_field_select[r] [s], the subscript [r] is a flag used for indicating whether the motion vector in a macroblock is the first or second vector. To be more specific, an [r] value of "0" indicates the first vector and an [r] value of "1" indicates the second vector. The subscript [s] is a flag used for indicating whether the direction of the motion vector in the macroblock is the forward or backward direction. To be more specific, an [s] value of "0" indicates the forward direction of the motion vector and an [r] value of "1" indicates the backward direction of the motion vector. Thus, motion_vertical_field_select[0] [0] indicates the referenced field used in the generation of the forward motion vector of the first vector. motion_vertical_field_select[0] [1] indicates the referenced field used in the generation of the backward motion vector of the first vector. motion_vertical_field_select[1] [0] indicates the referenced field used in the generation of the forward motion vector of the second vector. motion_vertical_field_select[1] [1] indicates the referenced field used in the generation of the backward motion vector of the second vector.

The coded_block_pattern data element is variable-length data used for indicating which DCT block among a plurality of DCT blocks each for storing a DCT coefficient contains a meaningful or non-zero DCT coefficient. The num_mv_bits data element is data representing the amount of code of the motion vector in the macroblock. The num_coef_bits data element is data representing the amount of code of the DCT coefficient in the macroblock. The num_other_bits data element shown in FIG. 46 is data representing the amount of code in the macroblock other than the motion vector and the DCT coefficient.

Next, a syntax for decoding data elements from a history stream with a variable length is explained by referring to FIGS. 47 to 64.

As shown in FIG. 47, the history stream with a variable length comprises data elements defined by a next_start_code( ) function, a sequence_header( ) function, a sequence_extension( ) function, an extension_and_user_data (0) function, a group_of_picture_header( ) function, an extension_and_user_data(1) function, a picture_header( ) function, a picture_coding_extension( ) function, an extension_and_user_data(2) function and a picture_data( ) function.

Since the next_start_code( ) function is a function used for searching a bitstream for a start code, data elements defined by the sequence_header( ) function and used in the previous encoding processes are described at the beginning of the history stream as shown in FIG. 48.

Data elements defined by the sequence_header( ) function include sequence_header_code, sequence_header_present_flag, horizontal_size_value, vertical_size_value, aspect_ratio_information, frame_rate_code, bit_rate_value, marker_bit, VBV_buffer_size_value, constrained_parameter_flag, load_intra_quantizer_matrix, intra_quantizer_matrix, load_non_intra_quantizer_matrix and non_intra_quantizer_matrix as shown in FIG. 48.

The data elements listed above are described as follows. The sequence_header_code data element is the start synchronization code of the sequence layer. The sequence_header_present_flag data element is a flag used for indicating whether data in sequence_header is valid or invalid. The horizontal_size_value data element is data comprising the low-order 12 bits of the number of pixels of the picture in the horizontal direction. The vertical_size_value data element is data comprising the low-order 12 bits of the number of pixels of the picture in the vertical direction. The aspect_ratio_information data element is an aspect ratio of pixels of a picture, that is, a ratio of the height to the width of the picture, or the aspect ratio of the display screen. The frame_rate_code data element is data representing the picture display period. The bit_rate_value data element is data comprising the low-order 18 bits of a bit rate for limiting the number of generated bits. The data is rounded up in 400-bsp units.

The marker_bit data element is bit data inserted for preventing start-codes emulation. The VBV_buffer_size_value data element is data comprising the low-order 10 bits of a value for determining the size a virtual buffer (video buffer verifier) used in control of the amount of generated code. The constrained_parameter_flag data element is a flag used for indicating whether or not parameters are under constraint. The load_intra_quantizer_matrix data element is a flag used for indicating whether or not data of an intra-MB quantization matrix exists. The intra_quantizer_matrix data element is the value of the intra-MB quantization matrix. The load_non_intra_quantizer_matrix data element is a flag used for indicating whether or not data of a non-intra-MB quantization matrix exists. The non_intra_quantizer_matrix data, element is the value of the non-intra-MB quantization matrix.

Following to the data elements defined by the sequence_header( ) function, data elements defined by the sequence_extension( ) function are described as a history stream as shown in FIG. 49.

The data elements defined by the sequence_extension( ) function include extension_start_code, extension_start_code_identifier, sequence_extension_present_flag, profile_ and_level_identification, progressive_sequence, chroma_format, horizontal_size_extension, vertical_size_extension, bit_rate_extension, vbv_buffer_size_extension, low_delay, frame_rate_extension_n and frame_rate_extension_d as shown in FIG. 49.

The data elements listed above are described as follows. The extension_start_code data element is a start synchronization code of extension data. The extension_start_code_identifier data element is data used for indicating which extension data is transmitted. The sequence_extension_present_flag data element is a flag used for indicating whether data in the sequence extension is valid or invalid. The profile_and_level_identification data element is data specifying a profile and a level of the video data. The progressive_sequence data element is data showing that the video data has been obtained from sequential scanning. The chroma_format data element is data specifying the color-difference format of the video data. The horizontal_size_extension data element is data to be added to horizontal_size_value of the sequence header as the two high-order bits. The vertical_size_extension data element is data to be added to vertical_size_value of the sequence header as the two high-order bits. The bit_rate_extension data element is data to be added to bit_rate_value of the sequence header as the 12 high-order bits. The vbv_buffer_size_extension data element is data to be added to vbv_buffer_size_value of the sequence header as the 8 high-order bits.

The low_delay data element is data used for indicating that a B-picture is not included. The frame_rate_extension_n data element is data used for obtaining a frame rate in conjunction with frame_rate_code of the sequence header. The frame_rate_extension_d data element is data used for obtaining a frame rate in conjunction with frame_rate_code of the sequence header.

Following to the data elements defined by the sequence_extension( ) function, data elements defined by the extension_and_user_data(0) function are described as a history stream as shown in FIG. 50. For (i) with a value other than 2, the extension_and_user_data(i) function describes only data elements defined by a user_data( ) function as a history stream instead of describing data elements defined by the extension_data( ) function. Thus, the extension_and_user_data(0) function describes only data elements defined by the user_data( ) function as a history stream.

The user_data( ) function describes user data as a history stream on the basis of a syntax like one shown in FIG. 51.

Following to the data elements defined by the extension_and_user_data(0) function, data elements defined by the group_of_picture_header( ) function shown in FIG. 52 and data elements defined by the extension_and_user_data(1) function shown in FIG. 50 are described as a history stream. It should be noted, however, that the data elements defined by the group_of_picture_header( ) function and data elements defined by the extension_and_user_data(1) function are described only if group_start_code representing the start code of the GOP layer is described in the history stream.

As shown in FIG. 52, the data elements defined by the group_of_picture_header( ) function are group_start_code, group_of_picture_header_present_flag, time_code, closed_gop and broken_link.

The data elements listed above are described as follows. The group_start_code data element is the start synchronization code of the GOP layer. The group_of_picture_header_present_flag data element is a flag used for indicating whether data elements in group_of_picture_header are valid or invalid. The time_code data element is a time code showing the length of time measured from the beginning of the first picture of the GOP. The closed_gop data element is a flag used for indicating whether or not it is possible to carry out an independent playback operation of a picture in the GOP from another GOP. The broken_link data element is a flag used for indicating that the B-picture at the beginning of the GOP can not be reproduced with a high degree of accuracy because of reasons such as editing.

Much like the extension_and_user_data(0) function shown in FIG. 50, the extension_and_user_data(1) function describes only data elements defined by the user_data( ) function as a history stream.

If group_start_code representing the start code of the GOP layer is not described in the history stream, the data elements defined by the group_of_picture_header( ) function and data elements defined by the extension_and_user_data(1) function are also not described in the history stream. In this case, data elements defined by the picture_header( ) function are described after the data elements defined by the extension_and_user_data(0) function.

The data elements defined by the picture_headr( ) function are picture_start_code, temporal_reference, picture_coding_type, vbv_delay, full_pel_forward_vector, forward_f_code, full_pel_backward_vector, backward_f_code, extra_bit_picture and extra_information_picture as shown in FIG. 53.

The data elements listed above are described concretely as follows. The picture_start_code data element is the start synchronization code of the picture layer. The temporal_reference data element is a number used for indicating a display order of the picture. This number is reset at the beginning of the GOP. The picture_coding_type data element is data used for indicating the type of the picture. The vbv_delay data element is data showing an initial state of a virtual buffer at a random access. The full_pel_forward_vector data element is a flag used for indicating whether the precision of the forward motion vector is expressed in terms of integral pixel units or half-pixel units. The forward_f_code data element is data representing a forward-motion-vector search range. The full_pel_backward_vector data element is a flag used for indicating whether the precision of the backward motion vector is expressed in terms of integral pixel units or half-pixel units. The backward_f_code data element is data representing a backward-motion-vector search range. The extra_bit_picture data element is a flag used for indicating whether or not following additional information exists. To be more specific, extra_bit_picture having a value of "0" indicates that no following additional information exists while extra_bit_picture having a value of "1" indicates that following additional information exists. The extra_information_picture data element is information reserved by specifications.

Following to the data elements defined by the picture_headr( ) function, data elements defined by the picture_coding_extension( ) function shown in FIG. 54 are described as a history stream.

The data elements defined by the picture_coding_extension( ) function are extension_start_code, extension_start_code_identifier, f_code[0][0], f_code[0][1], f_code[1][0], f_code[1][1], intra_dc_precision, picture_structure, top_field_first, frame_predictive_frame_dct, concealment_motion_vectors, q_scale_type, intra_vlc_format, alternate_scan, repeat_first_field, chroma_420_type, progressive_frame, composite_display_flag, v_axis, field_sequence, sub_carrier, burst_amplitude and sub_carrier_phase as shown in FIG. 54.

The data elements listed above are described as follows. The extension_start_code data element is a start code used for indicating the start of extension data of the picture layer. The extension_start_code_identifier data element is a code used for indicating which extension data is transmitted. The f_code [0] [0] data element is data representing a horizontal motion-vector search range in the forward direction. The f_code[0] [1] data element is data representing a vertical motion-vector search range in the forward direction. The f_code[1] [0] data element is data representing a horizontal motion-vector search range in the backward direction. The f_code[1] [1] data element is data representing a vertical motion-vector search range in the backward direction. The intra_dc_precision data element is data representing the precision of DC coefficients.

The picture_structure data element is data used for indicating whether the data structure is a frame structure or a field structure. In the case of the field structure, the picture_structure data element also indicates whether the field structure is the high-order field or the low-order field. The top_field_first data element is data used for indicating whether the first field of a frame structure is the high-order field or the low-order field. The frame_predictive_frame_dct data element is data used for indicating that the prediction of frame-mode DCT is carried out only in the frame mode in the case of a frame structure. The concealment_motion_vectors data element is data used for indicating that the intra-macroblock includes a motion vector for concealing a transmission error. The q_scale_type data element is data used for indicating whether to use a linear quantization scale or a non-linear quantization scale. The intra_vlc_format data element is data used for indicating whether or not another 2-dimensional VLC is used in the intra-macroblock.

The alternate_scan data element is data representing selection to use a zigzag scan or an alternate scan. The repeat_first_field data element is data used in the case of a 2:3 pull-down. The chroma_420_type data element is data equal to the value of the next progressive_frame data element in the case of a 4:2:0 signal format or 0 otherwise. The progressive_frame data element is data used for indicating whether or not this picture has been obtained from sequential scanning. The composite_display_flag data element is data used for indicating whether or not the source signal is a composite signal. The v_axis data element is data used in the case of a PAL source signal. The field_sequence data element is data used in the case of a PAL source signal. The sub_carrier data element is data used in the case of a PAL source signal. The burst_amplitude data element is data used in the case of a PAL source signal. The sub_carrier_phase data element is data used in the case of a PAL source signal.

Following to the data elements defined by the picture_coding_extension( ) function, data elements defined by the extension_and_user_data(2) function shown in FIG. 50 are described as a history stream. It should be noted, however, that data elements defined by the extension_data( ) function are described by the extension_and_user_data(2) function only if extension_start_code representing the start code of the extension exists in the bit stream. In addition, data elements defined by the user_data( ) function are described by the extension_and_user_data(2) function after the data elements defined by the extension_data( ) function only if user_data_start_code representing the start code of the user data exists in the bitstream as shown in as shown in FIG. 50. That is to say, if neither the start code of the extension nor the start code of the user data exists in the bitstream, data elements defined by the extension_data( ) function and data elements defined by the user_data( ) function are not described in the bitstream.

The extension_data( ) function is a function used for describing a data element representing extension_start_code and data elements defined by a quant_matrix_extension( ) function, a copyright_extension( ) function and a picture_display_extension( ) function as a history stream in the bitstream as shown in FIG. 55.

Data elements defined by the quant_matrix_extension( ) function are extension_start_code, extension_start_code_identifier, quant_matrix_extension_present_flag, load_intra_quantizer_matrix, intra_quantizer_matrix[64], load_non_intra_quantizer_matrix, non_intra_quantizer_matrix[64], load_chroma_intra_quantizer_matrix, chroma_intra_quantizer_matrix[64], load_chroma_non_intra_quantizer_matrix and chroma_non_intra_quantizer_matrix[64] as shown in FIG. 56.

The data elements listed above are described as follows. The extension_start_code data element is a start code used for indicating the start of the quantization-matrix extension. The extension_start_code_identifier data element is a code used for indicating which extension data is transmitted. The quant_matrix_extension_present_flag data element is a flag used for indicating whether data elements of the quantization-matrix extension are valid or invalid. The load_intra_quantizer_matrix data element is data used for indicating whether or not quantization-matrix data for an intra-macroblock exists. The intra_quantizer_matrix data element is data representing values of a quantization-matrix for an intra-macroblock.

The load_non_intra_quantizer_matrix data element is data used for indicating whether or not quantization-matrix data for a non-intra-macroblock exists. The non_intra_quantizer_matrix data element is data representing values of a quantization-matrix for a non-intra-macroblock. The load_chroma_intra_quantizer_matrix data element is data used for indicating whether or not quantization-matrix data for a color-difference intra-macroblock exists. The chroma_intra_quantizer_matrix data element is data representing values of a quantization-matrix for a color-difference intra-macroblock. The load_chroma_non_intra_quantizer_matrix data element is data used for indicating whether or not quantization-matrix data for a color-difference non-intra-macroblock exists. The chroma_non_intra_quantizer_matrix data element is data representing values of a quantization-matrix for a color-difference non-intra-macroblock.

The data elements defined by the copyright_extension( ) function are extension_start_code, extension_start_code_identifier, copyright_extension_present_flag, copyright_flag, copyright_identifier, original_or_copy, copyright_number_1, copy_right_number_2 and copyright_number_3 as shown in FIG. 57.

The data elements listed above are described as follows. The extension_start_code data element is a start code used for indicating the start of the copyright extension. The extension_start_code_identifier data element is a code used for indicating which extension data is transmitted. The copyright_extension_present_flag data element is a flag used for indicating whether data elements of the copyright extension are valid or invalid.

The copyright_flag data element is a flag used for indicating whether or not a copyright has been given to encoded video data in a range up to the next copyright extension or the end of the sequence. The copyright_identifier data element is data used for identifying an institution cataloging the copyright specified by the ISO/IEC JTC/SC29. The original_or_copy data element is a flag used for indicating whether data of the bitstream is originator copied data. The copyright_number_1 data element indicates bits 44 to 63 of a copyright number. The copyright_number_2 data element indicates bits 22 to 43 of the copyright number. The copyright_number_3 data element indicates bits 0 to 21 of the copyright number.

The data elements defined by the picture_display_extension( ) function are extension_start_code_identifier, frame_center_horizontal_offset and frame_center_vertical_offset as shown in FIG. 58.

The data elements listed above are described as follows. The extension_start_code_identifier data element is a code used for indicating which extension data is transmitted. The frame_center_horizontal_offset data element is an offset of the display area in the horizontal direction. The number of such horizontal offsets can be defined by number_of_frame_center_offsets. The frame_center_vertical_offset data element is an offset of the display area in the vertical direction. The number of such vertical offsets can be defined by number_of_frame_center_offsets.

As shown in the variable-length history stream of FIG. 47, data elements defined by a picture_data( ) function are described as a history stream after the data elements defined by the extension_and_user(2) function.

As shown in FIG. 59, the data elements defined by a picture_data( ) function are data elements defined by a slice( ) function. It should be noted that the data elements defined by a slice( ) function are not described in the bitstream if slice_start_code representing the start code of the slice( ) function does not exist in the bitstream.

As shown in FIG. 60, the slice( ) function is a function used for describing data elements such as slice_start_code, slice_quantiser_scale_code, intra_slice_flag, intra_slice, reserved_bits, extra_bit_slice, extra_information_slice and extra_bit_slice and data elements defined by a macroblock( ) function as a history stream.

The data elements listed above are described as follows. The slice_start_code data element is a start code used for indicating the data elements defined by the slice( ) function. The slice_quantiser_scale_code data element is the size of the quantization step defined for a macroblock existing in the slice layer. However, quantiser_scale_code set for macroblocks is preferably used, when quantiser_scale_code has been set.

The intra_slice_flag data segment is a flag used for indicating whether or not intra_slice and reserved_bits exist in the bit stream. The intra_slice data element is a flag used for indicating whether or not a non-intra-macroblock exists in the slice layer. To be more specific, if any one of macroblocks in the slice layer is a non-intra-macroblock, the intra_slice flag has a value of "0". If all macroblocks in the slice layer are non-intra-macroblocks, on the other hand, the intra_slice flag has a value of "1". The reserved_bits data element is 7-bit data having a value of "0". The extra_bit_slice data element is a flag used for indicating whether or not the extra_information_slice data element, that is, information added as a history stream, exists. To be more specific, if the next extra_information_slice data element exists, the extra_bit_slice flag has a value of "1". If the next extra_information_slice data element does not exist, on the other hand, the extra_bit_slice flag has a value of "0".

Following to the data element defined by the slice( ) function, data elements defined by a macroblock( ) function are described as a history stream.

As shown in FIG. 61, the macroblock( ) function are a function used for defining data elements such as macroblock_escape, macroblock_address_increment and macroblock_quantiser_scale_code and data elements defined by a macroblock_modes( ) function and a macroblock_vectors(s) function.

The data elements listed above are described as follows. The macroblock_escape data element is a string of bits with a fixed length used for indicating whether or not a difference in the horizontal direction between a referenced macroblock and a preceding macroblock is at least 34 or greater. If the difference in the horizontal direction between a referenced macroblock and a preceding macroblock is at least 34 or greater, 33 is added to the value of the macroblock_address_increment data element. The macroblock_address_increment data element is the difference in the horizontal direction between a referenced macroblock and a preceding macroblock. If one macroblock_escape data element exists before the macroblock_address_increment data element, a value obtained as a result of the addition of 33 to the value of the macroblock_address_increment data element represents the actual difference in the horizontal direction between a referenced macroblock and a preceding macroblock.

The macroblock_quantiser_scale_code data element is the size of the quantization step set in each macroblock. The slice_quantiser_scale_code data element representing the size of the quantization step of a slice layer is also set in each slice layer. However, macroblock_scale_code set for a macroblock takes precedence of slice_quantiser_scale_code.

Following to the macroblock_address_increment data element, data elements defined by the macroblock_modes( ) function are described. As shown in FIG. 62, the macroblock_modes( ) function is a function used for describing data elements such as macroblock_type, frame_motion_type, field_motion_type and dct_type as a history stream.

The data elements listed above are described as follows. The macroblock_type data element is data representing the encoding type of the macroblock. To put it concretely, the macroblock_type data element is data with a variable length generated from flags such as macroblock_quant, dct_type_flag, macroblock_motion_forward and macroblock_motion_backward as shown in FIGS. 65 to 67. The macroblock_quant flag is a flag used for indicating whether or not macroblock_quantiser_scale_code for setting the size of the quantization step for the macroblock is set. If macroblock_quantiser_scale_code exists in the bitstream, the macroblock_quant flag has a value of "1".

The dct_type_flag is a flag used for indicating whether or not dct_type showing that the referenced macroblock has been encoded in the frame-DCT mode or the field-DCT mode exists. In other words, dct_type_flag is a flag used for indicating whether or not the referenced macroblock experienced DCT. If dct_type exists in the bitstream, dct_type_flag has a value of "1". The macroblock_motion_forward is a flag showing whether or not the referenced macroblock has undergone forward prediction. If the referenced macroblock has undergone forward prediction, the macroblock_motion_forward flag has a value of "1". On the other hand, macroblock_motion_backward is a flag showing whether or not the referenced macroblock has undergone backward prediction. If the referenced macroblock has undergone backward prediction, the macroblock_motion_backward flag has a value of "1".

If the macroblock_motion_forward flag or the macroblock_motion_backward flag has a value of "1", the picture is transferred in the frame-prediction mode and frame_period_frame_dct has a value of "0", a data element representing frame_motion_type is described after a data element representing macroblock_type. It should be noted that frame_period_frame_dct is a flag used for indicating whether or not frame_motion_type exists in the bit stream.

The frame_motion_type data element is a 2-bit code showing the prediction type of the macroblock of the frame. A frame_motion_type value of "00" indicates that there are two prediction vectors and the prediction type is a field-based prediction type. A frame_motion_type value of "01" indicates that there is one prediction vector and the prediction type is a field-based prediction type. A frame_motion_type value of "10" indicates that there is one prediction vector and the prediction type is a frame-based prediction type. A frame_motion_type value of "11" indicates that there is one prediction vector and the prediction type is a dual-prime prediction type.

If the macroblock_motion_forward flag or the macroblock_motion_backward flag has a value of "1" and the picture is transferred not in the frame prediction mode, a data element representing field_motion_type is described after a data element representing macroblock_type.

The field_motion_type data element is a 2-bit code showing the motion prediction of the macroblock of a field. A field_motion_type value of "01" indicates that there is one prediction vector and the prediction type is a field-based prediction type. A field_motion_type value of "10" indicates that there is two prediction vectors and the prediction type is a 18×8 macroblock-based prediction type. A field_motion_type value of "11" indicates that there is one prediction vector and the prediction type is a dual-prime prediction type.

If the picture is transferred in the frame prediction mode, frame_period_frame_dct indicates that frame_motion_type exists in the bitstream and frame_period_frame_dct also indicates that dct_type exists in the bitstream, a data element representing dct_type is described after a data element representing macroblock_type. It should be noted that the dct_type data element is data used for indicating whether the DCT is carried out in the frame-DCT mode or the field-DCT mode.

As shown in FIG. 61, if the referenced macroblock is either a forward-prediction macroblock or an intra-macroblock completing conceal processing, a data element defined by a motion_vectors(0) function is described. If the referenced macroblock is a backward-prediction macroblock, a data element defined by a motion_vectors(1) function is described. It should be noted that the motion_vectors(0) function is a function used for describing a data element related to a first motion vector and the motion_vectors(1) function is a function used for describing a data element related to a second motion vector.

As shown in FIG. 63, the motion_vectors(s) function is a function used for describing a data element related to a motion vector.

If there is one motion vector and the dual-prime prediction mode is not used, data elements defined by motion_vertical_field_select[0] [s] and motion_vector[0] [s] are described.

The motion_vertical_field_select[r] [s] is a flag used for indicating that the first vector, be it a forward-prediction or backward-prediction vector, is a vector made by referencing the bottom field or the top field. The subscript [r] indicates the first or second vector whereas the subscript [s] indicates a forward-prediction or backward-prediction vector.

As shown in FIG. 64, the motion_vector(r, s) function is a function used for describing a data array related to motion_code[r] [s] [t], a data array related to motion_residual[r] [s] [t] and data representing dmvector[t].

The motion_code[r] [s] [t] is data with a variable length used for representing the magnitude of a motion vector in terms of a value in the range −16 to +16. motion_residual[r] [s] [t] is data with a variable length used for representing a residual of a motion vector. Thus, by using the values of motion_code[r] [s] [t] and motion_residual[r] [s] [t], a detailed motion vector can be described. The dmvector[t] is data used for scaling an existing motion vector with a time distance in order to generate a motion vector in one of the top and bottom fields (for example, the top field) in the dual-prime prediction mode and used for correction in the vertical direction in order to reflect a shift in the vertical direction between lines of the top and bottom fields. The subscript [r] indicates the first or second vector whereas the subscript [s] indicates a forward-prediction or backward-prediction vector. The subscript [t] indicates that the motion vector is a component in the vertical or horizontal direction.

First of all, the motion_vector(r, s) function describes a data array to represent motion_code[r] [s] [0] in the horizontal direction as a history stream as shown in FIG. 64. The number of bits of both motion_residual[0] [s] [t] and motion_residual[1] [s] [t] is represented by f_code[s] [t]. Thus, a value of f_code[s] [t] other than "1" indicates that motion_residual[r] [s] [t] exists in the bitstream. The fact that motion_residual[r] [s] [0], a horizontal-direction component, is not "1" and motion_code[r] [s] [0], a horizontal-direction component, is not "0" indicates that a data element representing motion_residual[r] [s] [0] is included in the bit stream and the horizontal-direction component of the motion vector exists. In this case, a data element representing motion_residual[r] [s] [0], a horizontal component, is thus described.

Subsequently, a data array to represent motion_code[r] [s] [1] is described in the vertical direction as a history stream. Likewise, the number of bits of both motion_residual[0] [s] [t] and motion_residual[1] [s] [t] is represented by f_code[s] [t]. Thus, a value of f_code[s] [t] other than "1" indicates that motion_residual[r] [s] [t] exists in the bitstream. The fact that motion_residual[r] [s] [1], a vertical-direction component, is not "1" and motion_code[r] [s] [1], a vertical-direction component, is not "0" indicates that a data element representing motion_residual[r] [s] [1] is included in the bitstream and the vertical-direction component of the motion vector exists. In this case, a data element representing motion_residual[r] [s] [1], a vertical component, is thus described.

It should be noted that, in the variable-length format, the history information can be eliminated in order to reduce the transfer rate of transmitted bits.

For example, in order to transfer macroblock_type and motion_vectors( ), but not to transfer quantiser_scale_code, slice_quantiser_scale_code is set at "00000" in order to reduce the bit rate.

In addition, in order to transfer only macroblock_type but not to transfer motion_vectors( ), quantiser_scale_code and dct_type, "not coded" is used as macroblock_type in order to reduce the bit rate.

Furthermore, in order to transfer only picture_coding_type but not to transfer all information following slice( ), picture_data( ) having no slice_start_code is used in order to reduce the bit rate.

As described above, in order to prevent 23 consecutive bits of 0 from appearing in user_data, a "1" bit is inserted for every 22 bits. It should be noted that, however, a "1" bit can also be inserted for each number of bits smaller than 22. In addition, instead of insertion of a "1" bit by counting the number of consecutive 0 bits, a "1" bit can also be inserted by examining Byte_allign.

In addition, in the MPEG, generation of 23 consecutive bits of 0 is prohibited. In actuality, however, only a sequence of such 23 bits starting from the beginning of a byte is a problem. That is to say, a sequence of such 23 bits not starting from the beginning of a byte is not a problem. Thus, a "1" bit may be inserted for each typically 24 bits at a position other than the LSB.

Furthermore, while the history information is made in a format close to a video elementary stream as described above, the history information can also be made in a format close to a packetized elementary stream or a transport stream. In addition, even though user_data of the Elementary Stream is placed in front of picture_data according to the above description, user_data can be placed at another location as well.

It should be noted that programs to be executed by a computer for carrying out pieces of processing described above can be presented to the user through network presentation media such as the Internet or a digital satellite in addition to presentation media implemented by an information recording medium such as a magnetic disc and a CD-ROM.

What is claimed is:

1. Decoding apparatus for decoding an encoded stream, comprising:
    receiving means for receiving (a) the encoded stream which includes a current quantization scale calculated upon production of each data block of the encoded stream, and (b) history quantization scales utilized in more than two past encoding or decoding processes for each data block of the encoded stream;
    decoding means for decoding the received encoded stream utilizing the received current quantization scale to produce image data; and
    output means for outputting the history quantization scales, the current quantization scale and the image data produced by said decoding means for each data block so that, when the image data produced by said decoding means is re-encoded by a succeeding encoder, a largest quantization scale is selected by the succeeding encoder from the received history and current quantization scales as a utilization scale for re-encoding the image data, wherein the history and current quantization scales are included in the encoded stream, and
    said receiving means acquires the history and current quantization scales from the encoded stream.

2. The decoding apparatus according to claim 1, wherein said output means multiplexes the received history and current quantization scales with the image data produced by said decoding means.

3. The decoding apparatus according to claim 1, wherein the history quantization scales and the current quantization scale are included in different areas of the encoded stream.

4. The decoding apparatus according to claim 1, wherein the encoded stream is encoded in accordance with an MPEG standard which has a sequence layer, a GOP layer, a picture layer, a slice layer, and a macro block layer.

5. The decoding apparatus according to claim 1, wherein the encoded stream represents pictures all of which are encoded as I pictures.

6. A decoding method for decoding an encoded stream, comprising steps of:
    receiving (a) the encoded stream which includes as current quantization scale calculated upon production of each data block of the encoded stream, and (b) history quantization scales utilized in more than two past encoding or decoding processes for each data block of the encoded stream;
    decoding the received encoded stream utilizing the received current quantization scale to produce image data; and
    outputting the history quantization scales, the current quantization scale and the image data for each data block so that, when the decoded image data is to be re-encoded by a succeeding encoder, a largest quantization scale is selected by the succeeding encoder from the received history and current quantization scales to be utilized as a utilization quantization scale, wherein the history and current quantization scales are included in the encoded stream, and
    said receiving step acquires the history and current quantization scales from the encoded stream.

7. Decoding apparatus for decoding an encoded stream, comprising:
    receiving means for receiving (a) the encoded stream and (b) history quantization scales utilized in more than two past encoding or decoding for each data block of the encoded stream;
    decoding means for decoding the received encoded stream to produce image data; and
    output means for outputting the history quantization scales and the decoded image data for each data block so that, when the produced image data is re-encoded by a succeeding encoder, a largest quantization scale is selected by the succeeding encoder from the received history quantization scales as a utilization quantization scale for re-encoding the image data, wherein the history and current quantization scales are included in the encoded stream, and
    said receiving means acquires the history and current quantization scales from the encoded stream.

8. A decoding method for decoding an encoded stream, comprising the steps of:
    receiving (a) the encoded stream and (b) history quantization scales utilized in more than two past encoding or decoding of each data block of the encoded stream;
    decoding the received encoded stream to produce image data; and
    outputting the history quantization scales and the decoded image data for each data block so that, when the produced image data is re-encoded by a succeeding encoder, a largest quantization scale is selected by the succeeding encoder from the received history quantization scales, as a utilization quantization scale for re-encoding the image data, wherein the history and current quantization scales are included in the encoded stream, and
    said receiving step acquires the history and current quantization scales from the encoded stream.

9. Decoding apparatus for decoding an encoded stream, comprising:
    a receiver for receiving (a) the encoded stream which includes a current quantization scale calculated upon production of each data block of the encoded stream, and (b) history quantization scales utilized in more than two past encoding or decoding processes for each data block of the encoded stream;
    a decoder for decoding the received encoded stream utilizing the received current quantization scale to produce image data; and
    an output for outputting the history quantization scales, the current quantization scale and the image data produced by said decoder for each data block so that, when the image data produced by said decoder is re-encoded by a succeeding encoder, a largest quantization scale is selected by the succeeding encoder from the received history and current quantization scales as a utilization quantization scale for re-encoding the image data, wherein the history and current quantization scales are included in the encoded stream, and said receiver acquires the history and current quantization scales from the encoded stream.

10. Decoding apparatus for decoding an encoded stream, comprising;
 a receiver for receiving (a) the encoded stream and (b) history quantization scales utilized in more than two past encoding or decoding for each data block of the encoded stream;
 a decoder for decoding the received encoded stream to produce image data; and
 an output for outputting the history quantization scales and the decoded image data for each data block so that, when the produced image data is re-encoded by a succeeding encoder, a largest quantization scale is selected by the succeeding encoder from the received history quantization scales as a utilization quantization scale for re-encoding the image data, wherein the history and current quantization scales are included in the encoded stream, and
 said receiver acquires the history and current quantization scales from the encoded stream.

11. Transmission apparatus, comprising:
 receiving means for receiving (a) an encoded stream to be decoded to produce image data, the encoded stream includes a current quantization scale calculated upon production of each data block of the encoded stream, and (b) history quantization scales utilized in more than two past encoding or decoding processes for each data block of the encoded stream; and
 transmission means for transmitting the history quantization scales and the current quantization scale for each data block so that, when the image data is re-encoded by a succeeding encoder, a largest quantization scale is selected by the succeeding encoder from the history and current quantization scales, as a utilization quantization scale for re-encoding the image data, wherein the history and current quantization scales are included in the encoded stream, and
 said receiving means acquires the history and current quantization scales from the encoded stream.

12. A transmission method for transmitting a quantization scale, comprising the steps of:
 receiving, (a) an encoded stream to be decoded to produce image data, including a current quantization scale calculated upon production of each data block of the encoded stream, and (b) history quantization scales utilized in more than two past encoding and decoding processes for each data block of the encoded stream; and
 transmitting the history quantization scales and the current quantization scale for each data block so that, when the image data is re-encoded by a succeeding encoder, a largest quantization scale is selected by the succeeding encoder from the history and current quantization scales, as a utilization quantization scales for re-encoding the image data, wherein the history and current quantization scales are included in the encoded stream, and
 said receiving step acquires the history and current quantization scales from the encoded stream.

13. A transmission apparatus, comprising:
 receiving means for receiving (a) an encoded stream to be decoded to produce image data, and (b) history quantization scales utilized in more than two past encoding or decoding for each data block of the encoded stream; and
 transmission means for transmitting the history quantization scales for each data block so that, when the image data is re-encoded by a succeeding encoder, a largest quantization scale is selected by the succeeding encoder from the history quantization scales as a utilization quantization for re-encoding of the image data, wherein the history and current quantization scales are included in the encoded stream, and
 said receiving means acquires the history and current quantization scales from the encoded stream.

14. A transmission method, comprising the steps of:
 receiving (a) an encoded stream to be decoded to produce image data, and (b) history quantization scales utilized in more than two past encoding or decoding for each data block of the encoded stream; and
 transmitting the history quantization scales for each data block so that, when the image data is re-encoded by a succeeding encoder, a largest quantization scale is selected by the succeeding encoder from the history quantization scales as a utilization quantization scale for re-encoding of the image data, wherein the history and current quantization scales are included in the encoded stream, and
 said receiving step acquires the history and current quantization scales from the encoded stream.

15. Transmission apparatus, comprising:
 a receiver for receiving (a) an encoded stream to be decoded to produce image data, the encoded stream including a current quantization scale calculated upon production of each data block of the encoded stream and (b) history quantization scales utilized in more than two past encoding or decoding processes for each data block of the encoded stream; and
 a transmitter for transmitting the history quantization scales and the current quantization scale for each data block so that, when the image data is re-encoded by a succeeding encoder, a largest quantization scale is selected by the succeeding encoder from the history and current quantization scales, as a utilization quantization scale for re-encoding the image data, wherein the history and current quantization scales are included in the encoded stream, and
 said receiver acquires the history and current quantization scales from the encoded stream.

16. A transmission apparatus, comprising;
 a receiver for (a) receiving an encoded stream to be decoded to produce image data, and (b) history quantization scales utilized in more than two past encoding or decoding for each data block of the encoded stream; and
 a transmitter means for transmitting the history quantization scales for each data block so that, when the image data is re-encoded by a succeeding encoder, a largest quantization scale is selected by the succeeding encoder from the history quantization scales as a utilization quantization scale for re-encoding of the image data, wherein the history and current quantization scales are included in the encoded stream, and
 said receiver acquires the history and current quantization scales from the encoded stream.

* * * * *